(12) United States Patent
Chandler et al.

(10) Patent No.: US 12,307,603 B2
(45) Date of Patent: May 20, 2025

(54) STRUCTURE ANNOTATION

(71) Applicant: Five AI Limited, Bristol (GB)

(72) Inventors: Robert Chandler, Cambridge (GB); Thomas Westmacott, Cambridge (GB); Sina Samangooei, Cambridge (GB); Benjamin Fuller, Bristol (GB); Jamie Cruickshank, Bristol (GB); William Froom, Bristol (GB); Stuart Golodetz, Bristol (GB); Tommaso Cavallari, Bristol (GB)

(73) Assignee: Five AI Limited, Cambridge (GB)

( * ) Notice: Subject to any disclaimer, the term of this patent is extended or adjusted under 35 U.S.C. 154(b) by 434 days.

(21) Appl. No.: 17/627,508

(22) PCT Filed: Jul. 20, 2020

(86) PCT No.: PCT/EP2020/070442
§ 371 (c)(1),
(2) Date: Jan. 14, 2022

(87) PCT Pub. No.: WO2021/013790
PCT Pub. Date: Jan. 28, 2021

(65) Prior Publication Data
US 2022/0284666 A1  Sep. 8, 2022

(30) Foreign Application Priority Data

Jul. 19, 2019 (GB) ....................................... 1910382
Jul. 19, 2019 (GB) ....................................... 1910390
(Continued)

(51) Int. Cl.
*G06T 19/00* (2011.01)
*G06N 3/08* (2023.01)
(Continued)

(52) U.S. Cl.
CPC ............... *G06T 19/00* (2013.01); *G06N 3/08* (2013.01); *G06N 5/00* (2013.01); *G06T 1/60* (2013.01);
(Continued)

(58) Field of Classification Search
CPC combination set(s) only.
See application file for complete search history.

(56) References Cited

U.S. PATENT DOCUMENTS 10,839,530 B1 * 11/2020 Berger ................... G06N 20/00
2009/0179895 A1    7/2009 Zhu et al.
(Continued)

FOREIGN PATENT DOCUMENTS

CN         109859612 A      6/2019

OTHER PUBLICATIONS

International Search Report and Written Opinion for International Application No. PCT/EP2020/070442, mailed Dec. 3, 2020.
(Continued)

*Primary Examiner* — Said Broome
*Assistant Examiner* — Andrew Shin
(74) *Attorney, Agent, or Firm* — Andrew J. Tibbetts; Samuel S. Stone; Greenberg Traurig, LLP

(57) ABSTRACT

A computer-implemented method of creating 2D annotation data for annotating one or more perception inputs comprises: receiving at the annotation computer system at least one captured frame comprising a set of 3D structure points, in which at least a portion of a structure component is captured; computing a reference position for the structure component within the frame; generating a 3D model for the structure component by selectively extracting 3D structure points of the frame based on the reference position; computing a projection of the 3D model into an image plane; and storing 2D annotation data of the computed projection in persistent
(Continued)

computer storage for annotating the structure component within the image plane.

20 Claims, 33 Drawing Sheets

(30) Foreign Application Priority Data

| Jul. 19, 2019 | (GB) | 1910392 |
|---|---|---|
| Jul. 19, 2019 | (GB) | 1910395 |
| Apr. 1, 2020 | (GB) | 2004841 |
| Apr. 1, 2020 | (GB) | 2004842 |

(51) Int. Cl.
| *G06N 5/00* | (2023.01) |
|---|---|
| *G06T 1/60* | (2006.01) |
| *G06T 5/70* | (2024.01) |
| *G06T 7/10* | (2017.01) |
| *G06T 7/60* | (2017.01) |
| *G06T 7/70* | (2017.01) |
| *G06T 7/73* | (2017.01) |
| *G06T 15/00* | (2011.01) |
| *G06T 15/50* | (2011.01) |
| *G06T 17/00* | (2006.01) |
| *G06T 19/20* | (2011.01) |
| *G06V 10/774* | (2022.01) |
| *G06V 10/94* | (2022.01) |
| *G06V 20/56* | (2022.01) |
| *G06V 20/64* | (2022.01) |

(52) U.S. Cl.
CPC ............. *G06T 5/70* (2024.01); *G06T 7/10* (2017.01); *G06T 7/60* (2013.01); *G06T 7/70* (2017.01); *G06T 7/73* (2017.01); *G06T 15/005* (2013.01); *G06T 15/50* (2013.01); *G06T 17/00* (2013.01); *G06T 19/20* (2013.01); *G06V 10/774* (2022.01); *G06V 10/945* (2022.01); *G06V 20/56* (2022.01); *G06V 20/647* (2022.01); *G06T 2200/08* (2013.01); *G06T 2200/24* (2013.01); *G06T 2207/10016* (2013.01); *G06T 2207/10024* (2013.01); *G06T 2207/10028* (2013.01); *G06T 2207/20081* (2013.01); *G06T 2207/20092* (2013.01); *G06T 2207/30252* (2013.01); *G06T 2210/12* (2013.01); *G06T 2219/004* (2013.01); *G06T 2219/2004* (2013.01)

(56) References Cited

U.S. PATENT DOCUMENTS

| 2014/0293016 | A1 | 10/2014 | Benhimane et al. | |
|---|---|---|---|---|
| 2017/0085863 | A1* | 3/2017 | Lopez | H04N 13/261 |
| 2019/0197778 | A1* | 6/2019 | Sachdeva | G06F 18/251 |
| 2019/0271559 | A1* | 9/2019 | Colgate | G01C 21/3602 |
| 2021/0004566 | A1* | 1/2021 | Qi | G06V 10/82 |
| 2021/0370968 | A1* | 12/2021 | Xiao | G01S 7/4808 |

OTHER PUBLICATIONS

International Search Report and Written Opinion for International Application No. PCT/EP2020/070444, mailed Dec. 3, 2020.
International Search Report and Written Opinion for International Application No. PCT/EP2020/070445, mailed Oct. 13, 2020.
International Search Report and Written Opinion for International Application No. PCT/EP2020/070446, mailed Oct. 13, 2020.
Avetisyan et al., Scan2cad: Learning cad model alignment in rgb-d scans. Proceedings of the IEEE/CVF Conference on Computer Vision and Pattern Recognition 2019;2614-23.
Azam et al., Object modeling from 3d point cloud data for self-driving vehicles. 2018 IEEE Intelligent Vehicles Symposium (IV) Jun. 2, 20186;409-14.
Roberts et al., A Dataset for Lane Instance Segmentation in Urban Environments. arXiv preprint arXiv:1807.01347. Aug. 2, 2018. 17 pages.
Tylecek et al., Consistent semantic annotation of outdoor datasets via 2D/3D label transfer. Sensors. Jul. 2018;18(7):2249.
Wang et al., Latte: Accelerating LiDAR Point Cloud Annotation via Sensor Fusion, One-Click Annotation, and Tracking. arXiv preprint arXiv:1904.09085. Apr. 19, 2019. 8 pages.
Xie et al., Semantic instance annotation of street scenes by 3d to 2d label transfer. Proceedings of the IEEE Conference on Computer Vision and Pattern Recognition 2016;3688-97.
U.S. Appl. No. 17/627,520, filed Jan. 14, 2022, Chandler et al.
U.S. Appl. No. 17/627,404, filed Jan. 14, 2022, Chandler et al.
U.S. Appl. No. 17/627,417, filed Jan. 14, 2022, Chandler et al.

* cited by examiner

Cost function penalizes unexpected changes in vehicle path

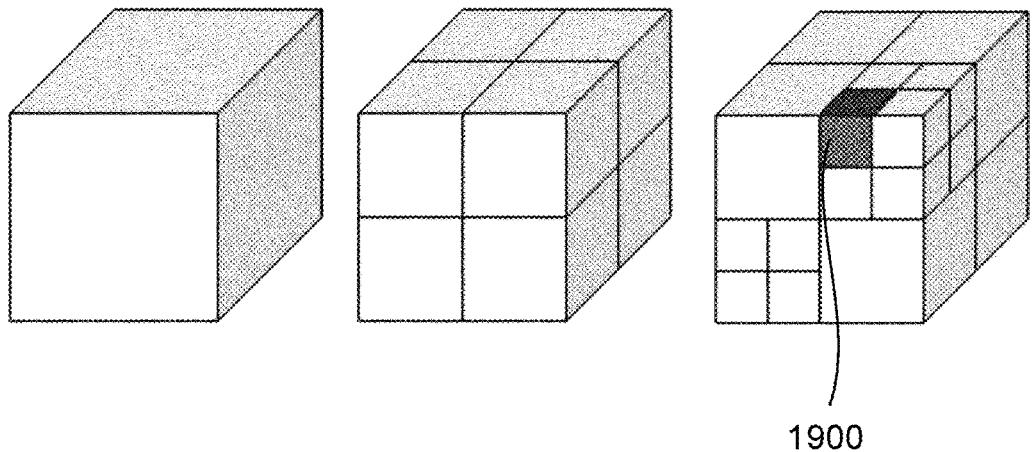
FIG. 16A
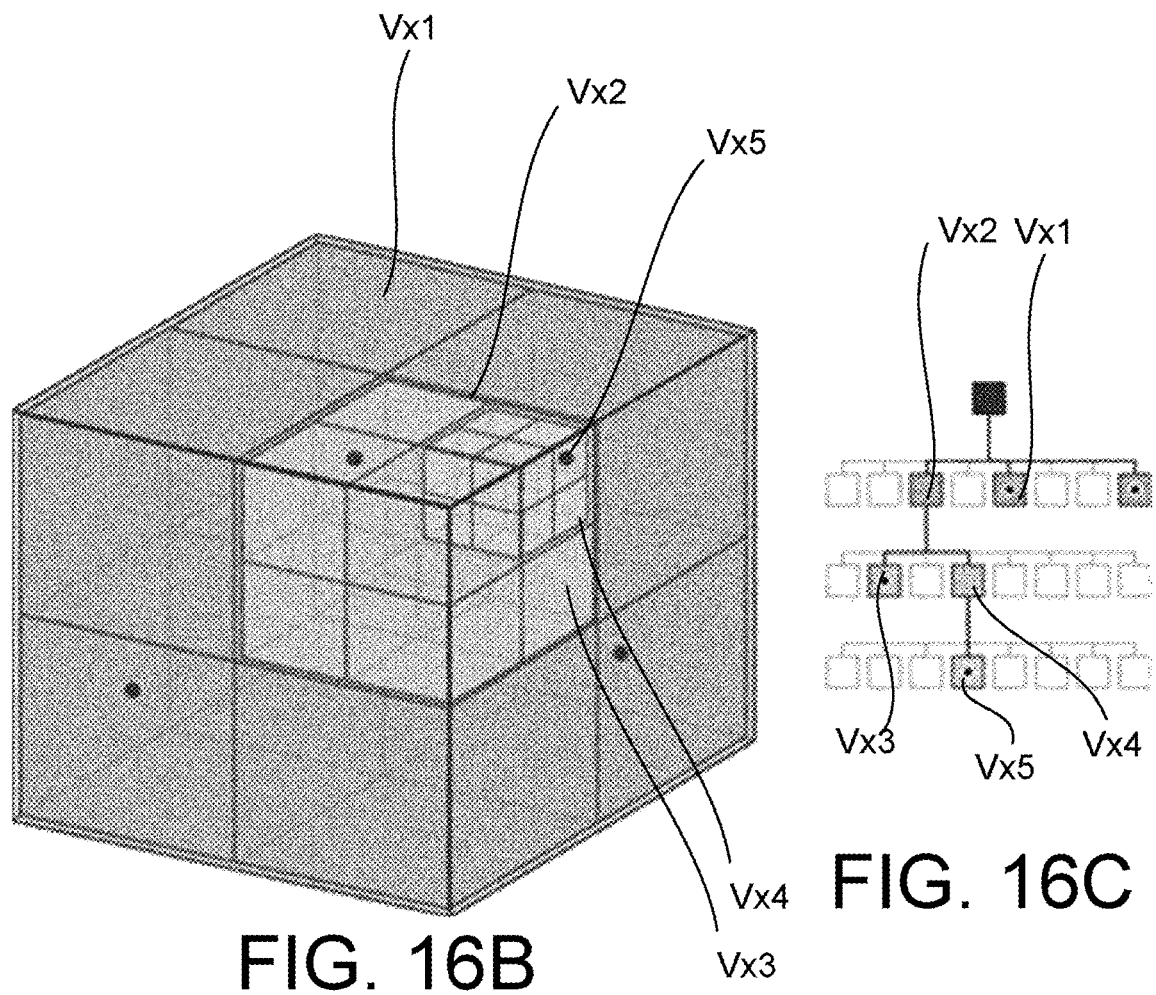
FIG. 16B
FIG. 16C

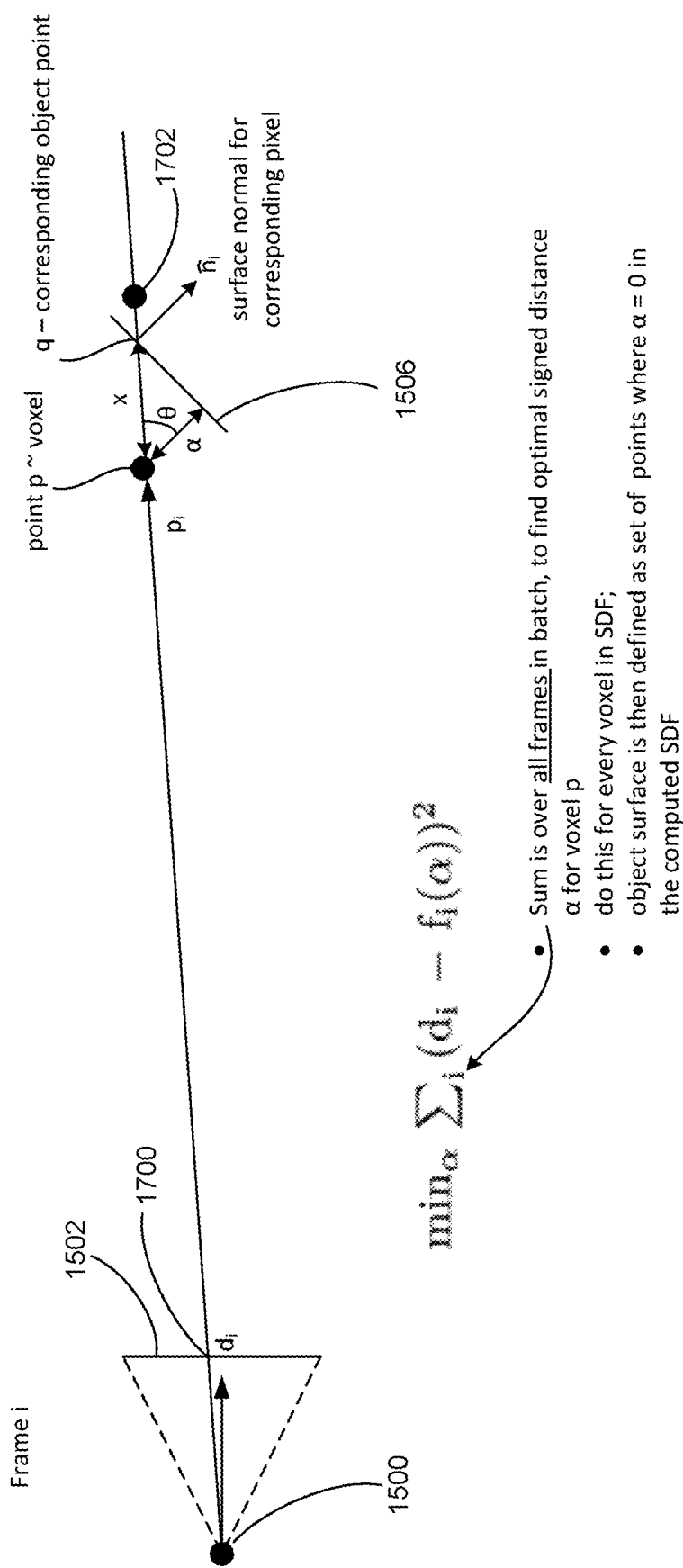

STRUCTURE ANNOTATION

RELATED APPLICATIONS

This Application is a national stage filing under 35 U.S.C. 371 of International Patent Application Serial No. PCT/EP2020/070442, filed Jul. 20, 2020, which claims priority to United Kingdom patent application number GB 2004842.7, filed Apr. 1, 2020, to United Kingdom patent application number GB 2004841.9, filed Apr. 1, 2020, to United Kingdom patent application number GB 1910382.9, filed Jul. 19, 2019, to United Kingdom patent application number GB 1910395.1, filed Jul. 19, 2019, to United Kingdom patent application number GB 1910390.2, filed Jul. 19, 2019, and to United Kingdom patent application number GB 1910392.8, filed Jul. 19, 2019. Each of the foregoing applications is incorporated by reference herein in its entirety.

TECHNICAL FIELD

This disclosure relates to the annotation of structure captured in images, point clouds, and other forms of perception inputs. Such annotation may be applied for the purpose of creating annotated perception inputs for use in training a machine learning (ML) perception component.

BACKGROUND

Structure perception refers to a class of data processing algorithms which can meaningfully interpret structure captured in perception inputs. Such processing may be applied across different forms of perception input. A perception input refers generally to any structure representation, i.e. any set of data in which structure is captured. Structure perception can be applied in both two-dimensional (2D) and three-dimensional (3D) space. The results of applying a structure perception algorithm to a given structure input are encoded as a structure perception output.

One form perception input is a two-dimensional (2D) image; that is, an image having only a colour component (one or more colour channels). The most basic form of structure perception is image classification, i.e. the simple classification of an image as a whole in relation to a set of image classes. More complex forms of structure perception applied in 2D space include 2D object detection and/or localization (e.g. orientation, pose and/or distance estimation in 2D space), 2D instance segmentation etc. Other forms of perception input include three-dimensional (3D) images, i.e. images having at least a depth component (depth channel); 3D point clouds, e.g. as captured using RADAR or LIDAR or derived from a 3D image; voxel or mesh-based representations of structure, or any other form of 3D structure representation. Examples of perception algorithms which may be applied in 3D space include 3D object detection and/or localization (e.g. distance, orientation or pose estimation in 3D space) etc. A single perception input may also be formed of multiple images. For example, stereo depth information may be captured in a stereo pair of 2D images, and that image pair may be used as a basis for 3D perception. 3D structure perception may also be applied to a single 2D image, an example being monocular depth extraction, which extracts depth information from a single 2D image (noting that a 2D image, without any depth channel, may nonetheless capture a degree of depth information in its one or more color channels). Such forms of structure perception are examples of different "perception modalities" as that term is used herein. Structure perception applied to 2D or 3D images may be referred to as "computer vision".

Object detection refers to the detection of any number of objects captured in a perception input and typically involves characterizing each such object as an instance of an object class. Such object detection may involve, or be performed in conjunction with, one or more forms of position estimation, such as 2D or 3D bounding box detection (a form of object localization, where the aim is to define an area or volume in 2D or 3D space which bounds the object), distance estimation, pose estimation etc.

In a machine learning (ML) context, a structure perception component may comprise one or more trained perception models. For example, machine vision processing is frequently implemented using convolutional neural networks (CNNs). Such networks require large numbers of training images which been annotated with information that the neural network is required to learn (a form of supervised learning). At training time, the network is presented with thousands, or preferably hundreds of thousands, of such annotated images and learns for itself how features captured in the images themselves relate to annotations associated therewith. Each image is annotated in the sense of being associated with annotation data. The image serves as a perception input, and the associated annotation data provides a "ground truth" for the image. CNNs and other forms of perception model can be architected to receive and process other forms of perception inputs, such as point clouds, voxel tensors etc., and to perceive structure in both 2D and 3D space. In the context of training generally, a perception input may be referred to as a "training example" or "training input". By contrast, training examples captured for processing by a trained perception component at runtime may be referred to as "runtime inputs". Annotation data associated with a training input provides a ground truth for that training input in that the annotation data encodes an intended perception output for that training input. In a supervised training process, parameters of a perception component are tuned systematically to minimize, to a defined extent, an overall measure of difference between the perception outputs generated by the perception component when applied to the training examples in a training set (the "actual" perception outputs) and the corresponding ground truths provided by the associated annotation data (the intended perception outputs). In this manner, the perception input "learns" from the training examples, and moreover is able to "generalize" that learning, in the sense of being able, one trained, to provide meaningful perception outputs for perception inputs it has not encountered during training.

Such perception components are a cornerstone of many established and emerging technologies. For example, in the field of robotics, mobile robotic systems that can autonomously plan their paths in complex environments are becoming increasingly prevalent. An example of such a rapidly emerging technology is autonomous vehicles (AVs) that can navigate by themselves on urban roads. Such vehicles must not only perform complex manoeuvres among people and other vehicles, but they must often do so while guaranteeing stringent constraints on the probability of adverse events occurring, such as collision with these other agents in the environments. In order for an AV to plan safely, it is crucial that it is able to observe its environment accurately and reliably. This includes the need for accurate and reliable detection of real-world structure in the vicinity of the vehicle. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on perception inputs from the sensor system. A fully-autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

Hence, in the field of autonomous driving and robotics more generally, one or more perception components may be required for interpreting perception inputs, i.e. which can determine information about real-world structure captured in a given a perception input.

Increasingly, a complex robotic system, such as an AV, may be required to implement multiple perception modalities and thus accurately interpret multiple forms of perception input. For example, an AV may be equipped with one or more stereo optical sensor (camera) pairs, from which associated depth maps are extracted. In that case, a data processing system of the AV may be configured to apply one or more forms of 2D structure perception to the images themselves—e.g. 2D bounding box detection and/or other forms of 2D localization, instance segmentation etc.—plus one or more forms of 3D structure perception to data of the associated depth maps—such as 3D bounding box detection and/or other forms of 3D localization. Such depth maps could also come from LiDAR, RADAR etc, or be derived by merging multiple sensor modalities.

In order to train a perception component for a desired perception modality, the perception component is architected so that it can receive a desired form of perception input and provide and a desired form of perception output in response. Further, in order to train a suitably-architected perception component based on supervised learning, annotations need to be provided which accord to the desired perception modality. For example, to train a 2D bounding box detector, 2D bounding box annotations are required; likewise, to train a segmentation component perform image segmentation (pixel-wise classification of individual mage pixels), the annotations need to encode suitable segmentation masks from which the model can learn; a 3D bounding box detector needs to be able to receive 3D structure data, together with annotated 3D bounding boxes etc.

SUMMARY

Conventionally, annotated training examples have been created by human annotators manually annotating the training examples. Even in the case of 2D images, this can take tens of minutes per image. Hence, creating hundreds of thousands of training images requires very significant time and manual effort, which in turn makes it a costly exercise. In practice, it imposes a limit on the number of training images that can realistically be provided, which in turn can be detrimental to the performance of a perception component trained on the limited number of images. Manual 3D annotations are significantly more burdensome and time consuming. Moreover, the problem is only exacerbated when there is a need to accommodate multiple perception modalities, as in that event multiple forms of annotation data (e.g. two or more of 2D bounding boxes, segmentation masks, 3D bounding boxes etc.) may be required in respect of one or more forms of training inputs (e.g. one or more of 2D images, 3D images, point clouds etc.).

The present disclosure pertains generally to a form of annotation tool having annotation functions which facilitate fast and efficient annotation of perception inputs. Such annotation tools may be used to create annotated perception inputs for use in training a perception component. The term annotation tool refers generally to a computer system programmed or otherwise configured to implement those annotation functions or to a set of one or more computer programs for programming a programmable computer system to carry out those functions.

One aspect of the present invention provides A computer-implemented method of creating 2D annotation data for annotating one or more perception inputs, the method comprising, in an annotation computer system: receiving at the annotation computer system at least one captured frame comprising a set of 3D structure points, in which at least a portion of a structure component is captured; computing a reference position for the structure component within the frame; generating a 3D model for the structure component by selectively extracting 3D structure points of the frame based on the reference position; computing a projection of the 3D model into an image plane; and storing 2D annotation data of the computed projection in persistent computer storage for annotating the structure component within the image plane.

Advantageously, this allows 2D annotation data to be generated automatically or semi-automatically based on a 3D model extracted from the frame itself. Because 2D annotation data is generated based on 3D modelling, such 2D annotation data can be generated for the frame itself (i.e. the frame used as a basis for the 3D model) and/or a different frame in which the same structure component is at least partially captured (the structure component may be referred to herein as a common structure component in that context, i.e. common to both frames). That is to say, the 3D model may be applied in the frame from which it is generated or it may propagated into another frame and aligned, in 3D space, with the common structure component in that different frame for the purpose of generating 2D annotation data for the other frame (either by projecting that 3D model from its aligned position or determining a second model my selectively extracting 3D structure point from that other frame based on that aligned position, and then projecting that second model; the second model could, for example, be an aggregate model determined by aggregating the selectively-extracted points of both frames).

The method uses "self-contained" modelling, whereby the 3D model is generated using 3D structure points from one or more of the frames themselves. Hence the method is flexible enough to be applied to any form of structure component which is captured in multiple 3D frames.

The 2D annotation data may comprise a 2D bounding box (or other 2D bounding object) for the structure component, which is fitted to the computed projection in the image plane of the 3D model. Advantageously, fitting the 2D bounding box to the projection of the 3D model itself can provide a tight 2D bounding box, i.e. which is tightly aligned with an outer boundary of the structure component as it appears in the image plane. An alternative approach would be to determine a 3D bounding box (or other 3D bounding object)

for the common structure component in 3D space and project the 3D bounding object into the image plane; however, in most practical contexts, this would not be able to provide a tight 2D bounding box in the image plane: even if the 3D bounding object is tightly fitted in 3D space, there is no guarantee that the boundary of the projected 3D bounding box will align with the outer boundary of the structure component itself as it appears in the image plane.

Further or alternatively, the 2D annotation data may comprise a segmentation mask for the structure component. By projecting the 3D model itself into the image plane, a segmentation mask may be provided which labels (annotates) pixels of the image plane within the outer boundary of the model projection as belonging to the structure component, and pixels outside of the outer boundary as not belonging to the structure component. Note that a degree of processing may be applied to the computed projection in order to provide a useful segmentation mask. For example, areas of the projection may be "smoothed" or "filled in" to reduce artefacts caused by noise, sparsity etc. in the underlying frame from which the 3D model is generated. In that case, the outer boundary of the computed projection refers to the outer boundary after such processing has been applied.

The 3D model may comprise the selectively-extracted structure points themselves and/or a 3D mesh model or other 3D surface model fitted to the selectively-extracted points. When a 3D surface model is used to create a segmentation mask, it is the outer boundary of the projected 3D surface model that defines the segmentation mask (subject to any post-processing of the computed projection). A 3D surface model is one means of providing a higher quality segmentation mask.

In general, denoising and/or refinement may be applied to one or both of the 3D model (before it is projected) and the computed projection. This may involve one or more of noise filtering (to filter out noise points/pixels, e.g. having an insufficient number of neighbouring points/pixels within a defined threshold distance), predictive modelling etc. For predictive modelling, a predictive model is applied to existing points (resp. pixels) of the 3D model (resp. projection), on the assumption that 3D model (rep. projection) is incomplete or otherwise incorrect. The existing points (resp. pixels) serve as a "prior" from which a correct 3D model (resp. projection) is inferred. This may have the effect of adding additional points/pixels or removing points/pixels determined to be incorrect (hence predictive modelling can be used both to predict missing points/pixels and/or as a means of noise filtering).

In some embodiments, the 3D model is an aggregate model derived from multiple frames. For each of the multiple frames, a reference position is computed for that frame, and used to selectively-extract 3D structure points from that frame. The 3D structure points extracted from the multiple frames are aggregated to generate an aggregate 3D model. Aggregate 3D models have various benefits. For example, such models can account for occlusion or other forms of partial data capture, and also data sparsity and noise. Regarding the latter, aggregating over multiple frames means that noise artefacts can be more easily identified and corrected (e.g. stray noise points will on average be materially sparser than points which actually belong to the structure component in question, and can thus be filtered out more reliably; the increased density of the points which do belong to the structure component in question will also provide a stronger prior for predictive modelling etc.). Hence, there are particular benefits of aggregate 3D models applied in conjunction with noise reduction.

In preferred embodiments, the annotation tool provides annotation data for multiple perception modalities (e.g. both 2D and 3D annotation) and/or for multiple frames based on a set of common annotation operations (which may be manual, automatic or semi-automatic). That is, the same operations are leveraged to provide annotation data for multiple perception modalities and/or for multiple frames. There are various ways in which the present annotation functions may be leveraged in this manner, including but not limited to the following examples.

The following example considers two frames for the sake of simplicity. It will of course be appreciated that an aggregate model may be generated across a greater number of frames. Indeed, by aggregating across many frames, a high-quality aggregate model (dense and low-noise) may be obtained, which in turn may be used to efficiently generate high-quality annotation data for those frames (and/or other frames in which the common structure component is captured).

Example 1—context: A 3D bounding box (or other bounding object) is accurately positioned within a first frame to bound a particular structure component. Assuming the 3D bounding object is positioned (e.g. located and oriented) using one or more forms of "external" input, i.e. that would not be available to a perception component at runtime, then it provides useful ground truth for the purposes of supervised training. In the simplest case, the 3D bounding object could be positioned manually (i.e. the external input is provided by a human input); however, it may also be positioned automatically, by exploiting contextual information such as a measured or assumed path of the structure component (in that case, the external input comes from the known or assumed path). The position and (where applicable) dimensions of the 3D bounding box within the first frame can, in turn, be stored as 3D annotation data for a first perception input of the first frame (i.e. a perception input which comprises is derived from, or otherwise corresponds to at least part of that frame).

Example 1-3D to 2D; same frame: Moreover, now that the 3D bounding box has been accurately positioned, it can be used as a basis for generating a 3D model of the desired structure component. For a tightly fitted and accurately placed 3D bounding object, the intersection of the first frame with the volume of the 3D bounding box may be used as a basis for the model (i.e. the 3D structure points within the volume of the 3D bounding box may be extracted to generate the 3D model). In this case, the "reference position" referred to above is computed as the position of the 3D bounding box within the first frame. (Note, as explained below, it is not in fact necessary for the bounding box to be tightly fitted initially—a "coarse" bounding box can also be used at least initially).

2D annotation data may now be generated immediately for the first frame: an aligned position for the 3D model within the first frame (i.e. a position such that the 3D model is aligned with the structure component in that frame) is already known to be the position of the 3D bounding box. Hence, the 3D model can be projected into a desired image plane based on that position, and the resulting projection used as a basis for one or more forms of 2D annotation data. Such 2D annotation data may be stored in association with the above first perception input of the first frame, or another perception input of the first frame. For example, the 3D annotation data may be stored in association with a point cloud of the first frame, and the 2D annotation data may be stored in association with a 2D image of the first frame (e.g.

a colour component associated with a depth component, where the first frame comprises or is derived from at least the depth component).

Example 1—model propagation: What is more, that same 3D model can now be propagated into a second frame in which the same structure component is at least partially captured. By aligning the 3D model with the common structure component in the second frame (automatically, manually, or semi-automatically)—i.e. positioning and/or reorienting the 3D model so that its structural elements and/or visible features etc. are aligned with corresponding structural elements, features etc. of the common structure component in the second frame—an aligned position for the 3D model within the second frame is determined.

Example 1—model propagation; 3D to 3D: The position of the 3D bounding box relative to the 3D model is inherently known as a consequence of deriving the 3D model based on the position of the 3D bounding box in the first frame. For example, the 3D structure points of the 3D model may be defined in a frame of reference of the 3D bounding box—see below. Hence, by accurately positioning the 3D model within the second frame (to align it with the common structure component), an accurate position for the 3D bounding box in the second is now known as the aligned model position in the second frame. For a rigid object, the same bounding box dimensions can be applied in the first and second frame. In other words, the bounding box positioned within the first frame is propagated into and correctly positioned in the second frame, by propagating the 3D model into the second frame and aligning it with the common structure component. Now that the position of the bounding box has been accurately determined within the second frame, that position can stored (together with the bounding box dimensions as applicable) as 3D annotation data for a second perception input of the second frame (i.e. a perception input which comprises is derived from, or otherwise corresponds to at least part of the second frame). As noted, the alignment can be manual, automatic or semi-automatic. In the case of manual alignment, it is significantly easier to accurately align a 3D model with the corresponding structure component by eye (based on characteristic structural elements, features etc.) than it is to position a second bound box in the second frame "from scratch". Moreover, in the case of a rigid object, the same bounding box dimensions can be applied across all frames, so these do not need to be defined separately for every frame in that event.

Example 1—model propagation; 3D to 2D: Finally, now that the aligned model position (or, equivalently in this context, the 3D bounding box position) is known within the second frame, 2D annotation data may be create for the second frame by projection in analogous manner. This can be based on (i) a projection of the propagated model into a desired image plane, (ii) a projection of a second 3D model which is determined in the same way but by selectively extracting 3D structure points of the second frame from within the volume of the bounding box in the second frame (which has been correctly positioned using the 3D model derived from the first frame), or (iii) an aggregate model as generated by aggregating such selectively extracted points of the second frame with those of the first frame (and possibly many other frames to build a dense aggregate model). Such 2D annotation data may be stored in association with the above second perception input of the second frame or another perception input of the second frame.

In Example 1, it can be seen that, in respect of the first frame, the operations of positioning of the 3D bounding object within the first frame are leveraged to generate both 2D and 3D annotation data for the first frame. Moreover, those same operations are leveraged, in conjunction with the operations of aligning the 3D model in the second frame, to additionally provide 3D and 2D annotation data for the second frame. Two frames are described by way of example, but it will be appreciated that the principles can be applied to a greater number of frames, thus providing even more significant performance benefits in terms of annotation time and efficiency.

As will be appreciated, Example 1 above is one of many efficient annotation workflows facilitated by certain embodiments the present annotation tool. That example serves only to illustrate certain features of the annotation tool and not to define or limit the scope of the present invention. Further examples are described hereinbelow for the same purpose.

The present annotation tool is particularly suitable for annotating time-sequenced frames, i.e. one or more time sequences of frames captured over a time interval, typically at regular and relatively short intervals. Such a time sequence of frames may be referred to herein as a "3D video sequence", noting that each frame comprises 3D structure points, i.e. points which capture structure in 3D space. An example application is the annotation of 3D video sequences captured by a travelling vehicle or other mobile object, in order to provide annotated perception inputs that are highly suited to training one or more perception components for use in an autonomous vehicle or other mobile robot. For example, such frames may capture urban or non-urban road scenes, which in turn may be annotated to mark road structure, other vehicles, pedestrians, cyclists and any other form of structure component that an autonomous vehicle needs to be capable of perceiving and responding to.

A "frame" in the present context refers to any captured 3D structure representation, i.e. comprising captured points which define structure in 3D space (3D structure points), and which provide a static "snapshot" of 3D structure captured in that frame (i.e. a static 3D scene). The frame may be said to correspond to a single time instant, but does not necessarily imply that the frame or the underlying sensor data from which it is derived need to have been captured instantaneously—for example, LiDAR measurements may be captured by a mobile object over a short interval (e.g. around 100 ms), in a LiDAR sweep, and "untwisted", to account for any motion of the mobile object, to form a single point cloud. In that event, the single point cloud may still be said to correspond to a single time instant, in the sense of providing a meaningful static snapshot, as a consequence of that untwisting, notwithstanding the manner in which the underlying sensor data was captured. In the context of a time sequence of frames, the time instant to which each frame corresponds is a time index (timestamp) of that frame within the time sequence (and each frame in the time sequence corresponds to a different time instant).

The terms "object" and "structure component" are used synonymously in the context of an annotation tool refers to an identifiable piece of structure within the static 3D scene of a 3D frame which is modelled as an object. Note that under this definition, an object in the context of the annotation tool may in fact correspond to only part of a real-world object, or to multiple real-world objects etc. That is, the term object applies broadly to any identifiable piece of structure captured in a 3D scene.

Regarding further terminology adopted herein, the terms "orientation" and "angular position" are used synonymously and refer to an object's rotational configuration in 2D or 3D space (as applicable), unless otherwise indicated. As will be apparent from the preceding description, the term "position"

is used in a broad sense to cover location and/or orientation. Hence a position that is determined, computed, assumed etc. in respect of an object may have only a location component (one or more location coordinates), only an orientation component (one or more orientation coordinates) or both a location component and an orientation component. Thus, in general, a position may comprise at least one of: a location coordinate, and an orientation coordinate. Unless otherwise indicated, the term "pose" refers to the combination of an object's location and orientation, an example being a full six-dimensional (6D) pose vector fully defining an object's location and orientation in 3D space (the term 6D pose may also be used as shorthand to mean the full pose in 3D space).

The terms "2D perception" and "3D perception" may be used as shorthand to refer to structure perception applied in 2D and 3D space respectively. For the avoidance of doubt, that terminology does not necessarily imply anything about the dimensionality of the resulting structure perception output—e.g. the output of a full 3D bounding box detection algorithm may be in the form of one or more nine-dimensional vectors, each defining a 3D bounding box (cuboid) as a 3D location, 3D orientation and size (height, width, length—the bounding box dimensions); as another example, the depth of an object may be estimated in 3D space, but in that case a single-dimensional output may be sufficient to capture the estimated depth (as a single depth dimension). Moreover, 3D perception may also be applied to a 2D image, for example in monocular depth perception.

In embodiments, the 2D annotation data may comprise a 2D bounding object for the structure component, which is fitted, in the image plane, to the computed projection of the 3D model.

Alternatively or in addition, the 2D annotation data may comprise a segmentation mask for the structure component.

The 2D annotation data may be stored in association with at least one perception input of said frame for annotating the structure component therein, and the projection may be computed based on the reference position computed within that frame.

The 2D annotation data may be stored in association with at least one perception input of a second frame for annotating the structure component in the at least one perception input of the second frame, in which second frame at least a portion of the structure component is captured.

The 3D model may also be used to create 3D annotation data for annotating the structure component in 3D space.

The 3D annotation data may be created for annotating the structure component in at least one perception input of a second frame, in which at least a portion of the structure component is captured.

The 2D or 3D annotation data may be created for annotating the at least one perception input of the second frame by computing an aligned model position for the 3D model within the second frame, wherein the aligned model position is determined based on at least one of: (i) one or more manual alignment inputs received in respect of the second frame at a user interface whilst rendering the 3D model for manually aligning the 3D model with the structure component in the second frame, and (ii) an automatic alignment of the 3D model with the structure component in the second frame.

The annotation data may comprise refined annotation data computed by applying a predictive model in dependence on the selectively-extracted 3D structure points.

The predictive model may be a conditional random field (CRF) or other probabilistic graphical model.

The at least one perception input may comprise 2D image data of or associated with said frame or the second frame, the image plane being the image plane of the image data.

Said frame or the second frame may comprise data of a depth component of a 3D image and the image data of the perception input is image data of a colour component of the 3D image.

The method may comprise the step of applying noise filtering to at least one of the following, to filter-out noise points therefrom:
the extracted 3D structure points for generating the 3D model, wherein the 3D model comprises or is derived from the filtered 3D structure points in that event, and the computed projection, the 2D annotation data being 2D annotation data of the filtered projection in that event.

The noise filtering may be applied according to filtering criteria which are manually adjustable via a user interface of the annotation computer system.

The reference position may be computed based on one or more positioning inputs received at a user interface whilst rendering a visual indication of the reference position within the frame for manually adjusting the reference position within the frame.

The reference position may be computed for the reference frame automatically or semi-automatically.

The reference position may be computed automatically or semi-automatically by applying a perception component to the reference frame.

The frame may be one of a plurality of time-sequenced frames, and the reference position may be computed automatically or semi-automatically based on a structure component path within a time interval of the time-sequenced frames.

The selectively-extracted 3D structure points may be selectively extracted from the frame for generating the 3D model based on the reference position and one or more bounding object dimensions, wherein the one or more bounding object dimensions may be one of: (i) manually-determined based on one or more sizing inputs received at a user interface, (ii) automatically-determined by applying a perception component to the frame, (iii) semi-automatically-determined by applying the perception component to the frame and further based on the one or more sizing inputs, and (iv) assumed.

The selectively-extracted 3D structure points may be a subset of points within a 3D volume defined by the reference position and the one or more bounding object dimensions.

The 3D annotation data may further comprise the one or more bounding object dimensions used to generate the 3D model, or a transformation thereof.

The method may comprise the step of using the or each perception input in a training process to train at least one perception component, wherein the annotation data for that perception input provides a ground truth for that perception input in the training process.

The 3D annotation data may be used to train a 3D perception component and the 2D annotation data may be used to train a 2D perception component.

The 3D model may comprise a 3D surface model fitted to the selectively-extracted structure points, and the projection comprises a projection of the 3D surface model into the image plane.

The set of 3D structure points may be in the form of a point cloud.

The set of 3D structure points may be transformed into a frame of reference of the reference position, in order to selectively extract the 3D structure points for the 3D model.

The 3D volume defined by the reference position and the one or more bounding object dimensions may be a cuboid aligned with coordinate axes of the frame of reference.

The 2D annotation may be created for the second frame by using the aligned model to generate a second 3D model, by selectively-extracting 3D structure points of the second frame based on the aligned model location, then projecting the second 3D model into the image plane.

The second 3D model may be an aggregate 3D model generated by aggregating the selectively-extracted 3D structure points of the first and second frames.

The reference position may be computed within said frame as an aligned model position of an existing 3D model of the structure component based on at least one of: (i) one or more manual alignment inputs received in respect of said frame at a user interface whilst rendering the existing 3D model for manually aligning the existing 3D model with the structure component in said frame, and (ii) an automatic alignment of the existing 3D model with the structure component in said frame.

The existing 3D model may have been generated from one or more other frames in which at least a portion of the structure component is captured.

The 3D model may be an aggregate 3D model determined by aggregating the selectively-extracted 3D structure points with 3D structure points of the existing 3D model.

The automatic alignment may comprise computing a projection of the existing 3D model or the 3D model into a 2D image plane associated with the frame or the second frame, and adjusting the model position in 3D space so as to match the projection with 2D features of the common structure component within the 2D image plane.

The 2D annotation data may comprise an instance segmentation mask determined to substantially an energy function, wherein the instance segmentation mask assigns, to each pixel of a set of pixels in the image plane, an instance classification label, and wherein the energy function has: a unary term, which aggregates a unary function over the segmentation mask, the unary function applied to the instance classification label of each pixel individually, wherein the unary function is defined by one or more raycasted values, as determined in said projecting step by raycasting through that pixel and determining if and where the ray intersects a surface of the 3D model, and a non-unary term, which aggregates a non-unary function over the segmentation mask, the non-unary function applied to the instance classification labels of at least two of the pixels.

The non-unary function may have one or more terms, each a product of a label compatibility function and a kernel, wherein the kernel measures a difference between at least one of: the locations of the pixels, the values of the pixels, and features of the pixels, such that the effect of the label compatibility function is reduced as that or those differences increase.

The pixel values may comprise depth or disparity values and the kernel of at least one of the terms measures difference between at least the depth or disparity values of the at least two pixels, such that the effect of the label compatibility function is reduced as the difference in the depth or disparity values increases.

The label compatibility function may depend on a size of an instance to which at least one pixel of the at least two pixels belongs.

The instance may be defined by the instance segmentation mask.

Whilst the techniques mentioned above for determining an instance segmentation mask are presented in the context of the object modelling technique of the afore mentioned aspect, the can be applied more widely in any context where an instance segmentation mask is desired (online or offline).

A further aspect herein provides a computer-implemented method of determining an instance segmentation mask for an image, the method comprising, in an annotation computer system: receiving an image to be annotated; determining a relative pose between the image and a 3D object model; raycasting through each pixel of the plane of the image and determining if and where the ray intersects a surface of the 3D model, thereby determining one or more raycasted values for the pixels; and determining an instance segmentation mask as substantially optimizing an energy function, wherein the instance segmentation mask assigns, to each pixel of a set of pixels in the image plane, an instance classification label, and wherein the energy function has: a unary term, which aggregates a unary function over the segmentation mask, the unary function applied to the instance classification label of each pixel individually, wherein the unary function is defined by one or more raycasted values, as determined in said projecting step by raycasting through that pixel and determining if and where the ray intersects a surface of the 3D model, and a non-unary term, which aggregates a non-unary function over the segmentation mask, the non-unary function applied to the instance classification labels of at least two of the pixels.

A further aspect herein provides a computer implemented method of determining an instance segmentation mask for an image comprising: determining the instance segmentation mask as to substantially an energy function, wherein the instance segmentation mask assigns, to each pixel of a set of pixels in the image, an instance classification label, and wherein the energy function has: a unary term, which aggregates a unary function over the segmentation mask, the unary function applied to the instance classification label of each pixel individually, and a non-unary term, which aggregates a non-unary function over the segmentation mask, the non-unary function applied to the instance classification labels of at least two of the pixels, wherein the non-unary function has one or more terms, each a product of a label compatibility function and a kernel, wherein the pixel values comprise depth or disparity values and the kernel of at least one of terms measured difference between at least the depth or disparity values of the at least two pixels, such that the effect of the label compatibility function is reduced as the difference in the depth or disparity values increases.

A further aspect herein provides a computer implemented method of determining an instance segmentation mask for an image comprising: determining the instance segmentation mask as to substantially an energy function, wherein the instance segmentation mask assigns, to each pixel of a set of pixels in the image, an instance classification label, and wherein the energy function has: a unary term, which aggregates a unary function over the segmentation mask, the unary function applied to the instance classification label of each pixel individually, and a non-unary term, which aggregates a non-unary function over the segmentation mask, the non-unary function applied to the instance classification labels of at least two of the pixels, wherein the non-unary function has one or more terms, each a measured measure of difference between at least one of: the locations of the pixels, the values of the pixels, and features of the pixels, such that the effect of the label compatibility function is reduced as that or those differences increase; and wherein the label compatibility function depends on a size of an instance to which at least one pixel of the at least two pixels belongs.

The instance may be defined by the instance segmentation mask.

Reference is made to United Kingdom Patent Application Nos. 1910392.8, 1910390.2, 1910395.1 and 1910382.9 (the earlier applications), filed 19 Jul. 2019, and to United Kingdom Patent Application No. 2004842.7, filed 1 Apr. 2020, each of which is incorporated herein in its entirety. All of the subject matter taught herein, including the aspects and embodiments set out above, can be implemented in the context of any one of the aforementioned.

Further aspects of the present disclosure provide a computer system comprising one or more computers programmed or otherwise configured to carry out any of the steps disclosed herein, and one or more computer programs embodied on transitory or non-transitory media for programming a computer system to carry out such steps.

The computer system may be embodied in a robotic system (e.g. an autonomous vehicle or other mobile robot), or as a simulator.

BRIEF DESCRIPTION OF FIGURES

For a better understanding of the present invention, and to show how embodiments of the same may be carried into effect, reference is made by way of example only to the following Figures in which:

FIG. 16A illustrates principles of dynamic voxel scaling, with FIGS. 16B and 16C showing a physical representation and data structure representation of a voxel tree;

FIG. 17 illustrates certain principles of SDF computation based on Maximum Likelihood Estimation;

DETAILED DESCRIPTION

Embodiments of the present invention are described in detail below. First, some useful to the described embodiments is provided.

Figure 1:
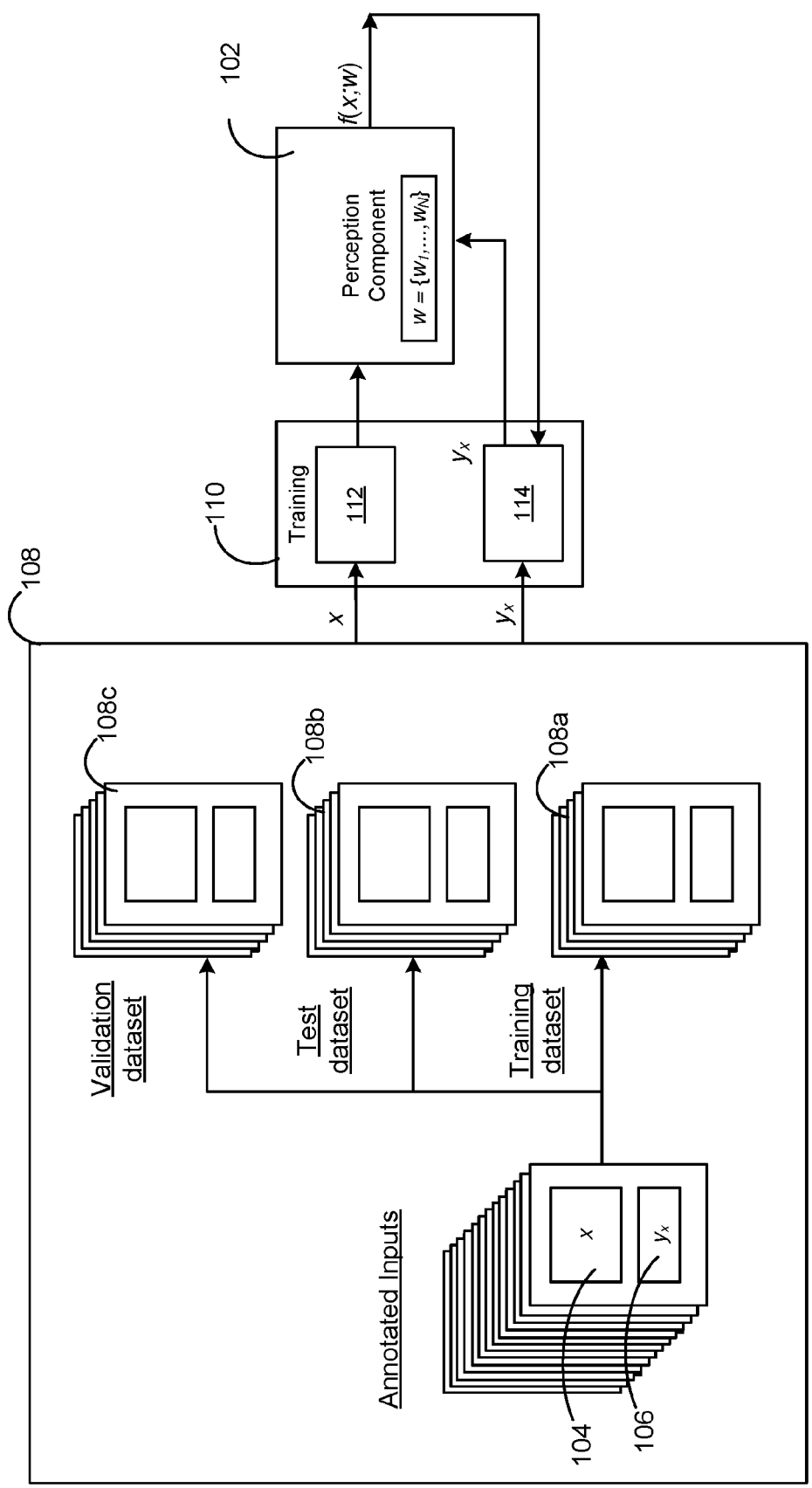
FIG. 1 shows a highly schematic function block diagram of a training system for training a perception component.

FIG. 1 shows a highly schematic function block diagram of a supervised training system for training a perception component 102 based on a set of annotated perception inputs 108 (that is, perception inputs together with associated annotation data). The perception component 102 may be referred to synonymously as a structure detector, structure detection component or simply a structure detector in the following description. As noted, perception inputs used for the purpose of training may be referred to herein as training examples or training inputs.

In FIG. 1, a training example is denoted by reference numeral 104 and a set of annotation data associated therewith is denoted by reference numeral 106. The annotation data 106 provides a ground truth for the training example 104 with which it is associated. For example, for a training example in the form of an image, the annotation data 106 may mark the location(s) of certain structure component within the image 104, such as roads, lanes, junctions, non-drivable areas etc. and/or objects within the images, such as other vehicles, pedestrians, street signage or other infrastructure etc.

The annotated perception inputs 108 may be divided into training, test and validation sets, labelled 108a, 108b and 108c respectively. An annotated training example may thus be used for training the perception component 102 without forming part of the training set 108a because it is used for testing or validation instead.

The perception component 102 receives a perception input, denoted x, from one of the training, test and validation sets 108a, 108b, 108c, and processes the perception input x in order to provide a corresponding perception output denoted by $$y=f(x;w).$$

In the above, w denotes a set of model parameters (weights) of the perception component 102, and $f$ denotes a function defined by the weights w and the architecture of the perception component 102. For example, in the case of 2D or 3D bounding box detection, the perception output y may comprise one or more detected 2D or 3D bounding boxes derived from the perception input x; in the case of instance segmentation, y may comprise one or more segmentation maps derived from the perception inputs. In general, the format and content of the perception output y depends on the choice of perception component 102 and its chosen architecture, and those choices are, in turn, made in accordance with the desired perception modality or modalities for which it is to be trained.

The detection component 102 is trained based on the perception inputs of the training set 108a so as to match its output $y=f(x)$ to the ground truth provided by the associated annotation data. The ground truth provided for perception input x is denoted yx herein. So, for the training example 104, the ground truth is proved by the associated annotation data 106.

This is a recursive process, in which an input component 112 of a training system 110 systematically provides perception inputs of the training set 108b to the perception component 102, and a training component 114 of the training system 110 adapts the model parameters w in an attempt to optimize an error (cost) function that penalizes deviation of each perception output y=ƒ(x; w) from the corresponding ground truth $y_x$. That deviation is characterized by a defined metric (such as mean square error, cross-entropy loss etc.). Hence, by optimizing the cost function to a defined extent, an overall error across the training set 108a as measured with respect to the ground truths can be reduced to an acceptable level. The perception component 102 can for example be a convolutional neural network, where the model parameters w are weightings between neurons, but the present disclosure is not limited in this respect. As will be appreciated, there are numerous forms of perception model which may be usefully trained on suitably annotated perception inputs.

The test data 108b is used to minimize over-fitting, which refers to the fact that, beyond a certain point, increasing the accuracy of the detection component 102 on the training dataset 108a is detrimental to its ability to generalize to perception inputs it has not encountered during training. Overfitting can be identified as the point at which increasing the accuracy of the perception component 102 on the training data 108 reduces (or does not increase) its accuracy on the test data, with accuracy being measured in terms of the error function. The aim of training is to minimize the overall error for the training set 108a to the extent it can be minimized without overfitting.

The validation dataset 108c can be used to provide a final assessment of the detection component's performance, if desired.

Figure 2:
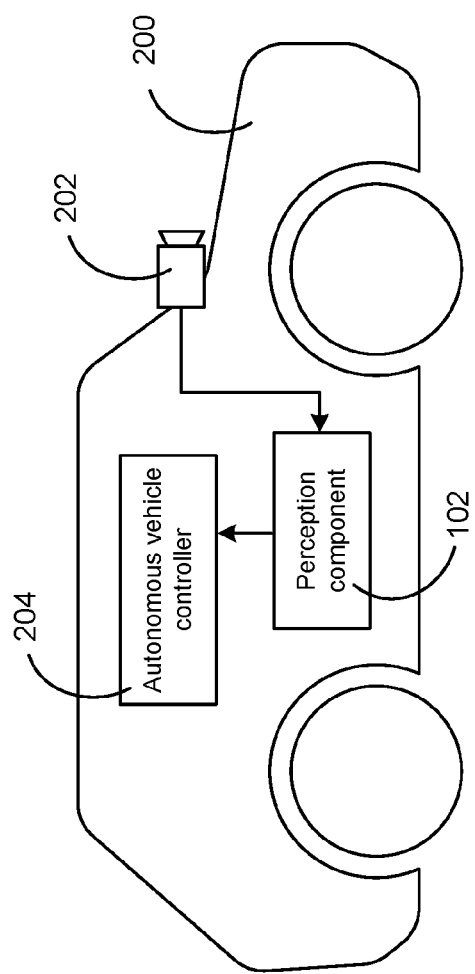
FIG. 2 shows a highly schematic block diagram of an autonomous vehicle.

FIG. 2 shows a highly-schematic block diagram of an autonomous vehicle 200, which is shown to comprise an instance of the trained perception component 102, having an input connected to at least one sensor 202 of the vehicle 200 and an output connected to an autonomous vehicle controller 204.

In use, the (instance of the) trained perception component 102 of the autonomous vehicle 200 interprets structure within perception inputs captured by the at least one sensor 202, in real time, in accordance with its training, and the autonomous vehicle controller 204 controls the speed and direction of the vehicle based on the results, with no or limited input from any human driver.

Although only one sensor 202 is shown in FIG. 2, the autonomous vehicle 102 could be equipped with multiple sensors. For example, a pair of image capture devices (optical sensors) could be arranged to provide a stereoscopic view, and the road structure detection methods can be applied to the images captured from each of the image capture devices. Other sensor modalities such as LiDAR, RADAR etc. may alternatively or additionally be provided on the AV 102.

As will be appreciated, this is a highly simplified description of certain autonomous vehicle functions. The general principles of autonomous vehicles are known, therefore are not described in further detail.

In order to train the perception component 102 for use in the context of FIG. 2, training examples can be captured using the same vehicle or a similarly-equipped vehicle, so as to capture training examples which closely correspond to the form (or forms) of runtime input the trained perception component 102 will need to be able to interpret onboard the AV 200 at runtime. Such training examples may be captured using an autonomous or non-autonomous vehicle, having an identical or merely similar sensor arrangement. In the present context, in which 3D frames are used as a basis for creating annotated training examples, at least one 3D sensor modality is needed, but noting that said term applies broadly to any form of sensor data in which a useful amount of depth information is captured, including LiDAR, RADAR, stereo imaging, time-of-flight, or even monocular imaging (in which depth information is extracted from single images—in that case, a single optical sensor is sufficient for capturing the underlying sensor data of perception inputs to be annotated).

Moreover, the techniques described herein can be implemented off-board, that is in a computer system such as a simulator which is to execute path planning for modelling or experimental purposes. In that case, the sensory data may be taken from computer programs running as part of a simulation stack. In either context, the perception component 102 may operate on sensor data to identify objects. In a simulation context, a simulated agent may use the perception component 102 to navigate a simulated environment, and agent behavior may be logged and used e.g. to flag safety issues, or as a basis for redesigning or retraining component(s) which have been simulated.

Embodiments of the invention will now be described.

Figure 3:
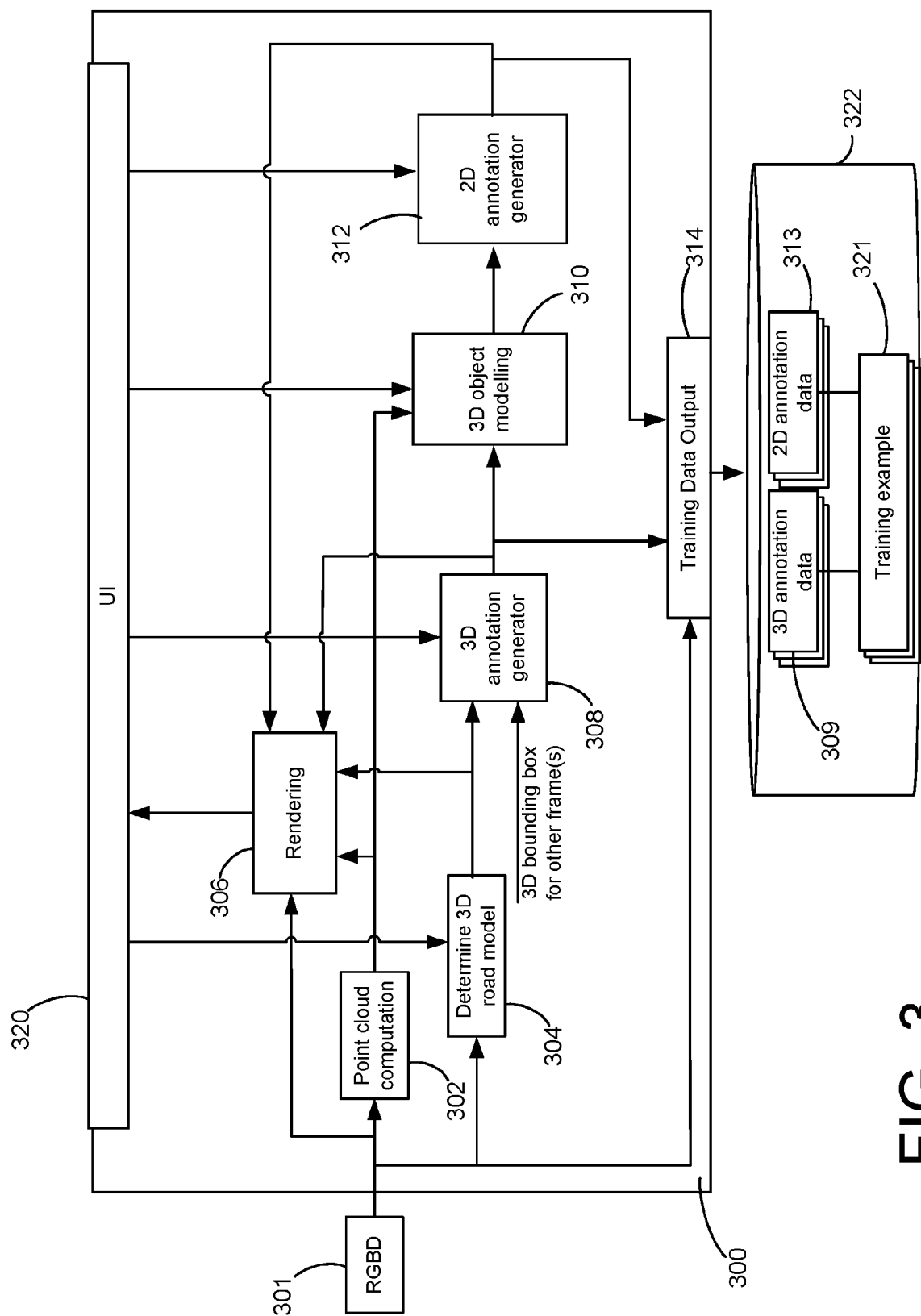
FIG. 3 shows a schematic functional block diagram of an annotation computer system.

FIG. 3 shows a functional block diagram of an annotation computer system 300 which may be referred to as the annotation system 300 for brevity. The purpose of the annotation system 300 is to create annotated (labelled) data of the kind that may be used to train a machine learning component, such as a 2D or 3D structure detector (e.g. a 2D segmentation component, a 2D bounding box detector or a 3D bounding box detector). Such data may be referred to as training data, and a training data output component 314 of the annotation system 300 provides annotated training data in the form of a set of training examples having annotation data associated therewith.

Each training example 321 is in the form of a structure representation (such as a 2D or 3D image, point cloud, or other set of sensor data in which structure is captured). Each training example 321 is associated with 2D annotation data 313 and/or 3D annotation data 309 created using the annotation system 300. 2D annotation data means annotation data defined in a 2D plane (or other 2D surface). For example, 2D annotation data may be defined in an image plane for annotating 2D structure within the image plane. 3D annotation data means annotation data defined in 3D space for annotating 3D structure captured in a depth map, point cloud or other 3D structure representation. Each training example 321 and the 2D/3D annotation data associated 313/309 therewith is stored in electronic storage 322 accessible to the annotation computer system 300. The electronic storage 322 is a form of computer memory, and each training example 321 and its associated annotation data is stored in a persistent region thereof, in which it persists thereafter and from which it may be exported or otherwise obtained for other purposes, such as training one or more perception components (e.g. in an external training system).

As described below, various annotation functions are provided which allow such annotation data to be generated automatically or semi-automatically, thereby increasing the speed at which such data can be created and reducing the amount of required human effort.

The annotation functions are generally represented in FIG. 3 by a point cloud computation component 302, a road modelling component 304, a rendering component 306, a 3D annotation generator 308, an object modelling component 310 and a 2D annotation data generator 312. The annotation system 300 is also shown to comprise a user interface (UI) 320 via which a user (human annotator) can interface with the annotation system 300. An annotation interface, also referred to as an annotation tool herein, is provided via the UI 320 for accessing the annotation functions.

The annotation system 300 is also shown having an input for receiving data to be annotated, which in the present example takes the form of a time series of frames 301.

In the following examples, each frame is in the form of an RGBD (Red Green Blue Depth) image captured at a particular time instant. An RGBD image has four channels, three of which (RGB) are colour channels (colour component) encoding a "regular" image, and the fourth of which is a depth channel (depth component) encoding depth values for at least some pixels of the image. RGB is referred to by way of example however the description applies more generally to any image having colour and depth components (or, indeed, to images having only depth components). In general, the colour component of an image can be encoded in any appropriate colour space using one or more colour channels (including grayscale/monochrome). The point cloud computation component 302 converts each frame to point cloud form to allow that frame to be annotated in 3D space. More generally, a frame corresponds to a particular time instant and may refer to any set of data in which a static "snapshot" structure, i.e. a static 3D scene, has been captured for that time instant (such as multiple RGBD images, one or more point clouds etc.). Hence, all description pertaining to RGBD images in the following applies equally to other forms of frame. Where the frames are received at the annotation system 300 in point cloud form, the point cloud conversion is unnecessary. Although the following examples are described with reference to point clouds derived from RGBD images, the annotation system can be applied to any modality of point cloud, such as monocular depth, stereo depth, LiDAR, radar etc. A point cloud can also be derived two or more such sense modalities and/or from multiple sensor components of the same or different modalities, by merging the outputs of different sensors. Hence, the term "point cloud of a frame" can refer to any form of point cloud corresponding to a particular time instant, including a frame received at the annotation computer system 300 in point cloud form, a point cloud derived from a frame (e.g. in the form of one or more RGBD images) by the point cloud computation component 302, or a merged point cloud.

As noted, although a frame corresponds to a particular time instant, the underlying data from which the fame is derived may be captured over a (typically short) time interval, and transformed as necessary to account for the passage of time. So the fact that a frame corresponds to a particular time instant (e.g. denoted by a timestamp) does not necessarily imply the underlying data has all been captured simultaneously. Hence, the term frame encompasses point clouds received at time stamps different to the frame e.g. a lidar sweep that is captured over 100 ms is 'untwisted' into a single point cloud for a particular time instant (such as the time that the image was captured). The time series of frames 301 may also be referred to as a video segment (noting that the frames of the video segment need not be images and may for example be point clouds).

Each training example 321 comprises data of at least one frame in the video segment 301. For example, each training example may comprise (a portion and/or component of) an RGBD image of at least one frame or data of the point cloud of at least one frame.

Training is not the only application of the present annotation techniques. For example, another useful application is scenario extraction, where annotation is applied to 3D data in order to extract a scenario that can be run in a simulator. For example, the present annotation techniques may be used to extract traces for annotated objects (path and motion data) that allows their behaviour to be replayed in a simulator.

Figure 10:
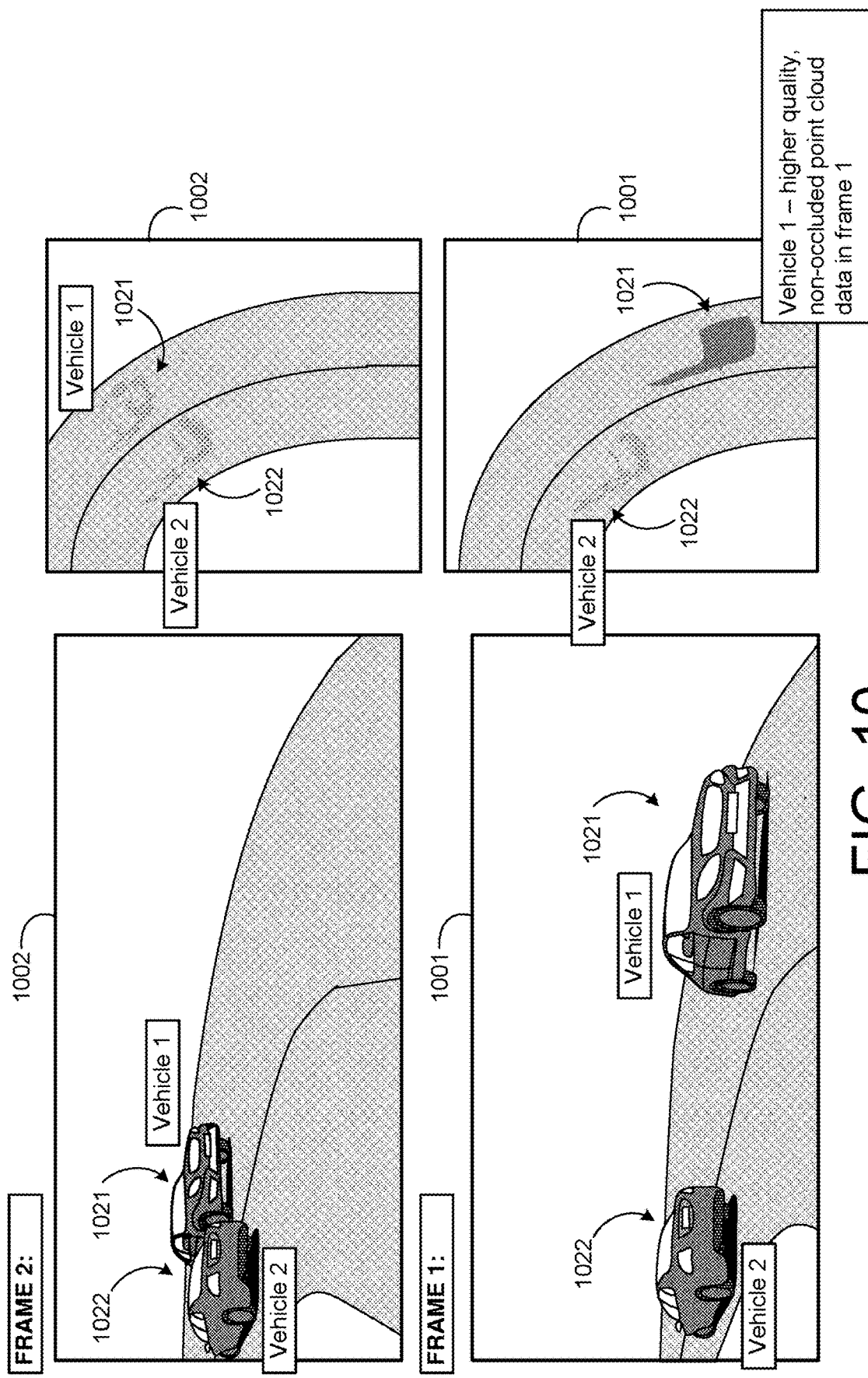
FIGS. 10 to 12C shows further examples of the annotation system GUI, and in particular show how a generated object model may be applied to create annotations in a time sequence of 3D road scenes.

FIG. 10 shows two example frames in the video sequence 301 as described in further detail below. The depicted frames are road scenes as captured by a travelling vehicle. The annotation system 300 is particularly well suited to annotating road scenes, which in turn can be used to effectively train structure detection components for use in autonomous vehicles. However, many of the annotation functions can also be applied equally usefully in other contexts.

A number of annotation functions provided by the annotation system 300 are briefly summarized.

Certain annotation functions are based on "object models", which are 3D models of objects i.e. pieces of structure (structure components) to be annotated. As noted, in the context of the annotation tool, the term object applies generally to any form of identifiable structure modelled as an object within the annotation tool (such as part of a real-world object, multiple real-world objects etc.). The term object is thus used in the following description without prejudice to that broad meaning.

An object model is determined as the intersect of a 3D bounding box with the point cloud of a frame (or frames). In other words, the 3D modelling component 310 derives an object model of an object to be annotated from one or more frames of the video sequence 301 itself: a 3D bounding box (or other 3D bounding object, such as a template) is placed around the points of the object in question in a particular frame and an object model is obtained by isolating the subset of points, within the point cloud of that frame, that lie within the volume of the 3D bounding box (or, equivalently, the intersection of the 3D bounding box and the point cloud). This inherently provides a location and orientation of the 3D bounding box relative to the 3D object model, which may be encoded as a reference point and orientation vector fixed in a frame of reference of the object model. This is described in further detail below with reference to FIGS. 9A and 9B.

This is achieved quickly by transforming all the points in the point cloud to align with the axis of the bounding box so a simple magnitude comparison can be used to determine if the point is enclosed. This can be implemented highly efficiently on a GPU (Graphics Processing Unit).

Once isolated as an object model in this manner, these points can be used, for example, to:

1. Generate a tight 2D bounding box for the object in question
2. Perform instance segmentation
3. Manually improve the pose of boxes in the distance Responsive noise filtering is achieved by sorting points by K neighbours in a fixed radius (using a 3D tree to first find the K neighbours).

The points may also be accumulated (or otherwise propagated) across frames in order to generate a more complete/dense object model. Improved noise filtering results can be attained with accumulated models, as it will be easier to separated isolated noise points form the points of the object itself as captured across multiple frames.

For example, a refined 3D annotation pose estimate can be obtained by fitting the model to the point cloud of other frame e.g. using an Iterative Closes Point (ICP) algorithm.

Model propagation can also provide improved instance segmentation for distant objects and possibly improved segmentations for nearby objects as well (e.g. in regions which lack depth data).

As well as generating annotations for training data, object models can also be used to augment training examples (i.e.

a form of "synthetic" training data). For example, an object may be artificially introduced into a training example and annotated to provide an additional knowledge base from which a structure detection component can learn. This can be used, for example, to create more "challenging" training examples (on which existing models perform poorly) which in turn can provide improved performance for more challenging inputs at inference (i.e. when the model is operational).

Expanding on item 3 listed above, 3D annotation data can, in turn, be generated automatically for a second frame by fitting the 3D object model to the point cloud of the second frame (second point cloud). Since the location and orientation of the 3D bounding box relative to the 3D object model is known, the location and orientation of the 3D bounding box relative to the second point cloud (i.e. in the frame of reference of the second point cloud) can be determined automatically by fitting the 3D object model to the second point cloud. This is described in further detail below with reference to FIGS. 1A-D. This is one example of the way in which a 3D object model from one frame can be "propagated" into a second frame in order to generate annotation data automatically or semi-automatically for the second frame. An underlying assumption is that the object can be treated as a rigid body.

An object model can also be propagated from one frame into a second frame based on a 3D bounding box that has been manually placed or adjusted in the second frame. This provides a visual aid to assist the annotator in placing/adjusting the 3D bounding box in the second frame. In this case, a human annotator sets the location and/or orientation of the 3D bounding box in the second frame. This, in turn, is used to locate and/or orientate the 3D object model in the second frame, based on the fixed location and orientation of the object model relative to the 3D bounding box. As the annotator tweaks the pose (orientation and/or location) of the 3D bounding box in the second frame, the orientation/location of the 3D object model exhibits matching changes to maintain a fixed location and orientation relative to the 3D bounding box. This provides an intuitive way for the annotator to tweak the location/orientation of the 3D bounding box in the second frame in order to align the 3D object model with the actual object to the extent it is visible in the second frame: the annotator can see if the 3D model does not quite line up with the actual object in the second frame and tweak the 3D bounding box as necessary until it does. This may be significantly easier than trying to visually aligning the 3D bounding box directly with the object in question, particularly if the object is partially occluded. This is described in further detail later with reference to FIGS. 11E-G.

These two forms of object propagation are not mutually exclusive: initially, a 3D bounding box may be automatically located and oriented in the second frame by fitting the 3D object model to the point cloud of the second frame, and the annotator may then manually tweak the 3D bounding box to minimize any visible discrepancy between the 3D model and the actual object in the second frame (thereby fine-tuning the location/orientation of the 3D bounding box in the second frame).

The ability to generate and propagate models into different frames may be referred to herein as an "x-ray vision feature" (this name is derived from a specific use case in which a model from another frame(s) is used to "fill in" a partially occluded object region, although model propagation may be applied more generally as described herein).

Expanding on items 1 and 2 listed above, 2D annotation data for an RGBD image (or for e.g. the colour component of that image) is generated by projecting the 3D object model into the image plane of that image. In the simplest case, the subset of the point cloud within a given frame is isolated as above, and that subset of points is projected into the image plane and processed to generate 2D annotation data. The 2D annotation data can for example be in the form of a segmentation mask or 2D bounding box fitted to the projected points. There are also circumstances where it may be useful to generate 2D annotation data in this way but based on a projection of a 3D model propagated from another frame in the manner outlined above. The generation of 2D annotation data is described in further details below with reference to FIGS. 12A-C.

To further assist the annotator, a 3D road model provided by the road modelling component 304 may be used to guide the placement of 3D bounding boxes when annotating road scenes. This is described in detail with reference to FIGS. 8A-E.

First, some useful context to the described embodiments will be described.

Figure 4:
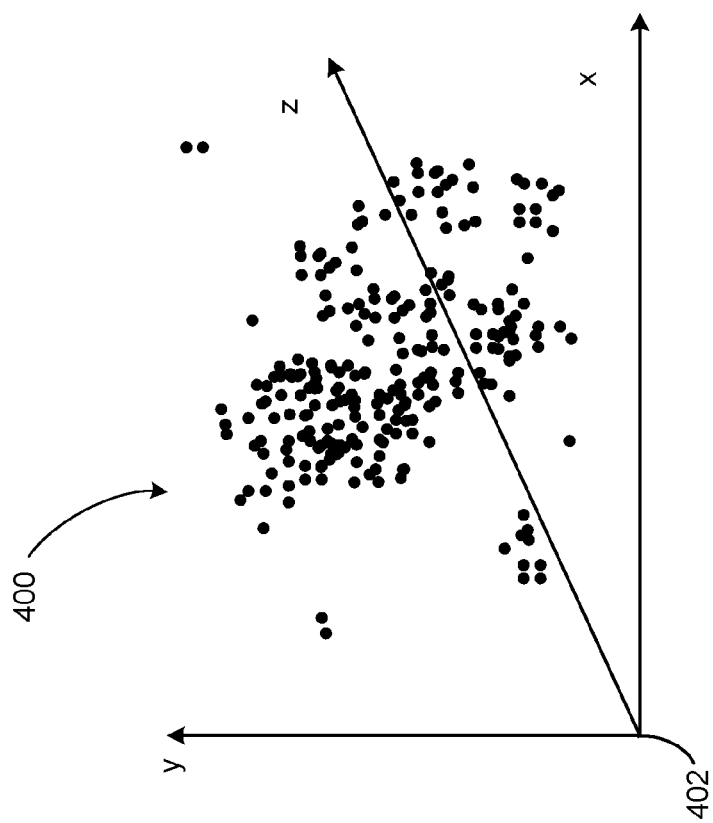
FIG. 4 shows a schematic perspective view of a frame in the form of a point cloud.

FIG. 4 shows a highly schematic perspective representation of a point cloud 400, which is a set of 3D spatial points in a defined frame of reference. The frame of reference is defined by a coordinate system and an origin 402 of the coordinate system within "3D annotation space". In the present example, the frame of reference has a rectangular (Cartesian) coordinate system such that each point of the point cloud is defined by a triplet of cartesian coordinates (x,y,z).

A number of examples are described herein with reference to a "stereo" point cloud, which is to say a point cloud derived from one or more stereo depth maps (although, as noted, the annotation system 300 is not limited in this respect and can be applied to any form of point cloud).

Figure 5:
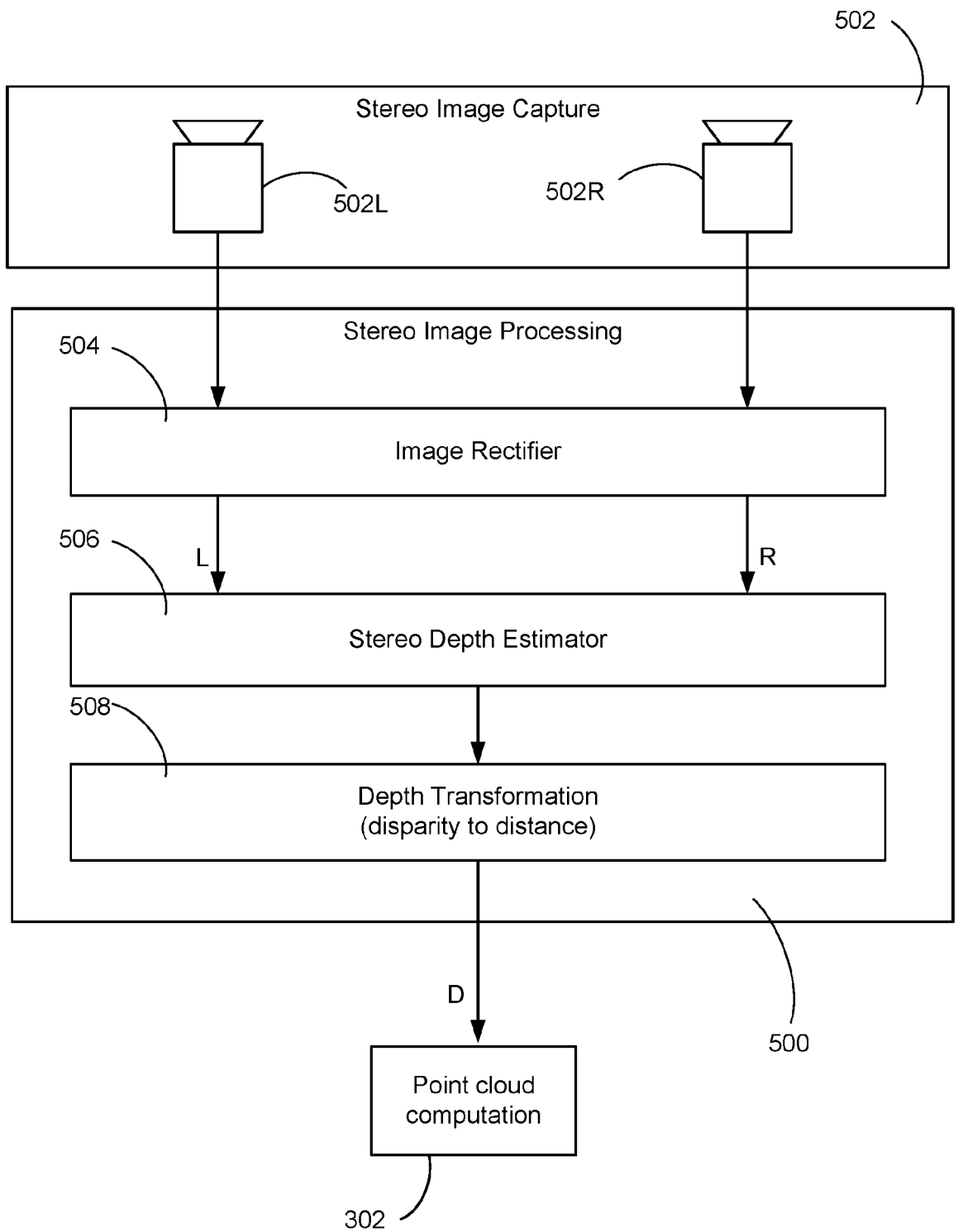
FIG. 5 shows a block diagram of a stereo image processing system.

FIG. 5 shows a highly schematic block diagram of a stereo image processing system 500. The stereo image processing system 500 is shown to comprise an image rectifier 504, a depth estimator 506 and a depth transformation component 508.

The stereo image processing system 500 is shown having inputs to receive left and right images L, R which together constitute a stereo image pair. A stereo image pair consists of left and right images captured simultaneously by left and right optical sensors (cameras) 502L, 502R of a stereo camera system 502. The cameras 502L, 502R have a stereoscopic arrangement, in which the cameras are offset from each other with overlapping fields of views. This mirrors the geometry of human eyes which allows humans to perceive structure in three-dimensions.

A depth map D, as extracted from the left-right image pair L,R, is shown to be provided as an output of the stereo image processing system 500. The depth map D assigns, to each pixel (i,j) of a "target" image of the stereo image pair, an estimated depth $d_{ij}$. In the present example, the target image is the right image R, hence each pixel of the right image R is assigned an estimated depth. The other image—in this case, the left image L—is used as a reference image. The stereo depth map D can for example be in the form of a depth image or image channel, in which the value of a particular pixel in the depth map is the depth assigned to the corresponding pixel of the target image R.

Figure 6:
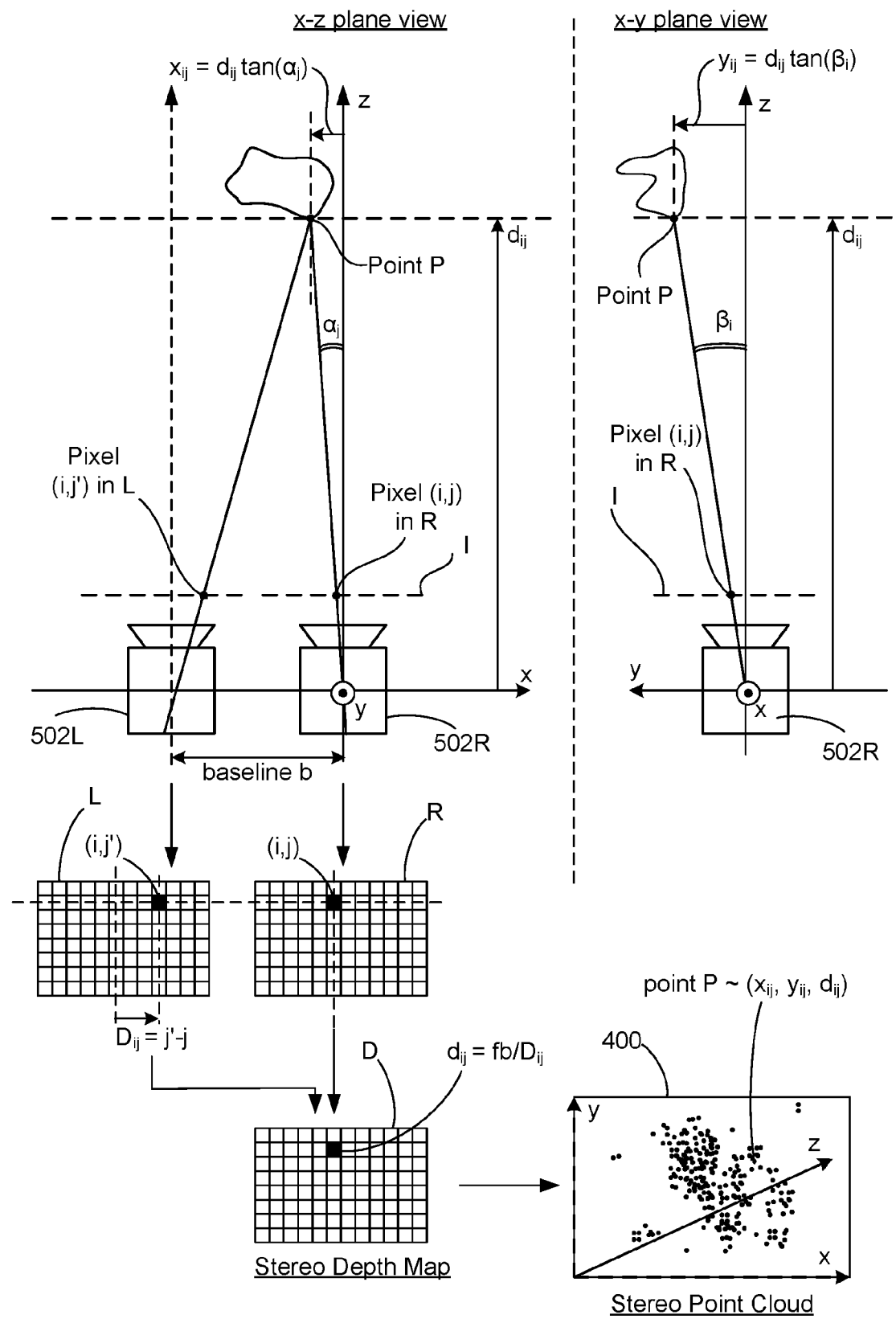
FIG. 6 schematically illustrates certain principles of stereo depth extraction.

With reference to FIG. 6, pixel depth is estimated by the depth estimator 506 applying the principles of stereo imaging.

The top part of FIG. 6 shows schematic views of the image capture system 502 to illustrate the basic principles of stereo imaging. The left-hand side shows a plan view (in the x-z plane) of the cameras 502L, 502R, which are shown to be horizontally separated (i.e., in the x direction) from each other by a distance b (the baseline). The right-hand side shows a side-on view (in the x-y plane) in which only the right camera 502R is visible due to the fact that the cameras 502L, 502R are substantially aligned in the vertical (y) direction. It is noted that, in the present context, the terms vertical and horizontal are defined in the frame of reference of the camera system 502, i.e. vertical means the direction along which the cameras 502L, 502R are aligned, irrespective of the direction of gravity.

By way of example, pixel (i,j) in the left image L and pixel (i,j') in the right image R are shown to correspond to each other in that they each correspond to substantially the same real-world scene point P. Reference sign I denotes the image plane of the captured images L, R in which the image pixels are considered to lie. Due to the horizontal offset between the cameras 502L, 502R, those pixels in the left and right images exhibit a relative "disparity", as illustrated in the lower part of FIG. 6. The lower part of FIG. 6 shows a schematic representation of rectified left and right images L, R as captured by the cameras 502L, 502R and the depth map D extracted from those images. The disparity associated with a given pixel (i,j) in the target image R means the offset between that pixel and the corresponding pixel (i,j') in the reference image L, which is caused by the separation of the cameras 502L, 502R and depends on the depth (distance from the camera 502R along the z axis) of the corresponding scene point P in the real-world.

Thus, depth can be estimated by searching for matching pixels between the left and right images L,R of a stereo image pair: for each pixel in the target image R, a search is performed for a matching pixel in the reference image L. The search for matching pixels can be simplified by an inherent geometric constraint, namely that, given a pixel in the target image, the corresponding pixel will be appear in the reference image on a known "epipolar line". For an ideal stereoscopic system with vertically-aligned image capture units, the epipolar lines are all horizontal such that, given any pixel (i,j) in the target image, the corresponding pixel (assuming it exists) will be vertically aligned i.e. located in the reference image L in the same pixel row (j) as the pixel (i,j) in the target image R. This may not be the case in practice because perfect alignment of the stereo cameras is unlikely. However, image rectification is applied to the images L,R, by the image rectifier 504, to account for any misalignment and thereby ensure that corresponding pixels are always vertically aligned in the images. Hence, in FIG. 5, the depth estimator 506 is shown to receive, from the image rectifier 504, rectified versions of the left and right images L,R from which the depth map may be extracted. Matching can be evaluated based on relative intensities, local features etc. A number of stereo depth extraction algorithms may be applied to estimate the pixel disparities, such as Global Matching, Semi-Global Matching and Local Matching algorithms.

In a real-time context, Semi-Global Matching (SGM) generally provides an acceptable trade-off between accuracy and real-time performance.

In the present example, it is assumed that, in the pixel-matching search, pixel (i,j) in the target image R is correctly found to match pixel (i,j') in the reference image L. Hence, the disparity assigned to pixel (i,j) in the right image R is $D_{ij} = j' - j$.

In this manner, a disparity is assigned to each pixel of the target image for which a matching pixel can be found in the reference image (this will not necessarily be all of the pixels in the target image R: there will generally exist a region of pixels at one edge of the target image which are outside of the field of view of the other camera and thus have no corresponding pixels in the reference image; the search may also fail to find a match, or depth values may be pruned if they do not meet certain criteria).

The depth of each such target image pixel is computed initially in disparity space. Each disparity can, in turn, be converted into units of distance using knowledge of the camera intrinsics (focal length f and baseline b) as:

$$d_{ij} = \frac{bf}{D_{ij}}$$

where $d_{ij}$ is the estimated depth of pixel (i,j) in the target image R in units of distance, i.e. the distance between the camera 502R and the corresponding real-world point P along the optical axis of the stereo camera system 502 (z-axis), and $D_{ij}$ is the disparity assigned to pixel (i,j) of the target image R in the pixel-matching search. Hence, in FIG. 5, the depth transformation component 508 is shown to receive the output of the depth extraction component 506 in disparity space and transforms that output into distance space as above in order to provide the depth map D in units of distance. In the lower part of FIG. 6, pixel (i,j) of the depth map is shown to have a value $d_{ij}$, which is the estimated depth, in units of distance, assigned to pixel (i,j) of the target image R.

As noted, in the present example, the right image R is the target image and the left image L is used as the reference image. However, in general, either of the two images can be the target image, with the other used as the reference image. Which image is selected as the target image may be context dependent. For example, in an autonomous vehicle context, in which a stereo camera pair captures images of the road in front of the vehicle, images captured by the camera closest to the centre-line of the road may be used as target images (i.e. right images for left-hand drive vehicles, and left images for right-hand drive vehicles).

Returning briefly to FIG. 4, the origin of the coordinate system 402 corresponds to the location of the optical sensor 502R which captured the target image R at the time the target image R was captured (in this case, the right camera 502R). The z-axis lies parallel to the optical axis of the camera 502R and the x and y axis are aligned, respectively, with the pixel row and column directions of the target image R (i.e. pixel rows, denoted by index i, lie parallel to the x-axis and pixel columns, denoted by index j, lie parallel to the y-axis).

The point cloud 400 can be computed by the point-cloud computation component 302 from the stereo depth map D based on knowledge of the field of view of the camera 502R. As shown in the top-part of FIG. 6, pixels in column i of the target image R correspond to a set of angular directions within the camera's field of view defined by angle $\alpha_j$ in the x-z plane. Similarly, pixels in row j of the target image R correspond to a set of angular directions within the camera's field of view and defined by angle $\beta_j$ in the x-y plane. Hence, pixel (i,j) of the target image R corresponds to the angular direction defined by the angle pair $(\alpha_j, \beta_i)$.

Once the depth of pixel (i,j) is known, the location of the corresponding real-world point in 3D space—denoted by 3D spatial point $(x_{ij}, y_{ij}, z_{ij})$—can thus be computed based on that depth $d_{ij}$ and the angular direction $(\alpha_j, \beta_i)$ to which that pixel corresponds. The angles $\alpha_j$ and $\beta_i$ are defined relative to the z-axis in the present example, hence:

$$x_{ij} = d_{ij} \tan \alpha_j;$$

$$y_{ij} = d_{ij} \tan \beta_j;$$

$$z_{ij} = d_{ij}.$$

More generally, the x and y components are determined as a function of the pixel depth and the angular direction to which that pixel corresponds.

As shown, the 3D spatial point $(x_{ij}, y_{ij}, z_{ij})$ is a point within the point cloud 400 which corresponds to pixel (i,j) in the target image R.

In addition, each point in the point cloud may be associated with colour information derived from the target image R itself. For example, for an RGB target image, each point in the point cloud may be associated with an RGB value based on the corresponding pixel of the target image R.

Returning to FIG. 3, the point cloud computation component 302 is shown having an input to receive the RGBD images 301 which it processes as described above in order to determine the corresponding 3D point cloud 400 depicted in FIG. 6. A point cloud can be determined from a single image or from multiple images which are merged in a common frame of reference.

The 3D annotation generator 308 allows the annotator to place (i.e. locate, orientate and size) a 3D bounding object in the frame of reference of the point cloud 400 to be annotated. The 3D bounding object takes the form of a 3D bounding box (cuboid) in the following examples, however the description applies equally to other forms of 3D bounding object such as 3D object templates etc. This can be a manual or semi-automatic process.

Alternatively, all of the steps performed by the annotator can alternatively be implemented automatically, as describe later The annotator places the 3D bounding box via the UI 320 of the annotation system 300. Hence, the 3D annotation generator 308 is shown having a first input coupled to the 320 of the annotation system 300 for receiving user inputs for that purpose. Via the UI 320, the annotator can manually place a 3D bounding box so as to bound a desired structural element (such as a vehicle, cyclist, pedestrian or other object) within the point cloud 400. This is a form of 3D annotation which can be used, for example, to train a 3D structure detection component in the manner outlined above, and which is provided for that purpose as part of the 3D annotation data 309.

The road modelling component 304 is also shown having an input for receiving at least the colour components of the RGBD images, which it processes in order to determine a 3D road model. It is assumed for this purpose that the series of images 301 has been captured by a vehicle equipped with stereo camera equipment (as in FIG. 2) when travelling along a road, such that a 3D model of the road along which the vehicle travelled can be reconstructed based on the series of captured images. To do so, the road modelling component 304 applies the methodology set out in International Patent Application No. No PCT/EP2019/056356, which is incorporated herein by reference in its entirety. This is based on "structure from motion" (SfM) processing which is applied to the series of images in order to reconstruct the 3D path of the vehicle which captured the images (ego path). This, in turn, is used as a basis for extrapolating the 3D surface of the road along which the vehicle travelled. This is based on 2D feature matching between the images of the video sequence 301.

The road model may also be determined in alternative ways e.g. point cloud fitting e.g. the ego path could be based on 3D structure matching applied to the depth maps or point clouds, and/or using high accuracy satellite positioning (e.g. GPS). Alternatively, an existing road model may be loaded and frames may be localized, as needed, inside the existing road model.

The aforementioned reference uses the 3D road model extrapolated from the vehicle's own path to efficiently generate 2D annotation data for annotating the structure of the road in the original images. In the present context, this is extended to allow a 3D bounding box to be placed efficiently around other objects on the road across multiple frames in the video segment 301, such as other vehicles, cyclists etc., by assuming that other road users generally follow the shape of the road over time.

Hence, the 3D annotation generator 308 is shown having a second input coupled to an output of the 3D road modelling component 304. The 3D annotation generator 308 uses the 3D road model as a reference to allow the annotator to "bind" a 3D bounding box to the 3D road model. That is, to move a 3D bounding box in a way that is controlled by the 3D road model, which is particularly useful for annotating other road users such as vehicles, cyclists etc. For example, the annotator may be provided with options to move a 3D bounding box along the road, with the 3D bounding box being automatically re-orientated to match the shape and slope of the road, or across the road perpendicular to its current direction. This is described in further detail below.

The 3D annotation data 309 is also shown to be provided back, as third input, to the 3D annotation component 309. This represents the fact that 3D annotation data defined with respect to one frame can be used to automatically generate 3D annotation data for another frame. This is described in further detail later.

The rendering component 306 is shown having inputs connected to the outputs of the point cloud computation component 302, the 3D road modelling component 304 and the 3D annotation generator 308, as well as an input for receiving the RGBD images. The rendering component 306 renders the 3D annotation data 309 in a way that can be meaningfully interpreted by the human annotator, within the annotation interface.

Figure 7:
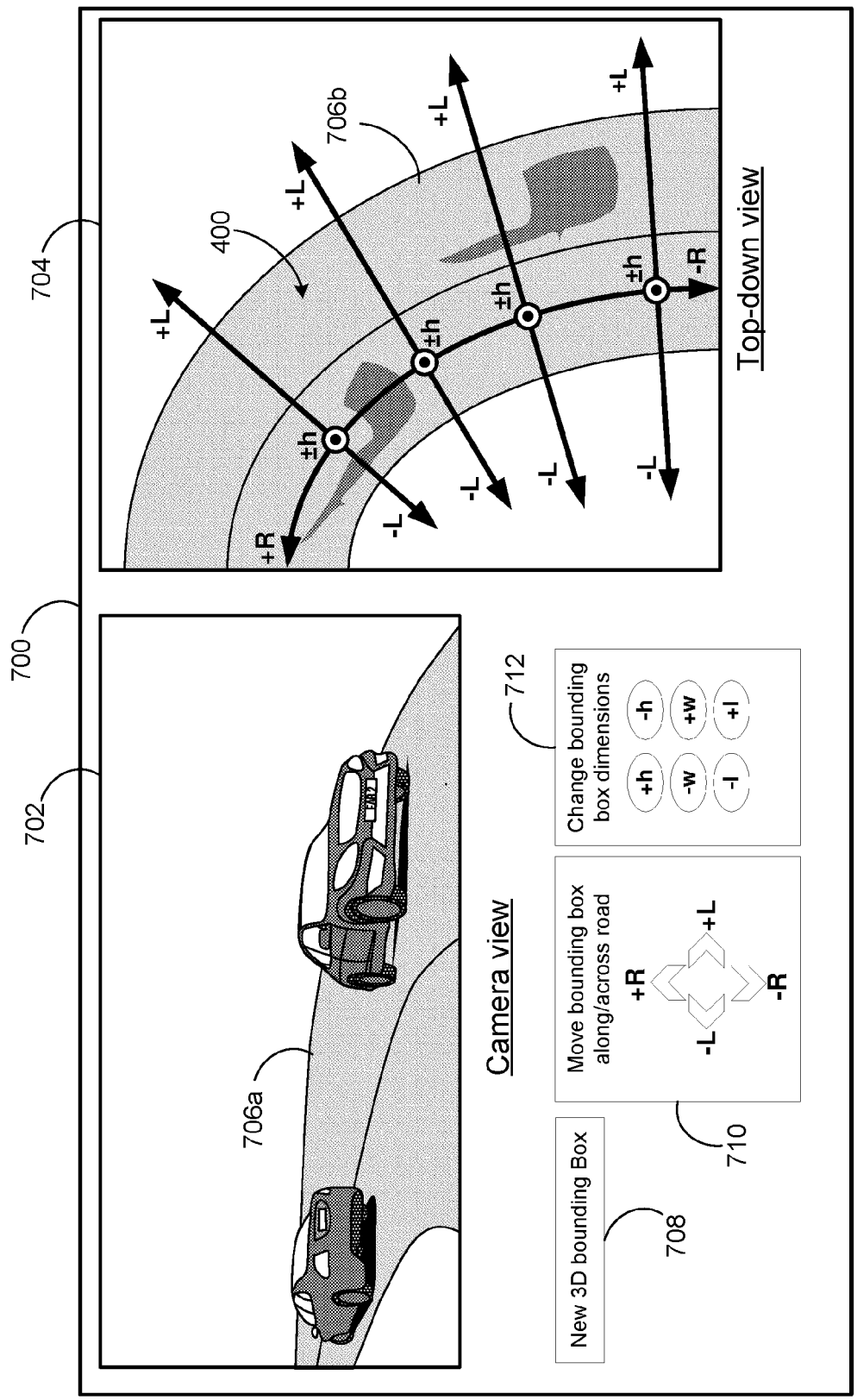
FIGS. 7-8E shows various examples of a graphical user interface (GUI) rendered by an annotation computer system when annotating a time sequence of 3D road scenes.

1. Annotation Interface:

FIG. 7 shows a schematic illustration of an example annotation interface 700 which may be rendered by the rendering component 306 via the UI 320.

Within the annotation interface 700, the colour component of an RGBD image 702 (current frame) is displayed on the left-hand side. On the right-hand side, a top-down view 704 of the point cloud 400 of that frame is displayed.

In addition, a projection 706a of the 3D road model into the image plane of the RGBD image is overlaid on the displayed image 702. Likewise, a projection 706b of the 3D road model into the top-down view is displayed overlaid on the top-down view of the point cloud 400.

A selectable option 708 is provided for creating a new 3D bounding box for the current frame. Once created, selectable options 710 and 712 are provided for moving and re-sizing the bounding box respectively.

The options 710 for moving the bounding box include options for moving the bounding box longitudinally along the road in either direction (±R, as shown in the top-down view on the right-hand side), and laterally across the road the road (±L).

The options 712 for re-sizing the bounding box include options for changing the width (w), height (h) and length (l) of the bounding box.

Although depicted as displayed UI elements, the associated inputs could alternatively be provided using keyboard shortcuts, gestures etc.

An example workflow for placing a 3D annotation object will now be described. As will be appreciated, this is just one example of the way in which the annotator can utilize the annotation functions of the annotation interface 700.

Figure 8A:
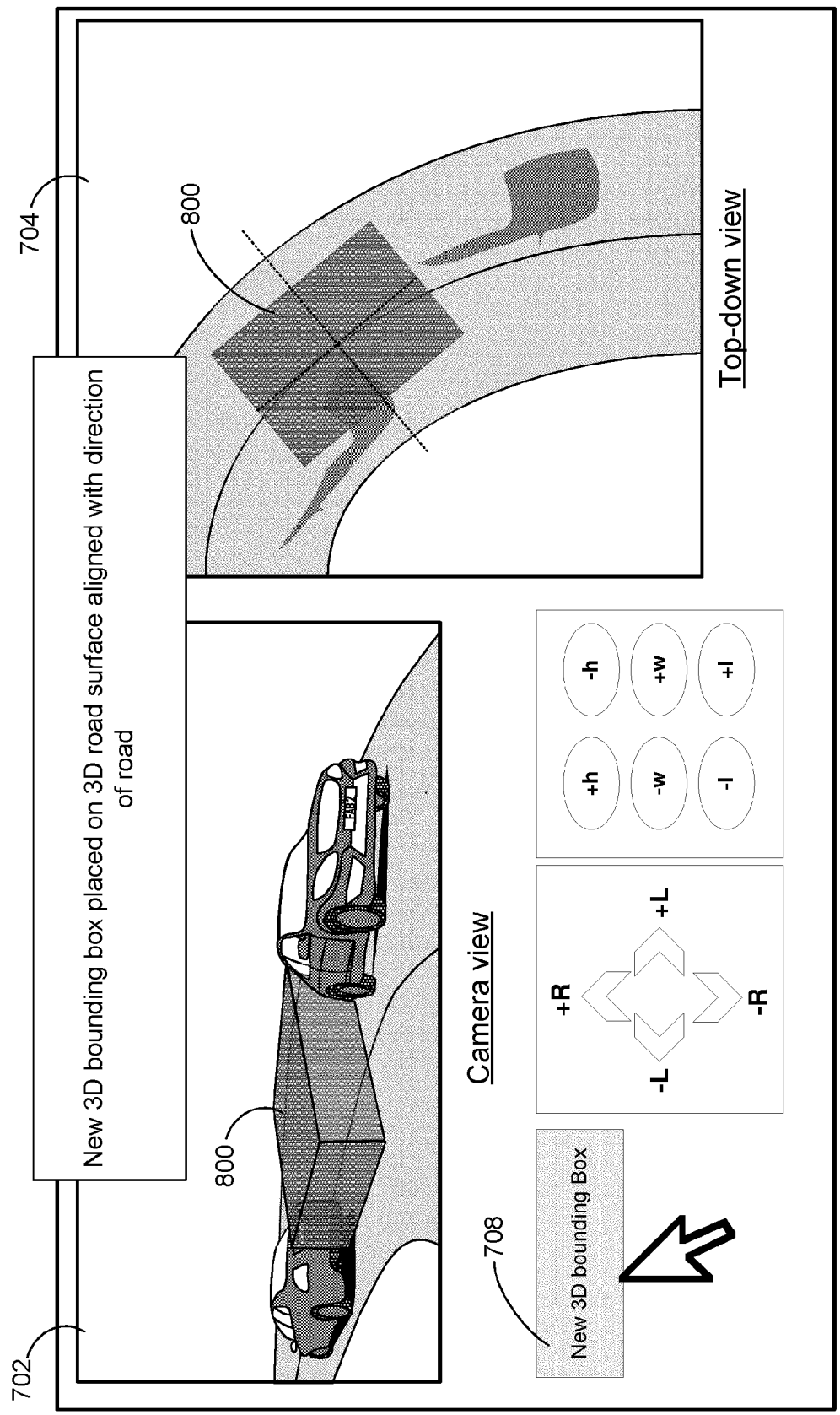

FIG. 8A shows the annotation interface once a new bounding box 800 has been created. The bounding box 800 is placed at an initial location in 3D annotation space at road height and oriented parallel to the direction of the road at that location (as captured in the 3D road model). To assist the annotator, the 3D bounding box 800 is projected into both the image plane of the displayed image 702 and the top-down view 704.

Figure 8B:
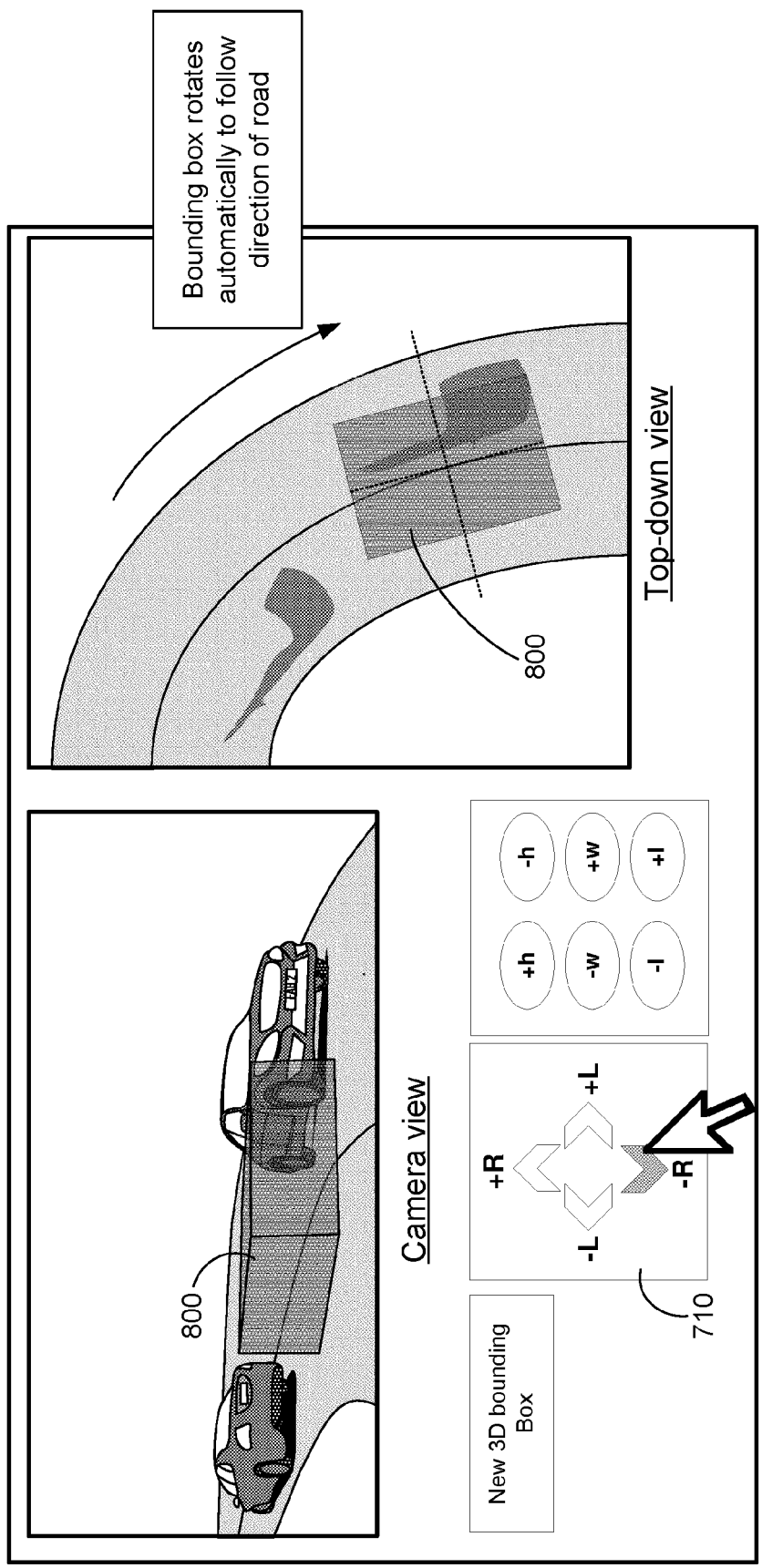

As illustrated in FIG. 8B, as the annotator moves the bounding box 800 along the road, in the +R direction, the bounding box 800 is automatically re-orientated so that it remains parallel with the direction of the road. In this example, the aim of the annotator is to manually fit the bounding box 800 to the vehicle that is visible in the right half of the image and faces into the image plane.

Figure 8C:
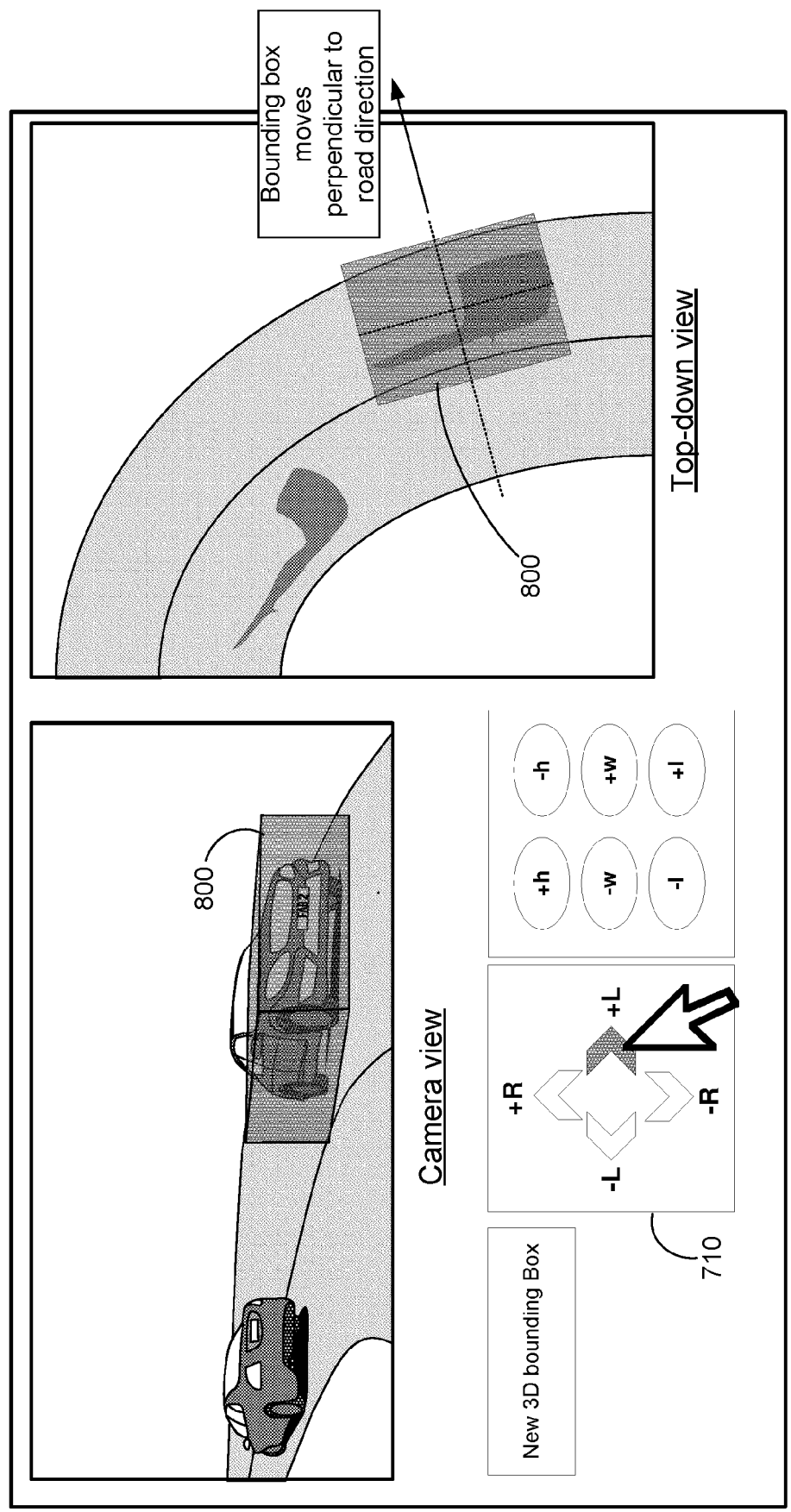

As illustrated in FIG. 8C, once the annotator has moved the bounding box 800 to the desired location along the road, he then moves it laterally, i.e. perpendicular to the direction of the road, to the desired lateral location—in the +L direction in this example.

Figure 8D:
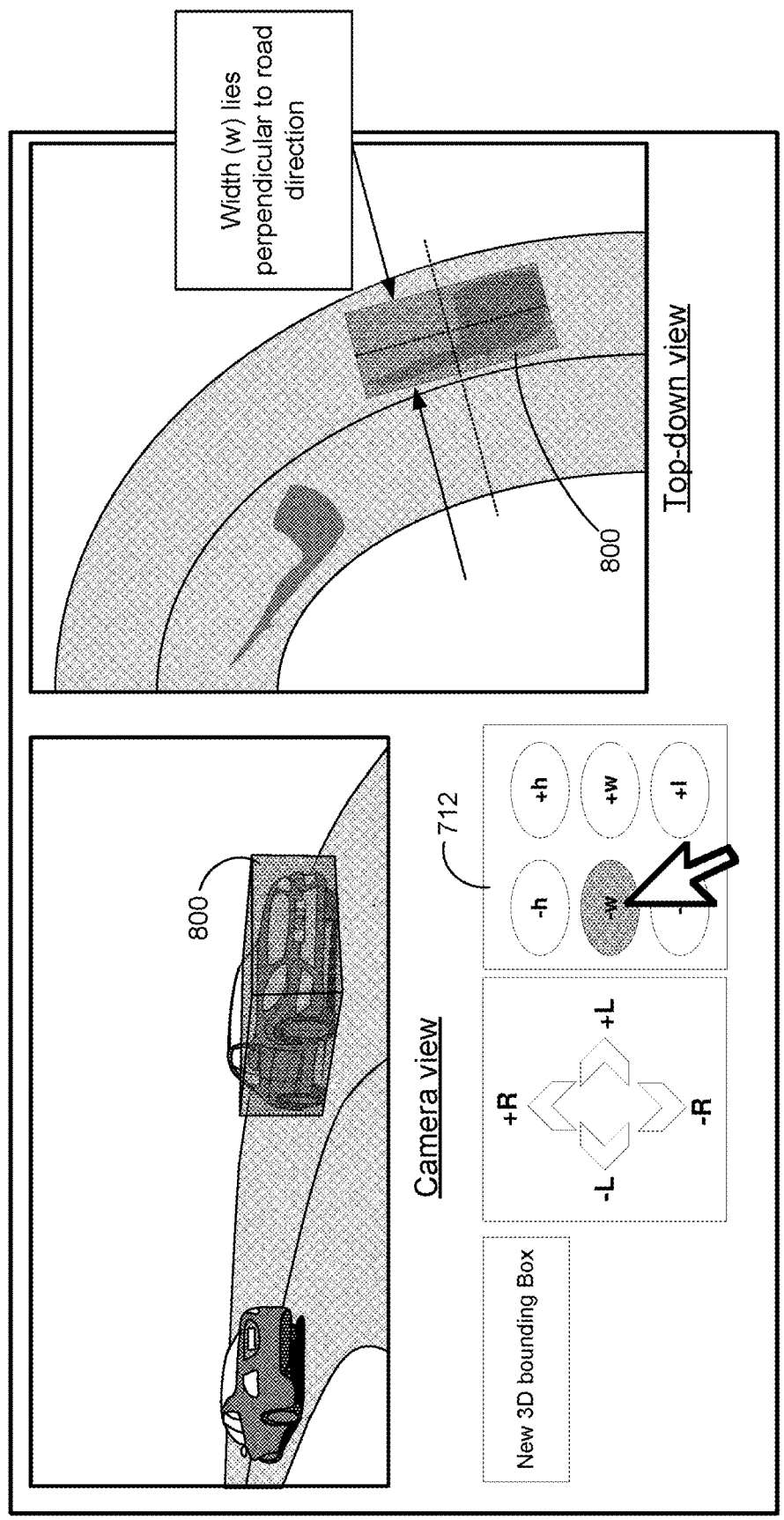
Figure 8E:
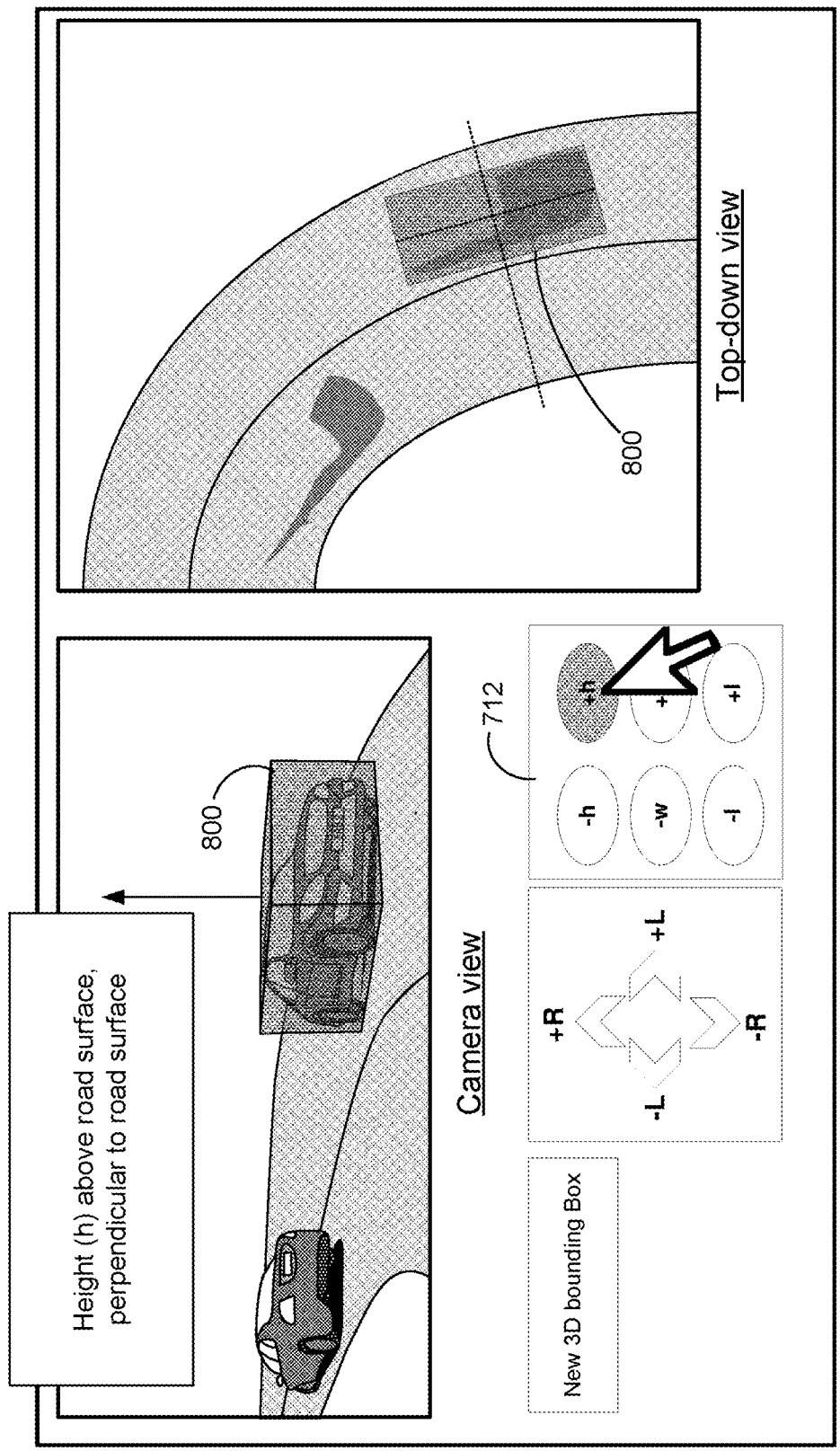

As illustrated in FIGS. 8D and 8E respectively, the annotator then adjusts the width (decreasing it in this case, denoted by "−w") and height (increasing it, denoted by "+h") of the bounding box 800 as appropriate. It happens that no length adjustments are required in this example, but the length of the bounding box could be adjusted as needed in the same way. The width dimension of the bounding box 800 remains parallel to the direction of the road at the location of the bounding box 800, and the height dimension remains perpendicular to the surface of the road at the location of the bounding box 800.

The above example assumes that the bounding box 800 remains bound to the 3D road model as it is adjusted. Although not depicted, the annotation interface may also allow "free" adjustments, which are not constrained by the 3D road model, i.e. the annotator may also be able to freely move or rotate the bounding box 800 as needed. This may be useful for example when annotating vehicles whose behaviour deviates at times from the assumed behaviour (e.g. during a turn or lane change).

2. 3D Object Modelling:

Returning to FIG. 3, the object modelling component 310 implements a form of object modelling based on the output of the 3D annotation generator 308. As indicated, an object model is a 3D model of a desired piece of 3D structure (modelled as an object) created by isolating a subset of a point cloud within a 3D bounding object defined in the frame of reference of the point cloud (or, equivalently, determined as the intersection of the bounding box with the point cloud). The modelled object may for example correspond to a single real-world object (such a vehicle, cyclist or pedestrian to be annotated for the purpose of training a structure detection component for use in an autonomous vehicle), a portion of a real-world object or a group of real-world objects.

Figure 9A:
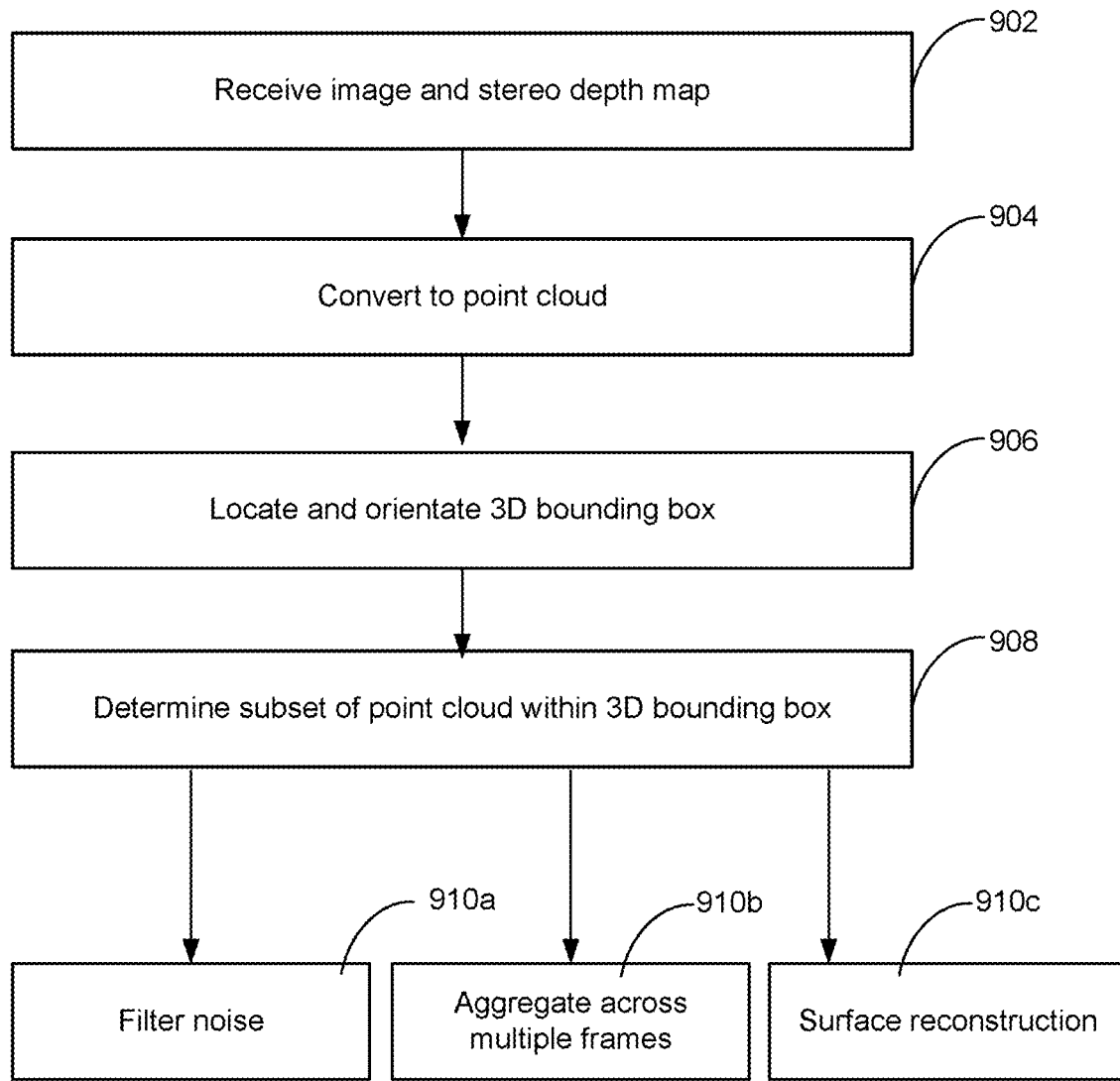
FIG. 9A shows a flow chart for a method of generating an object model and FIG. 9B shows a schematic illustration of the method applied to a point cloud.

FIG. 9A shows a flowchart for a method of creating an object model from a point cloud.

At step 902 a point cloud, which captures structure to be modelled, is received.

At step 904, a 3D bounding object, in the form of 3D bounding box (cuboid) is manually fitted to a piece of desired structure (object) captured in the 3D point cloud.

In the present example, the 3D bounding box is adapted manually to fit the structure based on user inputs provided at the user interface 320, e.g. in the manner described above with reference to FIGS. 8A-E. These inputs are provided by the human annotator whose aim is to achieve the tightest possible fit of the 3D bounding box to the desired piece of structure.

Alternatively, the bounding box can be placed automatically. For example, the bounding box may be placed automatically based on a bounding box defined for another frame in the manner described above.

As another example, the bounding box could be automatically generated by a 3D structure detection component, such as a trained neural network.

Once the 3D bounding box has been placed, at step 906, a subset of the 3D point cloud in the 3D bounding box is determined. The 3D bounding box is defined in the frame of reference of the point cloud and it is therefore possible to meaningfully determine which points of the 3D point cloud lie inside of the internal volume of the 3D bounding box. For the most part, such points will correspond to the desired piece of structure. As indicated above, this can be computed efficiently on a GPU by transforming the points into a coordinate system having axes which lie perpendicular to the faces of the bounding box.

Figure 9B:
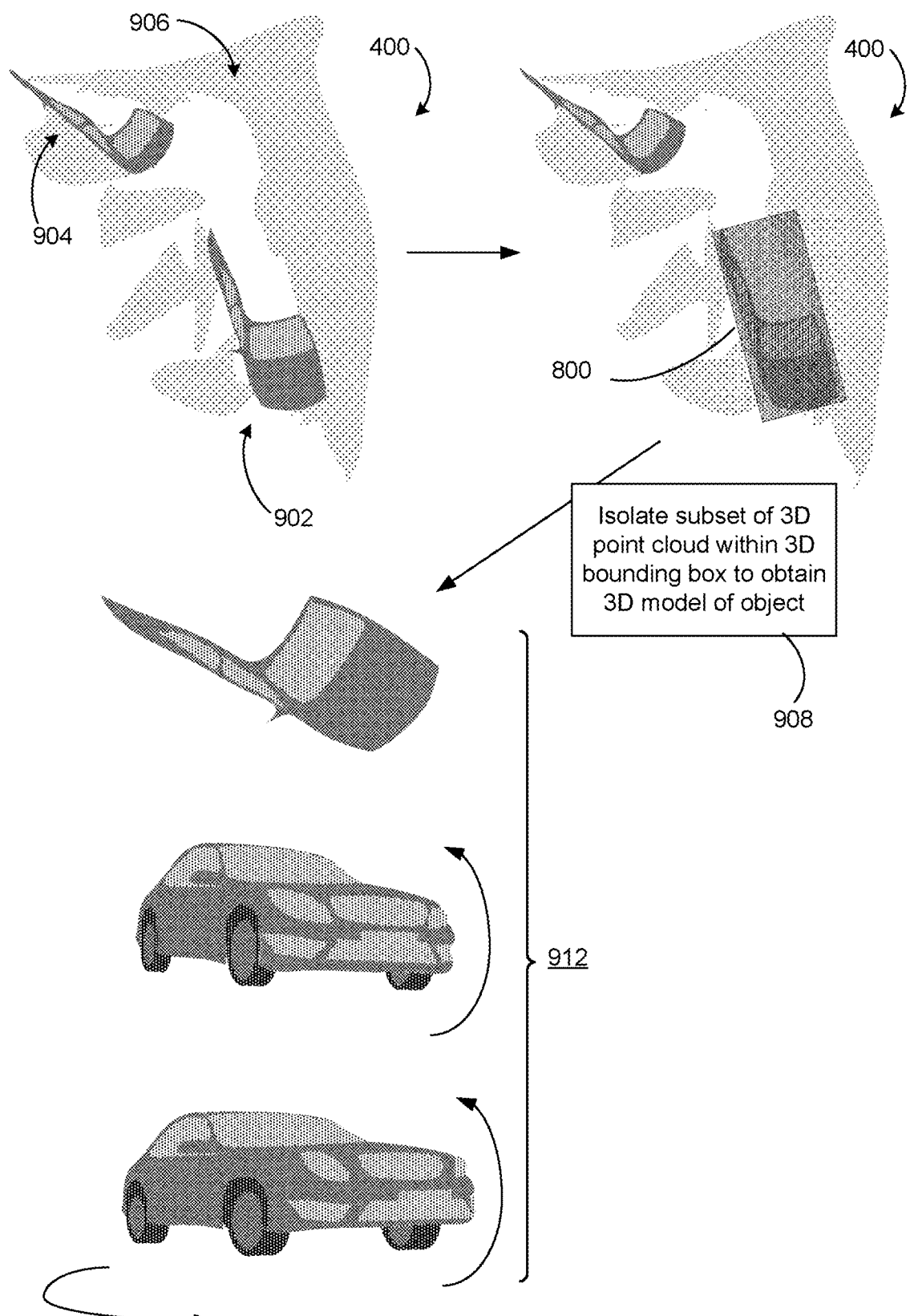

FIG. 9B shows a schematic illustration of step 908 of the method. In this example, a point cloud 400 has captured respective spatial points from first and second vehicles, denoted by reference numerals 902 and 904 respectively. In addition, points 906 of the surrounding road structure have also been captured. By placing a tightly-fitted 3D bounding box 800 around the second vehicle, to the extent it is visible within the point cloud 800, the subset of points within the 3D bounding box 800 may be isolated to provide a 3D model 912 of the second vehicle 902. It is generally significant easier for an annotator to define a 3D bounding box around the desired structural element (second vehicle in this case) than it is to individually select the subset of points belonging to that structural element.

Returning to FIG. 9A, additional processing may be applied to the object model in order to refine and improve it.

For example, noise filtering may be applied (shown at step 910a) to the determined subset of points. The purpose of the noise filtering is to filter out "noise points", i.e. points which are unlikely to actually correspond to the desired piece of structure. Such points can, for example, arise due to noise in the underlying sensor measurements from which the 3D point cloud is derived. The filtering can for example be K nearest neighbour (K-NN) filtering, to remove points that are neighboured by an insufficient number of other points (e.g. a point may be removed if the number of points within a defined radius of that point is below a threshold). The filtering is applied according to the filtering criteria which are manually adjustable via the user interface 412 (for example, the radius and/or threshold may be adjustable). More generally, one or more parameters (such as filtering parameters) of the modelling process may be manually configurable, which is represented in FIG. 3 by an input from the UI 320 to the object modelling component 310.

As another example, object models may be aggregated across multiple frames (shown at step 910*b*) in order to build an aggregate object model.

In this regard, it is noted that the object modelling component 310 is capable of building both "single-frame" and "aggregate" object models.

A single-frame object model means an object model derived from sensor data captured at a single time instant, i.e. from a single frame in the above sense. This would include an object model derived from a single point cloud, but also an object model derived from multiple point clouds captured simultaneously. For example, multiple RGBD images may be captured simultaneously by multiple pairs of stereo camera pairs, and merged to provide a single merged point cloud.

A multi-frame object model means an object model derived from sensor data captured at multiple time instants, for example from RGBD images captured at different time instants, and in each of which the object to be modelled is at least partially captured. An aggregate object model can be determined from two or more point clouds, corresponding to different time instants, by isolating a subset of each point cloud in the matter described above, and then aggregating the point cloud subsets in a common frame of reference. This can provide a denser object model and can also account for partial occlusion of the object to be modelled by effectively "filling in" a portion of the object that is occluded in one point cloud using points from another point cloud captured at a different time instant.

To generate 2D or 3D annotation data, an object model may be applied to the frame or frames from which it is derived, in order to facilitate the generation of annotation data for that or those frame(s).

However, the object modelling component 310 is also capable of propagating object models between frames. An object model that has been created using data from a point cloud of one frame is said to be propagated when it is applied to another frame (such that point cloud data is effectively propagated from one frame into another frame) in order to generate annotation data for that other frame. Both single-frame and aggregate object models may be propagated in this sense.

Object models may also be propagated for the purpose of generating augmented training examples, as set out above.

Reference numeral 910*c* in FIG. 9A denotes an optional surface reconstruction step, in which a surface mesh or other 3D surface model is fitted to the selectively points. Such a 3D surface model can be fitted to points selectively extracted from a single frame (single frame object model) or from multiple frames (aggregate object model). This effectively "smooths" the point cloud subset (single frame or aggregate) into a continuous surface in 3D space.

Known surface fitting algorithms can be used for this purpose, which may for example be based on a signed distance function (SDF), so as to minimize a measure of distance between the extracted points and a reconstructed 3D surface. It will that be appreciated that, where this description refers to an object model. that object model may comprise a 3D surface model generated in this manner.

FIG. 10 depicts two example frames denoted by reference numerals 1001 (frame 1) and 1002 (frame 2) respectively. First and second objects, which are vehicles, are visible in both frames and are denoted by reference numerals 1021 (vehicle 1) and 1022 (vehicle 2) respectively. For each frame, both a camera view (in the image plane of the frame in question) and a top-down view (of the associated point cloud) are depicted, on the left and right hand sides respectively.

In frame 2, vehicle 1 is partially occluded by vehicle 2. In frame 1, which in this example has been captured at a later time instant, vehicle 1 is no longer occluded.

It can also be seen that, in frame 2, both vehicles are relatively distant. As a consequence, it is expected that the point cloud data captured for each vehicle in frame 2 (i.e. the number of points within the associated point cloud that correspond to the vehicles) will be relatively low, as depicted schematically in the top-down view for frame 2. The point cloud data for distant objects will also generally be noisier and of lower accuracy. A factor in this is that, due to the inverse relationship between disparity and distance, a given error in disparity space translates to a greater error in distance space for more distant points.

However, in frame 1, vehicle 1 has moved significantly closer to the camera. Hence, as depicted schematically in the top-down view for frame 1, the point cloud data for vehicle 1 in frame 1 is generally denser and of higher quality (lower error, less noise etc.). Moreover, it is also more complete (i.e. covers a greater portion of vehicle 1) as a consequence of vehicle 1 no longer being occluded.

3. Object Model Propagation:

Two examples of object model propagation—namely, automatic bounding box alignment (3.1) and manual bounding box alignment (3.2)—will now be described. These are described using the frames of FIG. 10 as a reference.

Figure 11A:
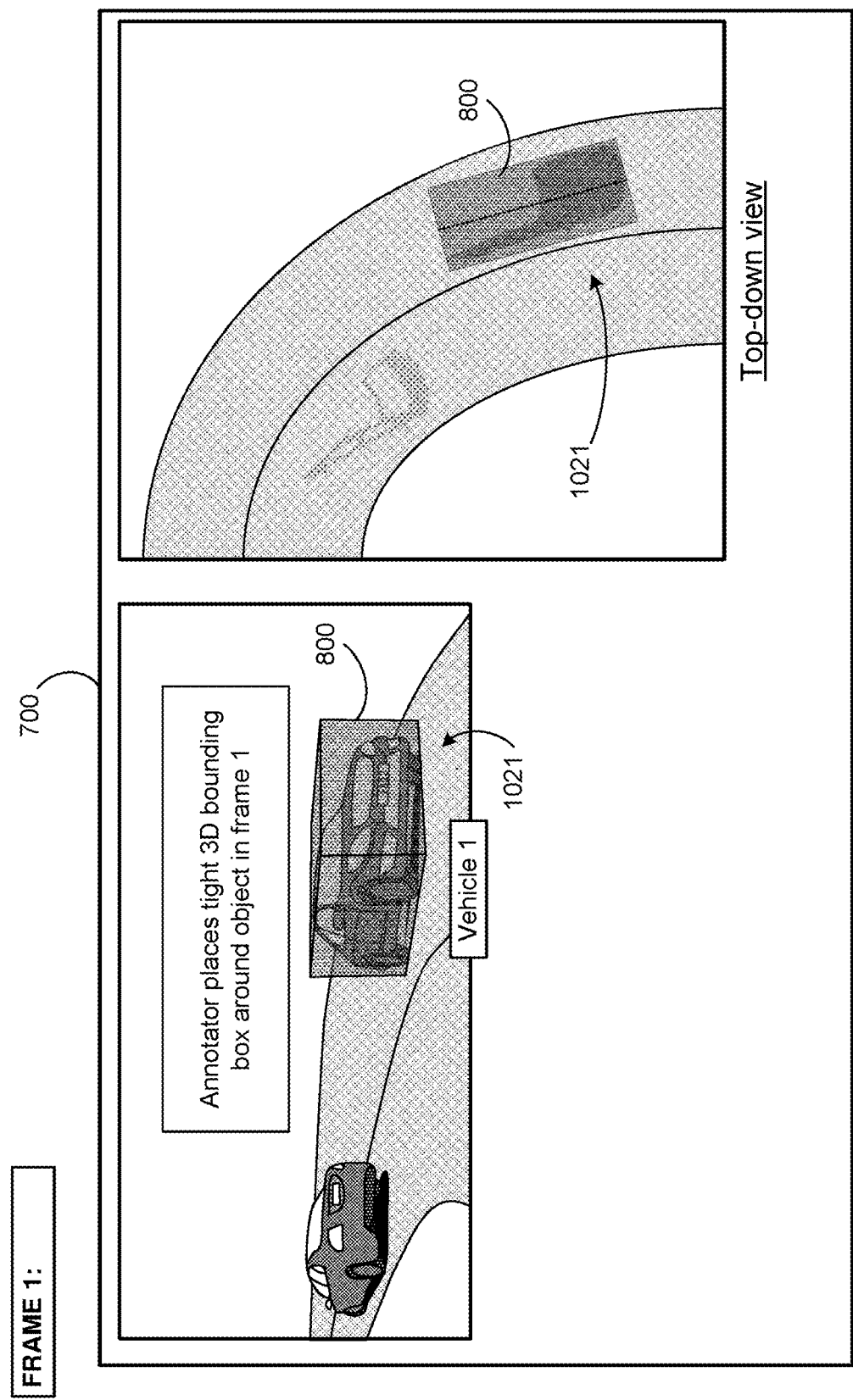

3.1 Automatic Bounding Box Alignment:

FIG. 11A shows the annotation interface 700 with frame 1 (1001, FIG. 10) currently selected for annotating. Using the tools provided within the annotation interface 700, the annotator has accurately placed a tight bounding box 800 around vehicle 1 (denoted by reference numeral 1021), in the manner described above. The tight bounding box 800 is defined in the frame of reference of the point cloud of frame 1.

Figure 11B:
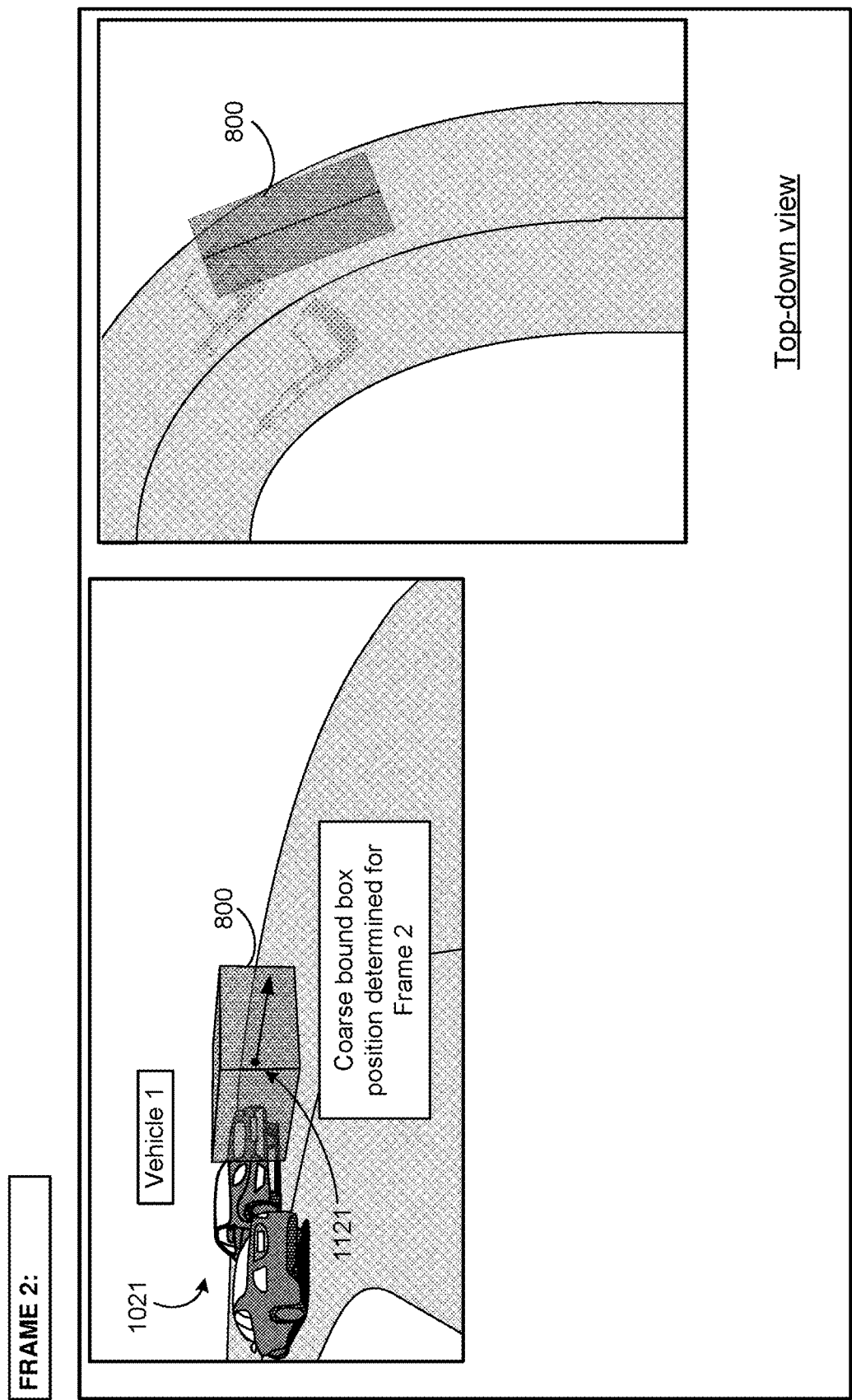

FIG. 11B shows the annotation interface 700 but now with frame 2 (1002, FIG. 10) currently selected for annotating. The bounding box 800 defined in frame 1 has been imported (propagated) into frame 2, but at this point only a coarse-estimated pose 1121 (location and orientation) has been determined within frame 2 The coarse-estimated pose 1121 is defined in the global of reference but within the point cloud of frame 2.

The coarse-estimated pose 1121 can be defined manually by the annotator. This is straightforward and places a minimal burden on the annotator.

Alternatively, the coarse-estimated pose 1121 may be determined automatically, for example using a trained perception component—a form of "model in the loop" (MITL) processing.

Alternatively or additionally, the coarse-estimated pose 1121 may be determined by interpolation based on an assumed or measured path of vehicle 1 (1021). Further details are given below.

For rigid objects (that is, objects modelled as rigid), the size and dimensions of the bounding box 800 remains constant across all the annotations (constant in the sense of being the same across all frames—the dimensions can be adjusted by adjustments applied in respect of one frame are mirrored in all frames).

Non-rigid objects, such as pedestrians and cyclists, can be accommodated by applying a suitable transformation to the bounding object dimensions across frames. This may, for example, take into account information about a type or class of the object in question.

The coarse-estimate of the bounding box pose 1121 is most conveniently obtained automatically by interpolation or MITL and is a coarse pose and orientation with the same 'true' dimensions (width, length and height).

Note, although reference is made in the present context to a tight bounding box, it not necessary for there to be an initial tight 3D bounding box: one or more "coarse" bounding boxes (i.e. which are not tightly fitted to the object 1021 to be annotated)—which may be automatically or manually generated—may be sufficient to determine the vehicle structure which is present across multiple frames (and thus apply the annotation functions disclosed herein). Hence, although the bounding box 800 may be referred to as a tight bounding box in the following description, the bounding box 800 is not required to be tight in order to implement the described features.

Note a distinction is made between a coarse bounding box which has not been accurately positioned or sized in any frame, and a coarse pose for a bounding box in a given frame—for the latter, an accurate pose may or may not have been determined for a different frame when the coarse-position is defined in the given frame.

If no tight bounding box is provided initially, an annotator may at some point need to correct the orientation of the axes relative to the 'optimised' box pose, but that can be done before or after the bounding box 800 has been propagated into other frame(s), and moreover only needs to be done in respect of one frame as those corrections will be automatically applied across all frames to which the bounding box 800 is propagated.

Figure 11C:
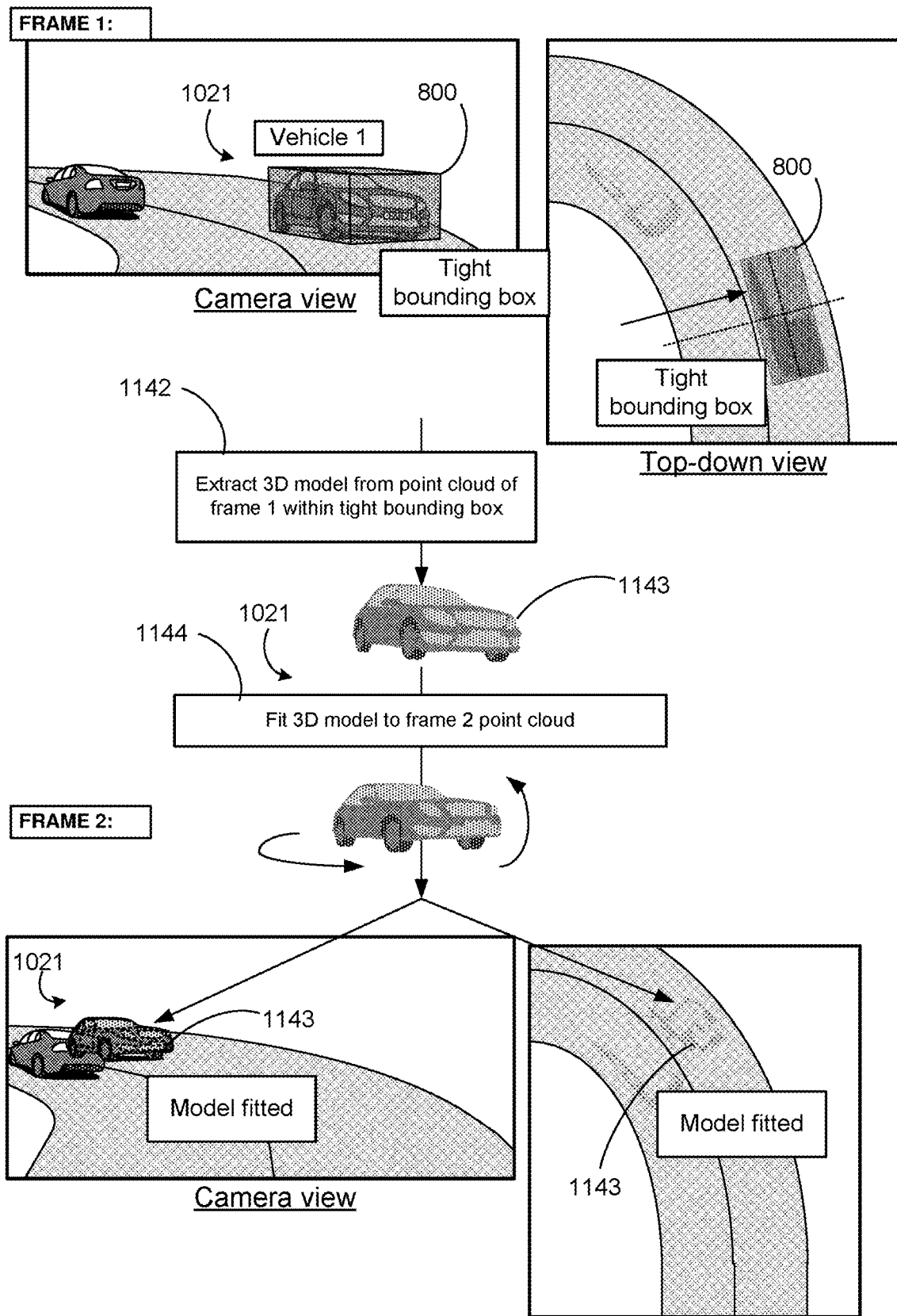

FIG. 11C shows a flow chart for an object model propagation method, accompanied by graphical illustrations of the method steps. At step 1142, the subset of the point cloud of frame 1 within the bounding box 800 of frame 1 is extracted to provide an object model 1143 of vehicle 1. At step 1144, the object model 1143 from frame 1 is fitted to the subset of the point cloud of frame 2. As indicated, the fitting may be performed based on ICP, or any other automatic alignment algorithm which attempts to match the structure of the object model to the structure of the point cloud. Any colour information associated with the points in the point cloud may also be uses as a basis for the fitting (which, in that event, attempts to fit points of the model to points in the point cloud of similar colour, in addition structure matching). The alignment process may also be referred to as "registering" the 3D model 1143 with the point cloud of frame 2. The algorithm searches for matching structure within the point clouds to which the model 1143 can be aligned (i.e. with which it can be registered).

The coarse bounding box pose 1121 may be used to limit the scope of the search, for example to within a search volume in 3D space defined by the coarse bounding box pose 1121. The search volume may additionally be defined by the size/dimensions of the bounding box 800. However, the search volume need not limited to the volume within the bounding box 800. For example, the search volume may be expanded by an additional "buffer" surrounding the 3D bounding box 800. Alternatively, the search volume could be defined manually e.g. via a 2D rectangular or freeform 'lasso' selection in the image or one of the projected 3D views. Alternatively, the search may be performed across the full extent of the point cloud of frame 2, though that may be less efficient.

Image features may also be used to aid the registration of the point clouds, such as edges, corners or other feature descriptors like SIFT (scale-invariant feature transformation).

In general, although the object model 1143 is aligned with the object (vehicle 1) in 3D space, this may or may not be based on 3D structure matching, i.e. adjusting the 3D pose of the object model 1142 in order to match 3D features of the object model 1143 with corresponding 3D features of vehicle 1 (e.g. using ICP or other automated 3D registration process, as described above). For example, that alignment in 3D space can alternatively or additionally be based on 2D feature matching, i.e. adjusting the 3D pose of the object model 1142 in order to match 2D features of the object model 1143 with corresponding 2D features of vehicle 1 (e.g. using image features of the kind described above)

As another example, the alignment in 3D space may alternatively or additionally be based on a re-projection error or other photometric cost function. This involves projecting the 3D object model 1143 into the image plane and adjusting the 3D pose of the object model 1143 in order to match the computed projection with vehicle 1 as it appears in the image. This may also be based on the matching of image features between the image and the projection of the object model 1143 into the plane of the image.

Where noise filtering is applied to the points of the 3D object model, a 3D surface model may be fitted to the filtered points (i.e. the points remaining after noise points have been filtered-out).

All cameras and bounding boxes have positions and orientations (poses) relative to a world (global) coordinate system. Hence, once the pose of the bounding box 800 has been determined within respect to frame 1, it possible to find the pose of that bounding box 800 relative to another camera (i.e. in fact, the same camera but at a different time instant—e.g. correspond to frame 2), which in turn allows that bounding box 800 to be placed (located an oriented) it in the coordinate system of the point cloud for that camera. That point cloud can, in turn, be transformed into the coordinate system of the bounding box in order to efficiently isolate the subset of the point cloud within that bounding box (see above).

Figure 11D:
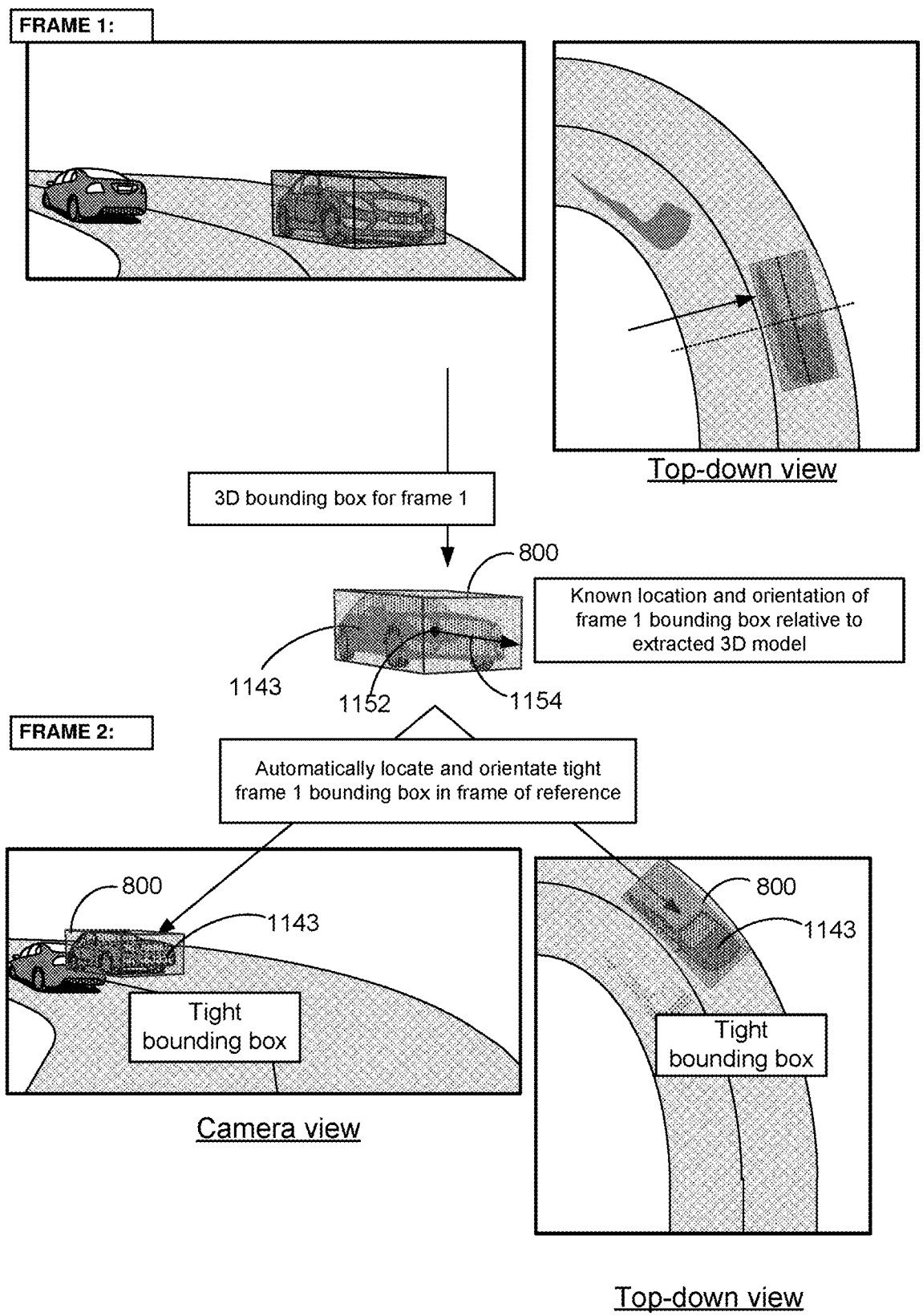

With reference to FIG. 11D, because the tight bounding box 800 and the 3D object model 1143 are both derived in the same frame of reference (the frame of reference of the bounding box 800 in this case), the location and orientation of the tight bounding box 800 relative to the object model 1143 are known when the model is created at step 1142. Therefore a location and orientation of the tight bounding box 800 in the frame of reference of the point cloud of frame 2 is determined automatically, at step 1144, in fitting the 3D object model 1143 to the point cloud of frame 2. This is encoded as a reference point (location) 1152 and orientation vector 1154 of the bounding box 800 with the reference point 1152 and orientation vector 1154 being fixed relative to the points of the object model 1143. Assuming that object in question (vehicle 1 in this example) can be treated as a rigid body, then the tight bounding box 800 originally defined in frame 1 will now be reasonably accurately located and oriented so as to tightly fit the subset of points in frame 2 which belong to vehicle 1 (the accuracy will depend on how well the object model has been fitted to the point cloud).

In this manner, high quality 3D annotation data is generated semi-autonomously for frame 2, which can in turn be used to train a machine learning 3D bounding box detector, orientation network, or distance estimation (for example) or any other form of 3D structure perception component.

Further steps can also be taken to automatically generate 2D annotation data for the underlying image of frame 2, as described below.

The coarse estimate of the bounding box pose 1121 also serves as a coarse estimate of the pose of the 3D object model 1143, for the reasons stated above. This, in turn, is refined by better aligning the 3D object model 1143 with vehicle 1 in frame 2, automatically, manually or semi-automatically.

Although in the above example, the bounding box 800 is manually placed in frame 1, this step could be automatic. The bounding box could be automatically placed by an automated object detector such as a trained neural network (and may or may not then be subject to manual fine-tuning), in an MITL approach. For example, it may be that the bounding box detector can perform well on frame 1 in respect of vehicle 1 but performs poorly when applied to frame 2 directly. In that event, high quality training data can be generated automatically or semi-automatically for frame 2, leveraging the good performance of the bounding box detector on frame 1. This in turn can provide high-quality training data for frame 2, which in turn can be used for training/re-training to improve object detection performance. Further or alternatively, pose may be estimated by interpolation based on a measured or assumed path of the object being annotated (see below).

Moreover, as will be appreciated, this is just one example of a workflow that the annotator may adopi using the annotation functions provided. The underlying efficiency stems from the fact that changes to the 3D bounding box relative to the object model made in one frame are applied automatically to one or more other frames to maintain consistent 3D bounding boxes across frames for rigid objects. So, for example, the annotator could instead coarse annotate the first frame initially, apply the above steps in order to locate and orientate the coarse bounding box of the first frame in the second frame, and then apply adjustments to the location and/or orientation bounding box in the first frame with those adjustments being automatically mirrored in the second frame. In that case, adjustments to the bounding box in one frame are applied across multiple frames automatically.

In this respect, it is noted that the reference point 1152 and orientation vector 1154 of the bounding box 800 relative to the object model 1143 are fixed in the sense that the orientation of the bounding box 800 relative to the object model 1143 remains consistent across frames—however, the annotator can adjust the location and orientation of the bounding box relative to the object model as needed (i.e. he can alter the reference point 1152 and orientation vector 1154), with any such adjustments being implemented automatically across all of the frames in which that object model is applied. In this sense, the 3D bounding box 800 is "locked" to the 3D object model 1143.

3.2 Manual Bounding Box Alignment

Figure 11E:
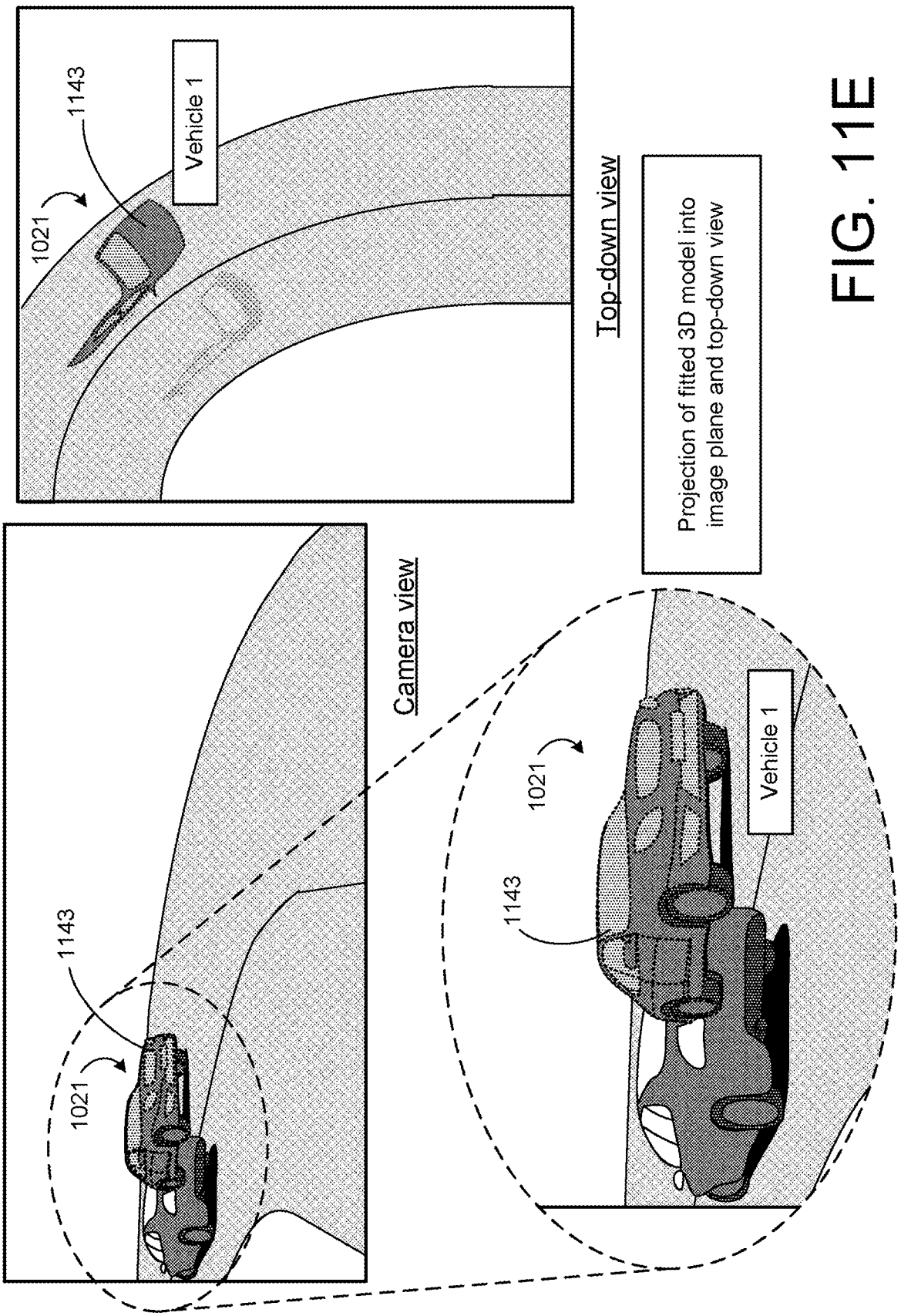

Following on from the above example, FIG. 11E show an expanded view of the annotation interface 700 whilst frame 2 is selected for annotating. As can be seen, the object model 1143 is superimposed by projection (1152) onto both the camera view and the top-down view to enable the annotator to see the location of the object model 1143 in the frame of reference of frame 2, relative to the object 1021 in question (vehicle 1).

Figure 11F:
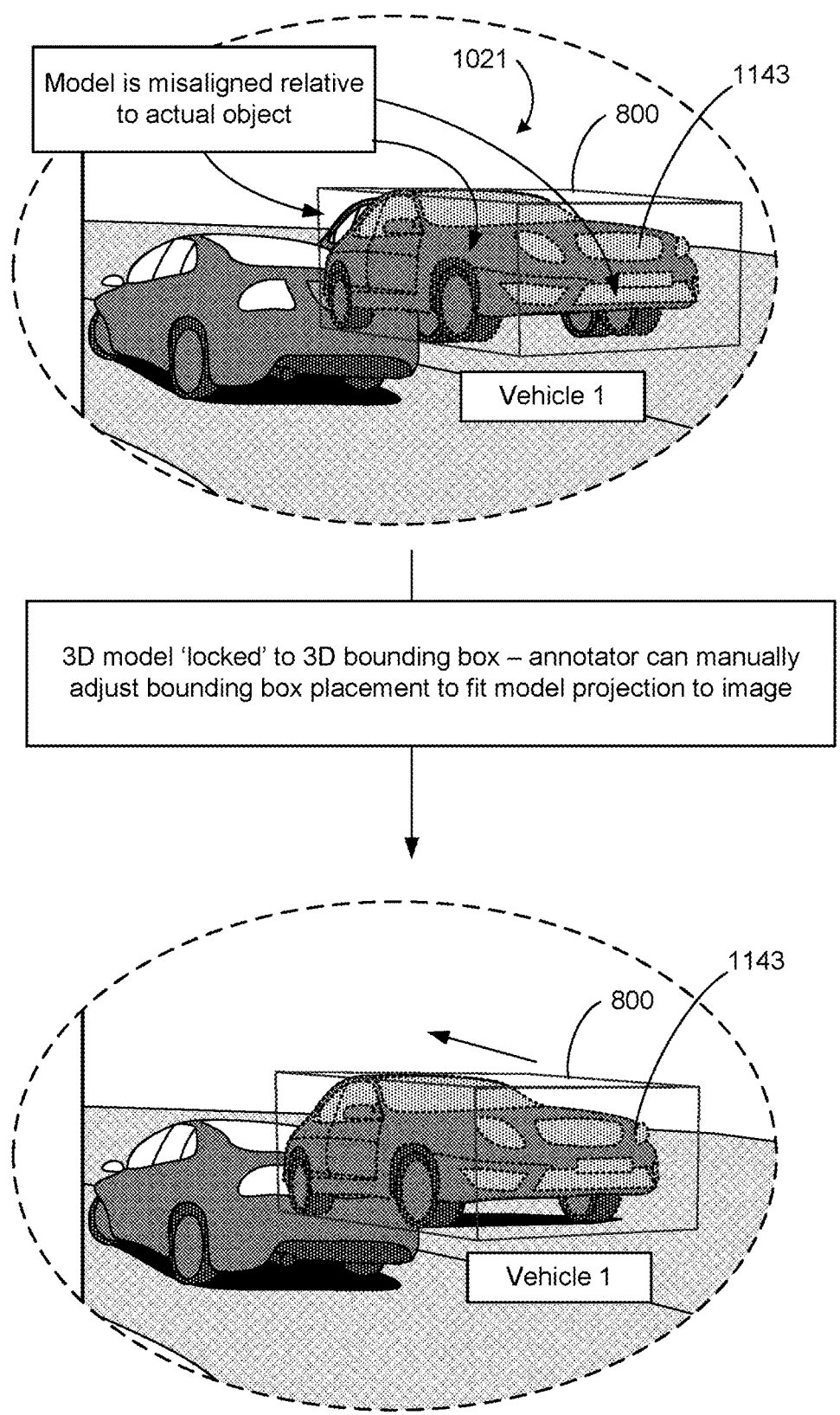

FIG. 11F demonstrates how the annotator may utilize this feature. As illustrated in the top-half of FIG. 11F, it may be that when the object model 1143 is first fitted to the point cloud of the second frame, it is not perfectly aligned with the actual points of the object 1021. This is readily visible in FIG. 11F due to the visual misalignment between the object model 1143 and the actual object 1021. Thus, as illustrated in the bottom-half of FIG. 11F, the annotator can tweak the pose (location and orientation) of the bounding box 800 to correct the misalignment: the object model 1143 remains locked to the bounding box 800 in the above sense as the latter is adjusted: any changes to the pose of the object model 1143 in the frame of reference of the current point cloud are applied to the pose of the 3D bounding box 800 in that frame of reference. Hence, the annotator knows that the bounding box 800 has been correctly located and orientated in the frame of reference of frame 2 when there are no longer any perceptible misalignments. Although not shown in FIG. 11F, the object model 1143 is also projected into the top-down view so that the annotator can correct any visual misalignment in the top-don view at the same time.

Figure 11G:
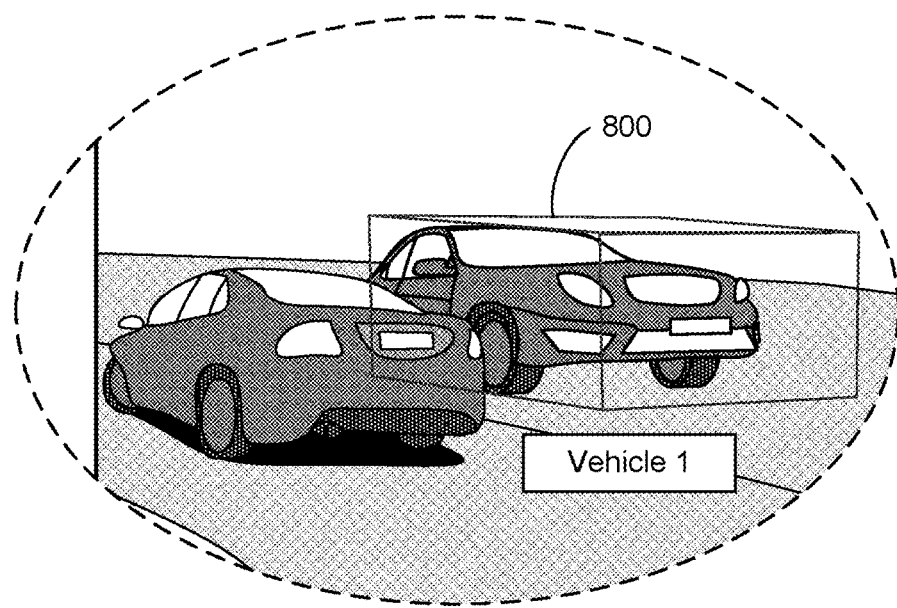

By contrast, FIG. 11G shows the same view as the top-half of FIG. 11F but without the superimposed object model 1143. At this point, the bounding box 800 is still misaligned, but that misalignment is much harder to perceive in the absence of the model projection. This is partly a consequence of the fact that vehicle 1 is partially occluded. By propagating the object model 1143 from a frame in which the object is not occluded, the occlusion in frame 2 is corrected for, thereby assisting the annotator in the fine-tuning of the bounding box 1143.

As well as correcting for occlusion, propagating the object model in this way can also help to account for sparsity, noise and inaccuracy in the point cloud for distant objects in particular.

Returning to FIG. 10, recall that, since vehicle 1 is more distant in frame 2, the subset of the point cloud corresponding to vehicle 2 will generally be sparser and of lower quality in frame 2. This is another reason it may be difficult to accurately place a bounding box manually in frame 2, as this will be reflected in the quality of the top-down view. Propagating the object model 1143 from frame 1 into frame 2 assists the annotator in compensating for this, in the manner described above.

Model propagation can also be used to account for "gaps" in sensor coverage. For example, with stereo depth images, estimation of depth relies on locating matching pixels between the target and reference images. There will usually exist a region of the target image containing pixels which have no corresponding pixels in the reference image. This corresponds to the portion of a scene which is within the field of view of the camera which captured the target image but outside of the field of view of the camera which captured the reference image. No depth information will be available for a potion of an object within that region in a given frame. However, that depth information can instead be taken from another frame by propagating the object model from the other frame in the manner described above. This may for example be the frame in closest temporal proximity in which the object in question is fully visible in the depth channel.

4. Aggregate Object Model:

To create an aggregate object model, bounding boxes are placed around the object in question across multiple frames (e.g. as described above, or simply manually). A subset of the point cloud is isolated for each frame within the bounding box for that frame, and the subsets of point clouds are aggregated in a common frame of reference. As indicated, this can provide a more dense and less noisy object model, which in turn can be applied in one or more frames as above to generate high quality annotation data.

Following the above example of FIGS. 11A-G, having accurately placed the bounding box 800 in frame 2, the subset of the point could of frame 2 within that bounding box can be extracted, and merged (aggregated) with the corresponding subset of points extracted from within the bounding box 800 in frame 1. This provides a denser model of vehicle 1 which, in turn, can be propagated into other frame(s) in the manner described above.

An annotator can also use an aggregate model to guide manual annotations. An aggregate model which uses data of a target frame and at least one other frame (reference frame) can be rendered as the annotator adjusts the position/pose of the bounding box 800 in the target frame. If the bounding box is located or oriented incorrectly, this can cause visible artefacts in the aggregate model, such as "duplicate" or misaligned features, because the points taken from the target frame are not properly registered with the points taken from the reference frame. The user can thus tweak the pose of the bounding box 800 in the target frame as necessary until the visual artefacts are no longer present.

4.1 Iterative Propagation and Generation of Aggregate Models

Aggregate 3D models can be generated and applied in an iterative fashion.

Figure 14:
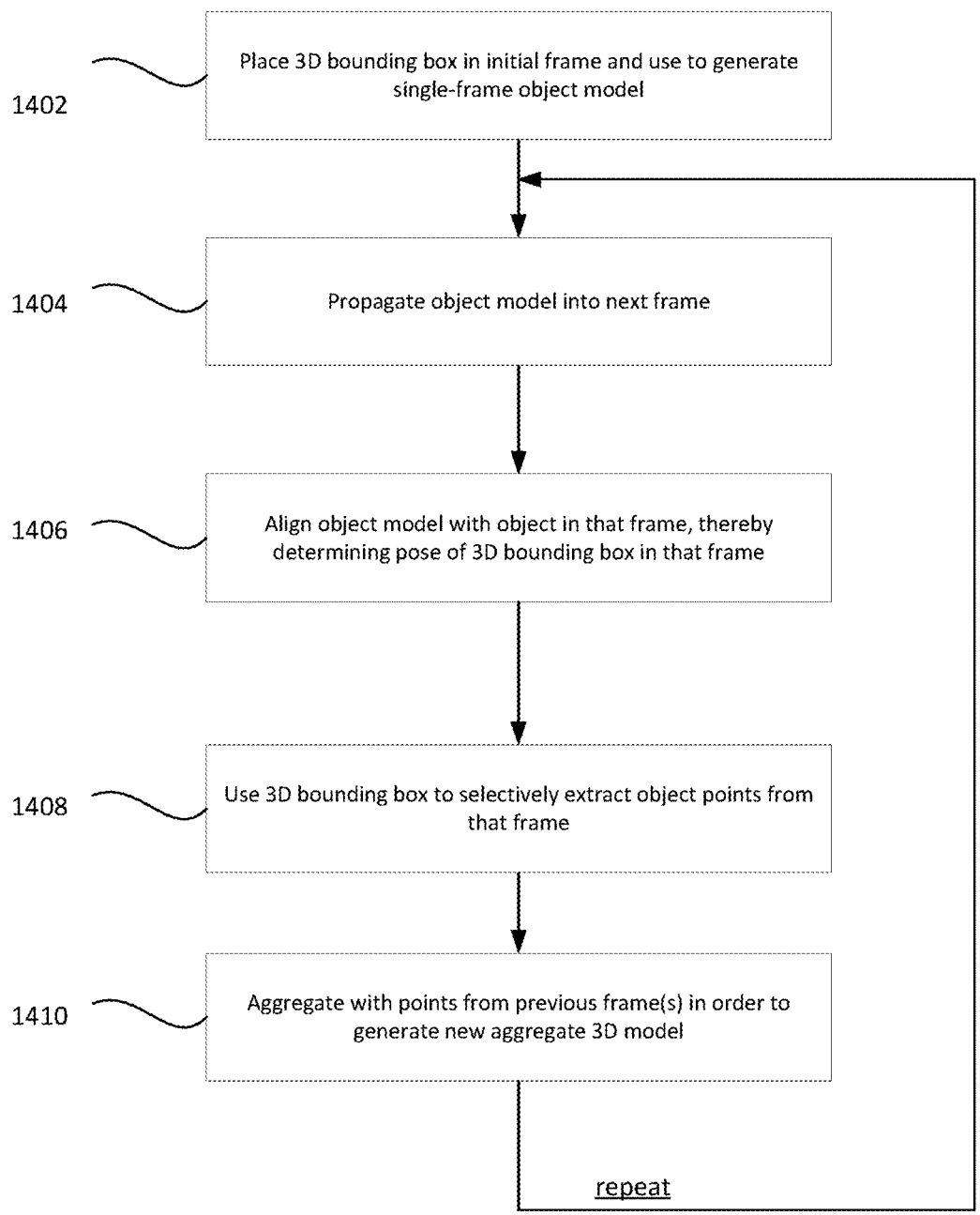
FIG. 14 shows a flowchart for a method of iteratively generating and propagating aggregate 3D object models.

An example will now be described with reference to FIG. 14, which shows a flowchart for a method of iteratively generating and applying increasingly dense aggregate 3D models across multiple (possibly many) frames.

Initially, at step 1402, a single frame object model (the current object model at this point in the process) is generated for a single initial frame, by placing a 3D bounding box around an object in that frame (automatically, semi-automatically or manually), and extracting object points from that frame within the 3D bounding box.

At step 1404, the current object model is propagated into the next frame and aligned (1406) in 3D space with the object in that frame (manually, automatically or semi-automatically). In so doing, the pose of the 3D bounding box in that frame is derived, hence, at step 1408, points belonging to the object can be extracted from the 3D bounding box in that frame. Those point can now, in turn, be aggregated (1410) with the object points of the current object model, to generate a new aggregate 3D model which incorporates the point information extracted from the most recent frame.

The process can now be repeated iteratively for the next frame, from step 1404 onwards—noting that, from now on, the current object model as propagated into the next frame is an aggregate object model incorporating point information from multiple frames. Hence, from now on, it is the current aggregate object model that is aligned with the object in the next frame. With each iteration of the process, points from yet another frame are added, allowing progressively dense and complete aggregate object models to be generated.

4.2 Signed Distance Field (SDF) Object Modelling

In the simplest case, an object can be modelled as an aggerate point cloud. However, as mentioned above, there are various other forms of object modelling which can be applied in order to model 3D object surfaces based on point cloud aggregation across frames. One of the examples mentioned above is SDF-based modelling, and an example of such SDF implementation will now be described. The following description considers a signed distance field but applies equally to other forms of distance field that may be used to (implicitly) represent the surface of a 3D object.

In this particular example, an approach of simultaneous localisation and mapping using adaptively sampled signed distance fields is adopted.

This implementation generates one SDF model per object, which aggregates point cloud data for that object across a batch of frames (e.g. captured over a driving distance of the order of 10 or 100 meters). The described form of SDF is a discretised SDF that represents (models) a 2D surface of a 3D object as a 3D volume of voxels (volume pixels) in a frame of reference of the object, where each voxel encodes a "signed distance" to a surface of the 3D object; points on the surface itself have a signed distance of zero; for convenience, the description assumes a typical convention such that points outside of the object are defined to have a positive signed distance and points inside of the object have a negative signed distance, but this is merely one possible choice. Voxels within the SDF need not have fixed sizes, and in the examples described below, the size (3D dimensions) of voxels close to the 2D surface of the object is decreased (and the voxel density is correspondingly increases), in order to provide more granular surface modelling in a memory efficient manner.

Figure 15A:
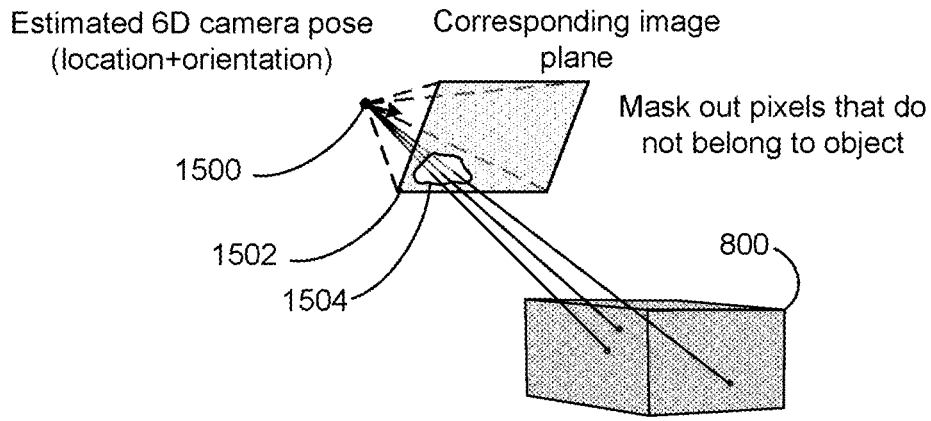
FIGS. 15A and 15B illustrate certain geometric principles of one form of SDF modelling.
Figure 15B:
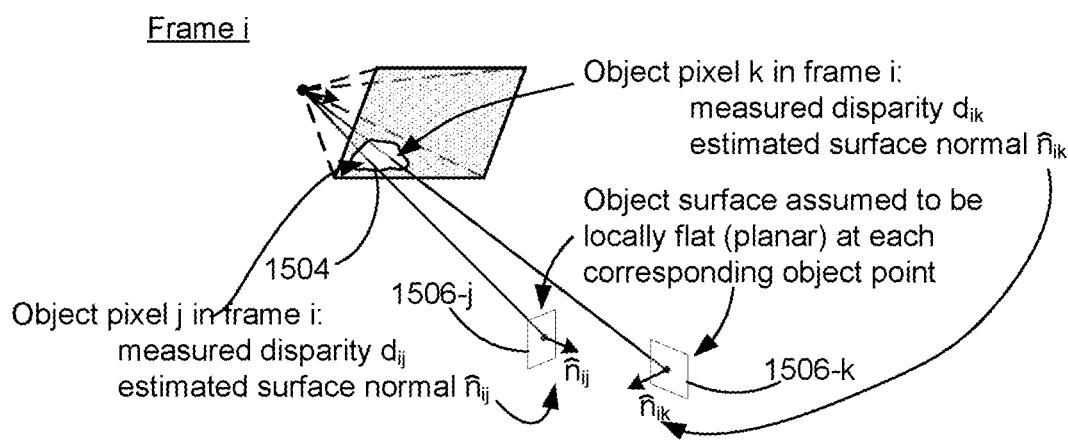

A brief summary of this SDF-based implementation is first provided with reference to FIGS. 15A and 15B. This implementation assumes RGBD frames, with corresponding point clouds, however the description applies equally to any form of 3D image with pixels having depth and (optionally) colour components.

3D bounding boxes for the object(s) (placed manually, semi-automatically or automatically) are used to isolate a subset of the 3D point cloud for each object in each frame, in the manner described elsewhere herein. This, in turn, is used to determine a "masked" RGBD image for that object and that frame, which is formed of the subset of RGBD pixels of that frame corresponding to the subset of the 3D point cloud isolated for that object in that frame. That is, in each frame, a subset of depth (or, more precisely, disparity) and colour pixels is determined for each object, as belonging to that object, based on its manually, automatically or semi-automatically estimated 6D pose and 3D size. The term "disparity image" (or disparity map) refers to an image where each of (at least some of) the pixels has measured disparity, and could be the depth component (D) of a RGBD image (for example).

4.2.1 Summary of Example SDF Implementation

FIG. 15A shows a 3D object bounding box 800 and a subset of pixels 1504 within an image plane 1502 that correspond to 3D points within the 3D bounding box 800. Only three points of the point cloud are shown for simplicity, but in practice there would be a 3D point for every valid depth pixel, and the subset of those points lying within the 3D bounding box 800 would define the subset of pixels 1504 for the object in question (the object pixels). The remaining pixels within the image plane 1504 are said to be "masked out" for that object, and is the non-masked object pixels 1504 that are used to build an SDF model of the object marked by the bounding box 800. The orientation of the image plane 1502 in 3D space is defined by an estimated 6D camera pose (location and orientation in 3D space), denoted by reference numeral 1500, in the reference frame of the object. As described below, across a batch of frames, a camera pose relative to each object is estimated and refined in each frame based on the SDF model. As described elsewhere herein, this can be an iterative fashion, where the SDF and the camera poses are each refined in turn, e.g. in a predetermined number of iterations or until some convergence criteria is met. More generally a relative pose between the camera and the object is determined, which could be a pose of the camera in the object frame of reference or a pose of the object in the camera frame of reference.

In addition, for each object pixel, a "surface normal" is estimated, which is an estimate of the normal vector (i.e. the direction perpendicular) to the 2D surface of the object, at the point on that surface corresponding to that pixel.

In order to estimate a surface normal for each pixel, a superpixel segmentation of the RGBD image is formed, and a slanted plane is fitted to each superpixel to estimate the normal. That is, a slanted place is fitted to a (relatively small) subset of the 3D object points corresponding to the pixel and its immediate neighbours. For further details of one technique for estimating the surface normals per pixel, see "Efficient Joint Segmentation, Occlusion Labeling, Stereo and Flow Estimation" by Yamaguchi et al. 2014, which is incorporated herein by reference in its entirety.

FIG. 15B shows two object pixels (i.e. two pixels of the set of object pixels 1504), j and k, where the index i represents the frame i to which those pixels belong. The measured disparity values of those pixels are denoted $d_{ij}$ and $d_{ik}$ respectively, and the pixels are additionally associated with respective surface normals $\hat{n}_{ij}$, $\hat{n}_{ik}$, which, as shown, are estimates of the directions perpendicular (normal) to the surface of the object at the corresponding 3D object points. The surface normal is estimated for each object pixel from the disparity values of object pixels 1504. In order to compute an SDF, the following examples assume the object surface to be locally flat (planar) at each object point, as described in more detail below. References 1506-$j$ and 1506-$k$ are used to denote sections of object surface planes at the points corresponding to pixels j and k respectively.

4.2.2 Signed Distance Fields

A 'signed distance field' (SDF) is a model representing a surface as a scalar field of signed distances. At each point, the value the field takes is the shortest distance from the point to the object surface, negative if the point is outside the surface and positive if the point is inside the surface.

For example, given a 2-sphere of radius r, described by the equation $$x^2+y^2+z^2=r^2$$

the value of the corresponding SDF, denoted F, is given as follows.

$$F(x,y,z)=r-\sqrt{x^2+y^2+z^2}.$$

The value of the field F at a point is negative when the point is outside the surface, and positive when the point is inside the surface. The surface can be reconstructed as the 0-set of the field, i.e. the set of point at which it is zero.

Whilst in the simple example above, the SDF can be defined continuously, in the present context, for practical reasons, the SDF is approximated sampling it at a finite number of points. The minimum size of the features in the surface which can be accurately recorded is then determined by the sample rate. For example, if points were to be sampled on a regular 3D grid, details smaller than the distance between the grid points cannot be recorded. So a higher sample rate enables the recording of finer details. However, the amount of memory required to store this information scales with the cube of the sample rate, so sampling on a regular grid is infeasible for large or highly detailed surfaces. But only the points near the surface are actually required to reconstruct the surface, and areas of the surface with little fine detail can be accurately reconstructed with relatively sparse sampling. It is only areas near the surface with much fine detail that require dense sampling to reconstruct. Memory is saved by taking advantage of adaptive sampling methods, which alter the sample rate from location to location, according to the differing levels of detail required. This can be achieved by storing sampled in a "voxel tree" such as an octree or 64-tree.

4.2.3 Voxel Trees

A voxel tree is a data structure which allows the storage of variable-resolution, 3D spatially-located data in a memory-efficient manner, by subdividing a large 3D space into a number of cubical voxels of varying sizes, with smaller voxels in areas requiring data stored at higher resolution.

FIG. 16A shows an example of an octree, in which a cubical voxel may be subdivided into 8 smaller voxels, each of which may be further subdivided into 8 even smaller voxels, and so on, continuing as necessary until the desired resolution is reached in the desired areas. Data may then be associated with the voxels themselves, or with their vertices. Each larger pixel that is subdivided may be referred to as a "parent" voxel, and its smaller constituent voxels as its "children" (one or more of which may, in turn, be further subdivided, and thus have its own children). In this sense, the voxels constitute nodes of a hierarchical tree structure, with edges represent parent-child relationships. A "leaf" voxel (node) is a voxel which is not itself subdivided. Leaf nodes can occur at any level of the tree, and will occur at lower levels of the tree for voxels close to the object surface.

Each voxel in an octree may be identified by a unique sequence of bits, called its 'Morton code'. For each voxel, a 3-bit sequence is associated with each of its 8 subvoxels, according to their locations and chosen x, y and z directions. The first bit is a 0 if the subvoxel is on the negative x side of the voxel, or a 1 if on the positive x side. The second bit is similarly related to the subvoxel's location in the y direction, and the third to the subvoxel's location in the z direction. This example adopts a convention that the positive x direction is right, the positive y direction is down, and the positive z direction is forwards.

FIG. 16B shows an example of an SDF voxel grid with dynamic voxel sizes, and FIG. 16C shows the corresponding hierarchical voxel tree structure. The larger red voxels correspond to a first level of nodes below a parent node; one red voxel is shown subdivided into eight smaller (blue) voxels, represented at the second level of the tree, and one blue voxel is shown is shown subdivided again into eight yet smaller (orange) voxels, represented at the third level of the tree.

For example, in FIG. 16B, the blue voxel has the 3-bit sequence 100, because it is the rightmost (positive x direction), upper (negative y direction), front (negative z direction) subvoxel of the larger red voxel. Similarly, the orange voxel has the 3-bit sequence 101, and the orange voxel containing the point has the 3-bit sequence 101. The full Morton code is obtained by concatenating the 3-bit sequences from each of the voxels containing the chosen voxel, from largest to smallest, and prepending a 1. So the full Morton code of the orange voxel containing the point in the below image is 1-100-101-101. Similarly, the Morton code of the red voxel in the above image is 1-100-000.

In a 64-tree, the principles are the same, however each voxel is subdivided into an 8×8×8 array of smaller voxels rather than the 4×4×4 array used in an octree.

An SDF representing an object is stored in a voxel tree format. There is one constituent data structure: the voxel. Each voxel contains the following data:
  a pointer to its parent voxel,
  a pointer to the first of its child voxels (all of which are stored contiguously, therefore only one pointer is needed), the distance from the voxel centre to the closest point on the object surface, denoted as α, a weight representing the confidence of this distance, a mean colour of the voxel and a variance of each channel of the RGB colour in each voxel, a count of the number of measurements which have been used to update voxel data, the coordinates of the voxel centre, the level of the voxel within the voxel tree.

The mean and variance for each voxel are determined across the batch of frames. The colour channels are modeled as normal distributions, whose means and variances are updated each frame (via Bayes' Theorem).

As will be appreciated, this is merely one example of a possible voxel data structure. For example, array indices may be used to reference other voxels, rather than pointers.

Given a 3D point, the distance and colour of the SDF can be estimated at that point by finding the leaf voxel in the octree containing the point and reading that voxel's distance and colour. Distance and colour can also be found by interpolating between two or more neighbouring voxels.

4.2.4 SDF Modelling Algorithm

The following processes are each performed on all frames within a batch of frames. The colour image and disparities to are used produce a 3D coloured point cloud (applying the principles of FIG. 6, with each point in the point cloud associated with the colour component of its corresponding image pixel), which in turn is used to estimate the camera pose and modify the SDF structure. The colour image, disparities and surface normals are used to update the SDF data. The overall process modifies SDF structure on all frames, then updates SDF data on all frames, then estimates camera pose on all frames. Note, the processes can be performed in different orders than the orders described.

4.2.5 Estimated Camera Pose

This section described how a refined camera pose may be computed for each object in each frame, once the object SDFs have been computed. This is a form of pose refinement (this achieves a similar effect the ICP fitting described above but is specific, in some respects, to SDFs). In this particular example, the refinement is performed in the object frame of reference for each object in each frame, in order to compute a refined camera pose for that object and that frame.

Given a colour image and disparities, the corresponding 3D coloured point cloud is used estimate the camera pose for each object. This is the pose of the camera relative to the object, i.e. the camera pose in the object frame of reference. This is done for each object in the frame.

For each 3D coloured point p, denote the RGB components of its colour as p.r, p.g, and p.b, respectively. The average (mean) colour stored in the SDF can be read at the point p, as the colour values stored in the voxel containing (intersecting) that point; denote the RGB components of this colour as r(p), g(p), and b(p), respectively. A photometric error term is calculated as a sum of colour differences taken over all of the object points within the frame in question (the set of object points is denoted P below and is the subset of points within the point cloud belonging to the object in question):

$$E_P(R, t) = \sum_{p \in P} \left[ (p \cdot r - r(p))^2 + (p \cdot g - g(p))^2 + (p \cdot b - b(p))^2 \right].$$

This is one example of a photometric matching error that penalizes colour differences between object points and spatially corresponding voxels of the SDF.

Here t represents the initial 6D camera pose (pre-refinement) and R represents and SE(3) transformation of t; R and t will determine where a given point p lies in relation to the voxel grid, and hence the values of r(p), g(p) and b(p).

The distance stored in the SDF at the point p can be read in the same way; denote this distance by d(p). A geometric error term is computed as sum of signed distances taken over all of the points within the frame in question:

$$E_G(R, t) = \sum_{p \in P} d(p)^2.$$

This definition exploits the definition of an SDF—for points on the object surface, the signed distance should be zero; therefore, for each voxel intersecting an object point, a signed distance other than zero is penalized. This is one example of a geometric matching error that penalizes offset in the object points from the object surface encoded in the SDF (as the 0-set thereof). Again, R, t will determine where each point p lies in relation to the voxel grid and thus the value of d(p).

As will be appreciated, the above are merely examples of possible error functions that penalize colour deviation and deviation from the object surface respectively. Other forms of error may be used. For example, in an alternative implementation, $$E_G(R, t) = \sum_{p \in P} L_\delta(d(p))$$

where $L_\delta$ represents the Huber norm.

The above steps are performed for each object and each frame, to compute a camera pose per frame per object.

Whilst the above performs the optimization in the object frame of reference to find a substantially optimal SE(3) transformation of the camera pose and object point P, the optimization could also be performed in the camera frame of reference, to determine a substantially-optimal SE(3) transformation of the SDF voxel grid (i.e. the pose refinement could instead be performed in the camera frame of reference).

The camera pose is estimated by finding an SE(3) transformation R of the camera pose t, and hence the object points P (which are represented in the frame of reference of the camera), that substantially minimizes an overall matching error function, defined in this instance as weighted average of the photometric and geometric error terms:

$$E(R, t) = \frac{1}{|P|} W_P E_P(P) + \frac{1}{|P|} W_G E_G(P) + \epsilon |\delta R, \delta t|_{Lie}.$$

In other words, by translating and/or rotating the 6D camera pose, and thus correspondingly translating and/or rotating the object points P relative to the SDF, in order to minimize the overall matching error E(P). In the above, $W_p$, $W_G$ are respective weights and |P| is the number of object points (the size of P).

The final term is a regularisation term; $|\delta R, \delta t|_{Lie}$ represents the change in the 6 Lie-space pose parameters from the original transform to the current transform. The rotation parameters and translation parameters are differently weighted. This term represents a Tikhonov regularisation (AKA ridge regression) damping factor.

This SE(3) transformation may, for example, be estimated with a forward compositional algorithm, using a Levenberg-Marquardt approximation for the gradient descent step, with a Gauss-Newton approximation for the Hessian. However, other suitable optimization methods will be apparent given the error definition above.

4.2.6 Modify SDF Structure

As outlined above, the voxel tree structure of the SDF is modified, increasing or decreasing the resolution in different areas.

Moving between frames, the resolution is increased around newly observed areas of the surface. The algorithm iterates over each point in the 3D point cloud, locates the leaf voxel in the octree containing the point, and subdivides it into a number of smaller voxels (e.g. 8 or 64 depending on the form of voxel tree). This ensures that, over the course of multiple frames, voxels near the surface become small enough to record the surface geometry in detail, while voxels far from the surface remain large.

4.2.7 Update SDF Data

Note, the following uses the notation $\alpha$ and $\beta_i$ having the definitions set out below. These are not the same as the angles $\alpha_j$, $\beta_i$ used in FIG. 6. Where necessary to distinguish, the alternative notation $A_j$, $B_i$ may be used in place of the latter to represent the angles of FIG. 6. Moreover, whilst in the above, $d_{ij}$ is used to represent depth in units of distance, and $D_{ij}$ is used to represent depth in units of disparity (proportional to the inverse of distance), the following section instead uses $d_i$ to represent disparity and, in accompanying Annex B, $D_i$ represents a normal distribution characterizing disparity error.

A method of updating the voxel data of an object SDF will now be described with reference to FIG. 17.

FIG. 17 is a geometric representation of certain principles of the SDF update method, and uses FIG. 15B, described above, as context.

Referring to FIG. 17, consider a single point for a single frame, where the index i denotes a particular frame. In this context, the point is a point p of a voxel of the SDF, such as its center point or other reference point of the voxel.

Denote by $p_i$ the point p's coordinates in the camera's frame of reference. The coordinates $p_i$ are shown in FIG. 17 as a vector extending from the 3D location of the camera 1500. After projecting $p_i$ back onto the image plane 1502 (i.e. by ray tracing between the point p and the camera), the point p is associates with an image pixel at which the traced ray intersects the image plane 1502). This pixel has a corresponding disparity value $d_i$ and surface normal $\hat{n}_i$, where the index i denotes the frame in question and the index representing the pixel itself (j and k in FIG. 15B) is dropped for conciseness.

Note that point p will not necessarily lie on the surface of the object—as set out above, the SDF is defined over a 3D volume of space, and the surface of the object is defined by the zero-subset of the SDF (i.e. the points at which the SDF is zero). Point p has a disparity $k_i$ in frame i, which is the disparity that would be measured for point p (this can be determined by transforming the known depth of point p in units of distance, i.e. its distance from the camera $|p_i|$, based on the known properties of the camera, using the relationship between distance and disparity set out above). Because $p_i$ is not necessarily on the surface of the object, its computed disparity will not necessarily match the measured disparity $d_i$ of the corresponding pixel; in any event, the computed disparity of a point on the modelled object surface (i.e. having a signed distance of zero) will not necessarily match the measured disparity because there may be disparity measurement error.

In FIG. 17, x denotes the distance from p to the object surface in the direction of $p_i$. In other words, x is the distance from p to the point on the object surface, q, that corresponds to the same image pixel (via ray tracing). Note, this is not the same as the signed distance of the SDF at point p, because x is not assumed to be the minimum (shortest) distance to the object surface. The signed distance is defined as the shortest distance to the object surface, and is denoted $\alpha$.

Assuming the 3D object surface to be locally planar at q, an object plane 1506 at the corresponding object point q is fully defined by q and the surface normal $\hat{n}_i$ computed for the corresponding pixel. The signed distance $\alpha$ is, in turn, the minimum distance between the point p and the object plane 1506, which is the distance between them in the direction of the surface normal $\hat{n}_i$.

In order to compute the signed distance $\alpha$ for a given voxel, a maximum likelihood (MLE) estimation is performed across all frames in a batch as follows (where the sum is over all frames in a batch of frames F):

$$\alpha^* = \arg\min_\alpha \sum_{i \in F}(d_i - f_i(\alpha))^2.$$

The summation is one example of an aggregate disparity error function (aggregated across multiple frames F), where $f_i$ is a known function of the unknown signed distance $\alpha$, defined as:

$$f_i(\alpha) = k_i \frac{\beta_i}{\alpha + \beta_i},$$

$$\beta_i = p_i \cdot \hat{n}_i,$$

where denotes the vector dot product.

Here, the aim is to find a signed distance $\alpha$ for the voxel in question (defined by point p), such that the aggregate disparity error is substantially minimized.

Shifting the perspective on FIG. 17 slightly, and now treating a as a variable, the corresponding object point q can now be thought of as an arbitrary point on the traced ray (intersecting p and the camera location 1500) a distance x from p where x is defined by the variable $\alpha$. Reference numeral 1700 denotes the pixel corresponding to point p (via ray tracing), and reference numeral 1702 defined the actual point in the 3D point cloud defined by the measured disparity $d_i$ of that pixel 1700. The aim of the MLE is to find a value of $\alpha$ such that the corresponding object point q (where q is defined by $\alpha$, the traced ray through p, and the surface normal $\hat{n}_i$ of the corresponding pixel 1700) is a close as possible to the actual object point 1702 across all frames F.

The aim is to find a value of $\alpha$ such that the object point q is as close as possible to the point in the 3D point cloud defined by the disparity $d_i$ in all frames F or, synonymously, to match the computed disparity $f_i(\alpha)$ to the measured disparity $d_i$ of the corresponding pixel as closely as possible across all frames.

Whilst the above formulae the MLE in disparity space, it will be appreciated that the same principles just described can be applied to formulate the MLE in distance space, e.g. based on depth maps that express depth in units of distance.

The function $f_i$ is derived based on the geometry of FIG. 17, and by way of further explanation, Annex A at the end of this of this description sets out the geometric derivation of $f_i$. As will be apparent, although Annex A assumes a locally flat object surface, the geometric principles of the derivation can be extended to accommodate different assumptions about the object surface (i.e. applying the same principles but without the flat surface assumption).

The MLE is performed for every voxel of the SDF, in respect of the reference point p of that pixel, in order to compute a signed distance α for that voxel.

In this disparity space formulation, $f_i(\alpha)$ computes the disparity of the point q of the object from the signed distance α of point p. To put it another way, given a particular signed distance α, the function $f_i$ returns the disparity of the corresponding object point q assuming a locally planar object surface 1506. The optimization seeks to find a signed distance value α* that matches this to the measured disparity $d_i$ of the corresponding object point across all frames F.

Of course, if every disparity map were error free, then every object point q would exactly coincide with the corresponding point in the 3D point could in every frame, and the voxel at q could have a signed distance of exactly zero. However, the aggregation across multiple frames F is tolerant to disparity measurement error, and the 0-set of the SDF will not exactly coincide with the 3D object points of the point cloud in every frame (or in any of the frames) in the presence of disparity measurement error. The way the maximum likelihood estimation is defined has an in-built tolerance to disparity measurement errors, that allows a substantially optimal object surface to be determined (as the SDF 0-set) in the presence of disparity measurement error. In this sense, the disparity $f_i(\alpha)$ may be referred at the "true" disparity of the corresponding pixel 1700, with the measured disparity $d_i$ possibly deviating form it due to measurement error. As set out in Annex B, the above MLE treats the measured disparity $d_i$ as a sample from a Gaussian disparity distribution with mean $f_i(\alpha)$ and (unknown but constant) covariance.

To make the optimization tractable, $f_i$ may be approximated as a Taylor series:

$$f_i(\alpha) \approx f_i(\overline{\alpha}_i) + f_i'(\overline{\alpha}_i)(\alpha - \overline{\alpha}_i),$$

with $$f_i'(\alpha) = -k_i \frac{\beta_i}{(\alpha + \beta_i)^2}$$

and $$f_i(\overline{\alpha}_i) = k_i \left(\frac{d_i}{k_i}\right)^\lambda,$$

where λ is a tuneable parameter. As explained in Annex B, in theory, values of λ closer to 1 ($\overline{\alpha}_i \approx d_i$) would be more appropriate when there is a relatively low level of error across the disparity map (such the 0-set of the SDF is well aligned with the 3D object points of the point cloud in every frame), whereas values closer to 0 can provide greater tolerance to measurement error. For λ≈0, the Taylor expansion is performed about $\overline{\alpha}_i \approx k_i$, i.e. the disparity of point p determined from the geometry of the system, rather than the measured disparity $d_i$ of the corresponding object point q—this is therefore independent of the measurement error in $d_i$ and works well for points close to the surface, which are the points of most interest, as it is these that capture the fine-grained surface structure. Experimental results have demonstrated good performance for λ=0 across all voxels, but the implementation is not limited in this respect.

For a more detailed discussion, Annex B sets out the derivation of the maximum likelihood estimation, and also the approximation of $f_i$.

5. Automatic/Semi-Automatic 2D Annotation Data Generation:

As indicated, as well generating 3D annotation data quickly and with reduced human effort, the efforts of the annotator can also be used to generate high-quality 2D annotation data, with no or minimal additional human input.

Figure 12A:
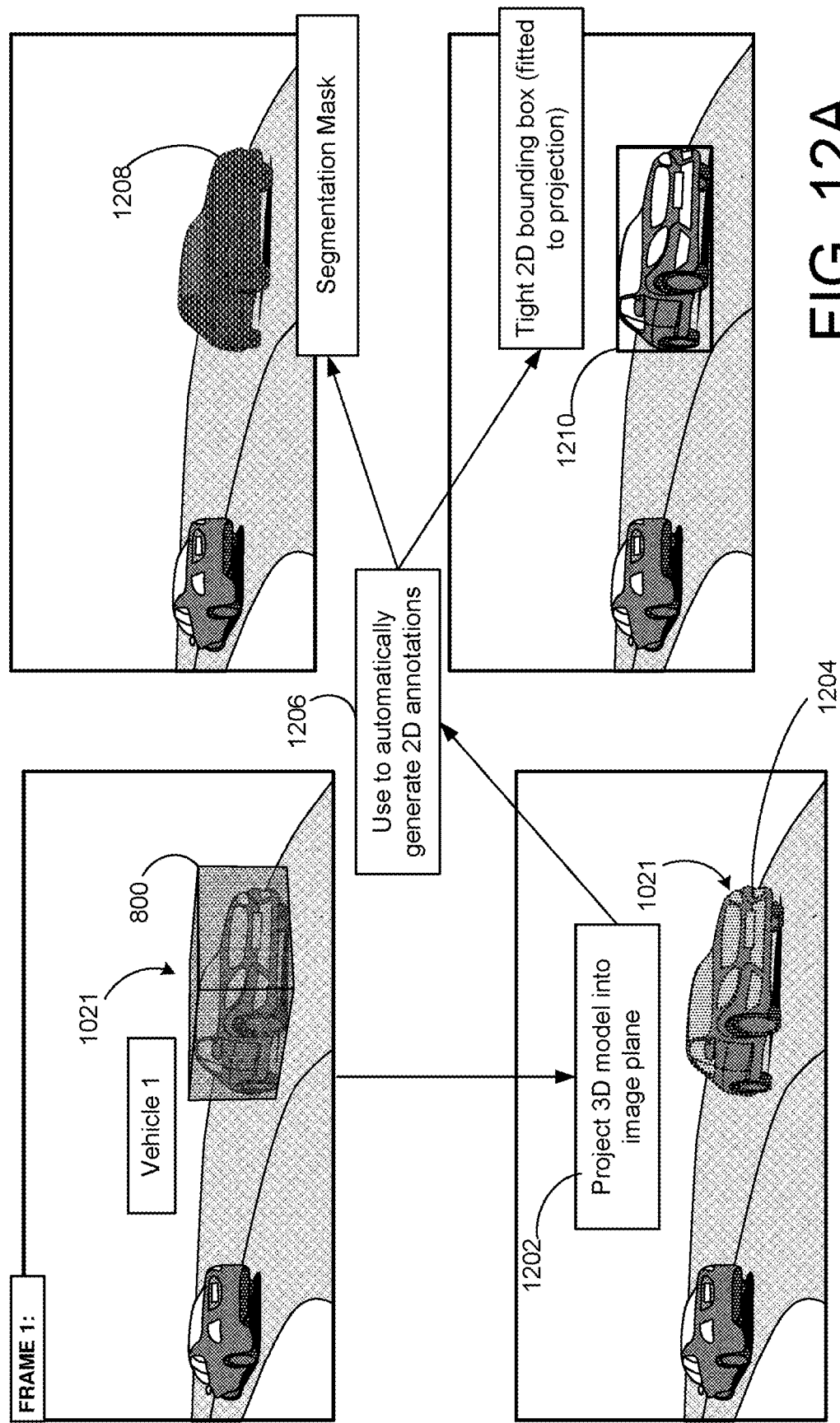

FIG. 12A, which shows a flowchart for a method of automatically generating 2D annotation data along with a graphical illustration of the method steps. The method is implemented by the 2D annotation generator 312.

At the top-left, frame 1 is depicted for ease of reference. Vehicle 1 is the object to be annotated in this example and is denoted by reference numeral 1021. The 3D model of that vehicle is determined by isolating the subset of the point cloud 400 within that bounding box, as described above and, at step 1002, that subset of the point cloud is projected into the image plane of the frame in question. The projection of the subset of the point cloud (i.e. the 3D model of the vehicle in question) is denoted by reference numeral 1204 in the bottom-left hand image. As can be seen, the projection of the point cloud 1004 coincides with the object 1000 as expected.

At step 1206, 2D annotation data for annotating the image 702 is automatically generated based on the projection 1204 of the 3D model into the image plane.

The 2D annotation data can be in the form of a 2D segmentation mask 1208 (top-right) which substantially matches the area of the object within the image plane (i.e. it at least approximately delineates the object in the image plane, tracing the boundary or boundaries of the object). Such annotation data is useful for training a segmentation component to perform instance segmentation, i.e. pixel-level classification of images, in which each pixel of an input image is classified individually. In this example, the annotated object 1021 belongs to a particular object class (such as "car" or "vehicle") and the image 702 in combination with the segmentation mask 1208 can be used in training a segmentation component to label image pixels as "car/not car" or "vehicle/not vehicle" for example, depending on whether or not those pixels lie within the area of the segmentation mask 1208.

The projection 1204 of the 3D object model is point-based and may be too sparse to serve as a useful segmentation mask directly (although this can be mitigated through the use of an aggregate object model). To generate the segmentation mask 1208, a predictive model, such as a conditional random field (CRF), may be applied to the projected points, in order to fill in and smooth the projection 1204, thereby converting it into a useful segmentation mask that accurately defines the area of the object within the image plane. In this context, the projection 1204 of the 3D model serves as a sparse prior, which the predictive model extrapolates from in order to predict a complete segmentation mask for the object. Optionally, the parameter(s) of the predictive model may be adjustable via the UI 320 in order to achieve the desired result. More generally, an annotator may be able to adjust parameters of the CRF and/or super pixel segmentation parameters etc. to effect manual corrections. This may be a post-processing step applied after the annotation data has been generated.

As another example, the 2D annotation data can be in the form of a tightly-fitted 2D bounding box 1210 (bottom-left). This is generated by fitting a 2D bounding box (rectangle in the image plane) to the projection 1204 of the 3D model. This, in turn, can be used, in combination with the image 702 itself, to train a 2D bounding box detector. Such a component, once trained, will be able to automatically detect and localize structure within images by automatically generating 2D bounding boxes for images it receives at inference.

An alternative would be to simply project the 3D bounding box into the image plane, and fit the 2D bounding box to the projection of the 3D bounding box. However, in general this will not result in a tight 2D bounding box: as can be seen in the top-right image of FIG. 12A, because the shape of the 3D bounding box 800 different from that of the vehicle, in general, the edge of the projected 3D bounding box will not coincide with the edge of the vehicle a it appears in the 2D image plane.

Once generated, the annotator has the option to fine-tune the 2D annotation data as needed, as denoted in FIG. 3 by the input from the UI 320 to the 2D annotation generator 312.

As noted, the 3D object model may be in the form of a 3D surface model fitted to the relevant extracted points. In that event, the 3D surface model is projected into the image plane in order to create the 2D annotation data. The projection is thus of the continuous 3D surface, which can provide higher quality 2D annotation data than a projection of a discrete (and possibly sparse) set of 3D structure points.

5.1 Occluded Objects:

2D annotation data can be generated for occluded objects using either single-frame or aggregate object models. The annotator can select between these two options via the UI 320 as appropriate.

Figure 12B:
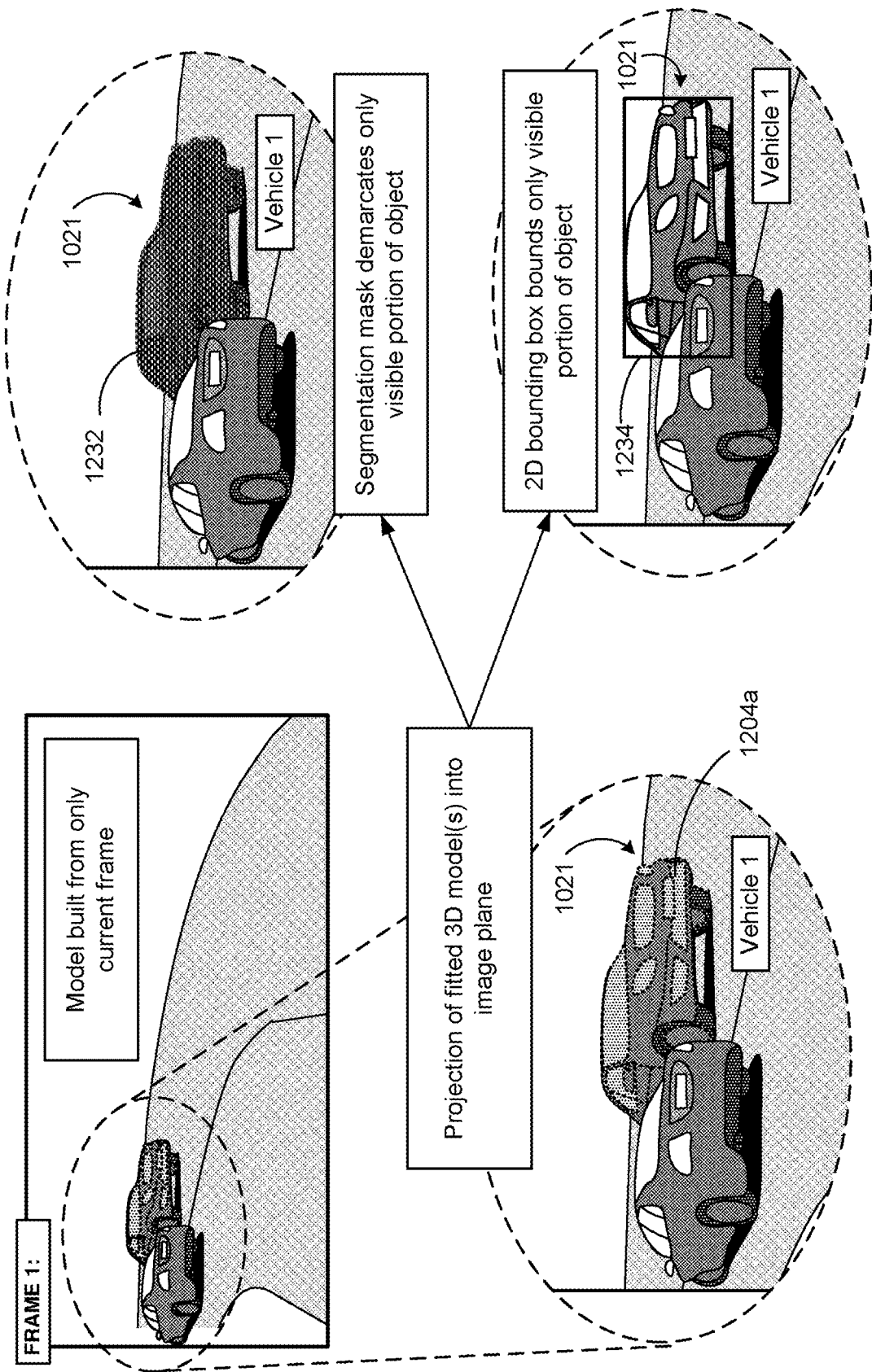

FIG. 12B uses frame 2 as an example, in which vehicle 1 is partially occluded by vehicle 2. In the example of FIG. 12B, a single-frame 3D model of vehicle 1 is determined based solely on the point cloud of frame 2, by isolating a subset of that point cloud within a 3D bounding box placed around vehicle 1 (not shown). Hence, the single-frame model of vehicle 1, denoted by reference numeral 1224 in the bottom-left of FIG. 12B, only includes non-occluded points of the first object 1220. Hence, when the single-frame 3D model 1224 is projected back into the image plane, and used to automatically generate 2D annotation data, that 2D annotation data will mark only the visible portion(s) of the occluded object 1220. The projection of the model is denoted by reference numeral 1204a towards the bottom left of the figure. This effect on the 2D annotation data is illustrated on the right-hand side, which shows a segmentation mask 1232 (top-right) generated based on the projection 1204 a of the single-frame model. As can be seen, this covers only the area of the visible portion of the occluded object 1232. Similarly, when a 2D bounding box 1234 (bottom-right) is fitted to the projection of a single-frame model, that bounding box will be tightly fitted to the visible portion of the occluded object 1220.

Figure 12C:
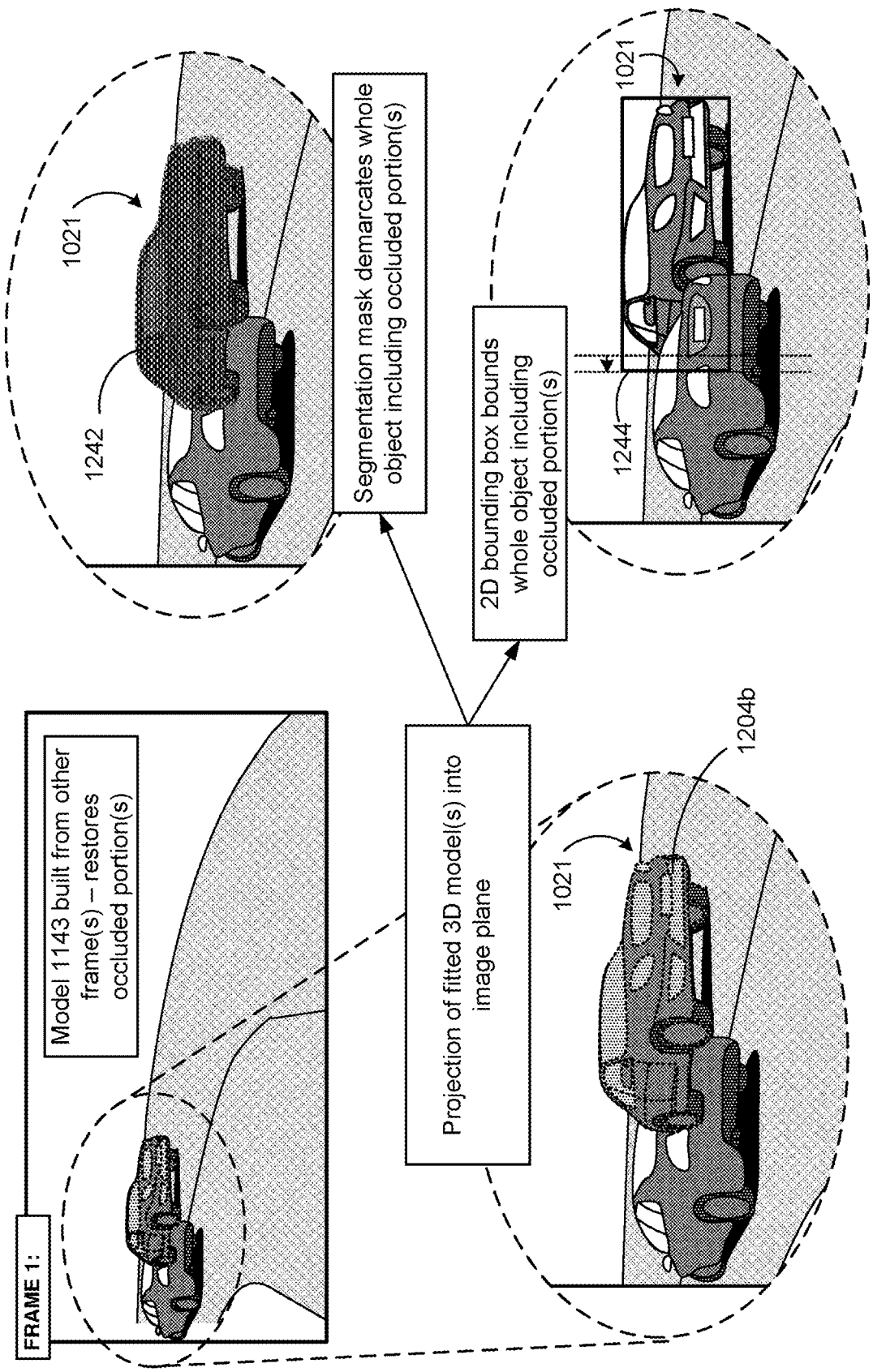

FIG. 12C shows a second example in which the object model 11 propagated from frame 1 is used instead. In this case, the occluded portion of the object 1220 is "filled-in" using point cloud data from one or more related frames in which that portion of the object is not occluded. As can be seen on the left-hand side of FIG. 12C, when such a model is projected back into the image frame, the occluded portion of the object is "restored". The projection of the propagated object model 1143 is denoted by reference numeral 1204b.

Thus, when that projection 1204b is used as a basis for a segmentation mask, denoted by reference numeral 1242 (top-right), this will cover the whole area of the object 1220—including the occluded portion(s). This may not be desired in practice, but it may nonetheless be desirable to use a propagated (e.g. aggregate) model in view of the other benefits it provides (greater density, less noise etc.). In that case, an aggregate model may be determined for the occluding object in the same way, and the 3D model of the occluding object can be used to "block" the projection of the 3D model into the image plane, and ensure the segmentation mask covers only the non-occluded part of the object that is visible in the image plane.

Similarly, when a 2D bounding box 1244 (bottom-right) is fitted to the projection of the propagated object model, that bounding box will be fitted to the whole object, including the occluded portion(s); depending on the location of the occluded portion(s), this may result in the 2D bounding box extending beyond the visible portion of the object—for example, in FIG. 12C, bottom-right, the left edge of the bounding box 1244 can be seen to extend beyond the left-most visible part of the object 1220 to encompass the occluded left-most portion of the object 1220.

A similar effect would be achieved by using an aggregate object model, for example generated by aggregating points from the point clouds of frame 1 and frame 2 corresponding to vehicle 1 in the manner set out above, and applying the aggregate model to frame 2.

5.2 Example Annotation Pipeline

Figure 18:
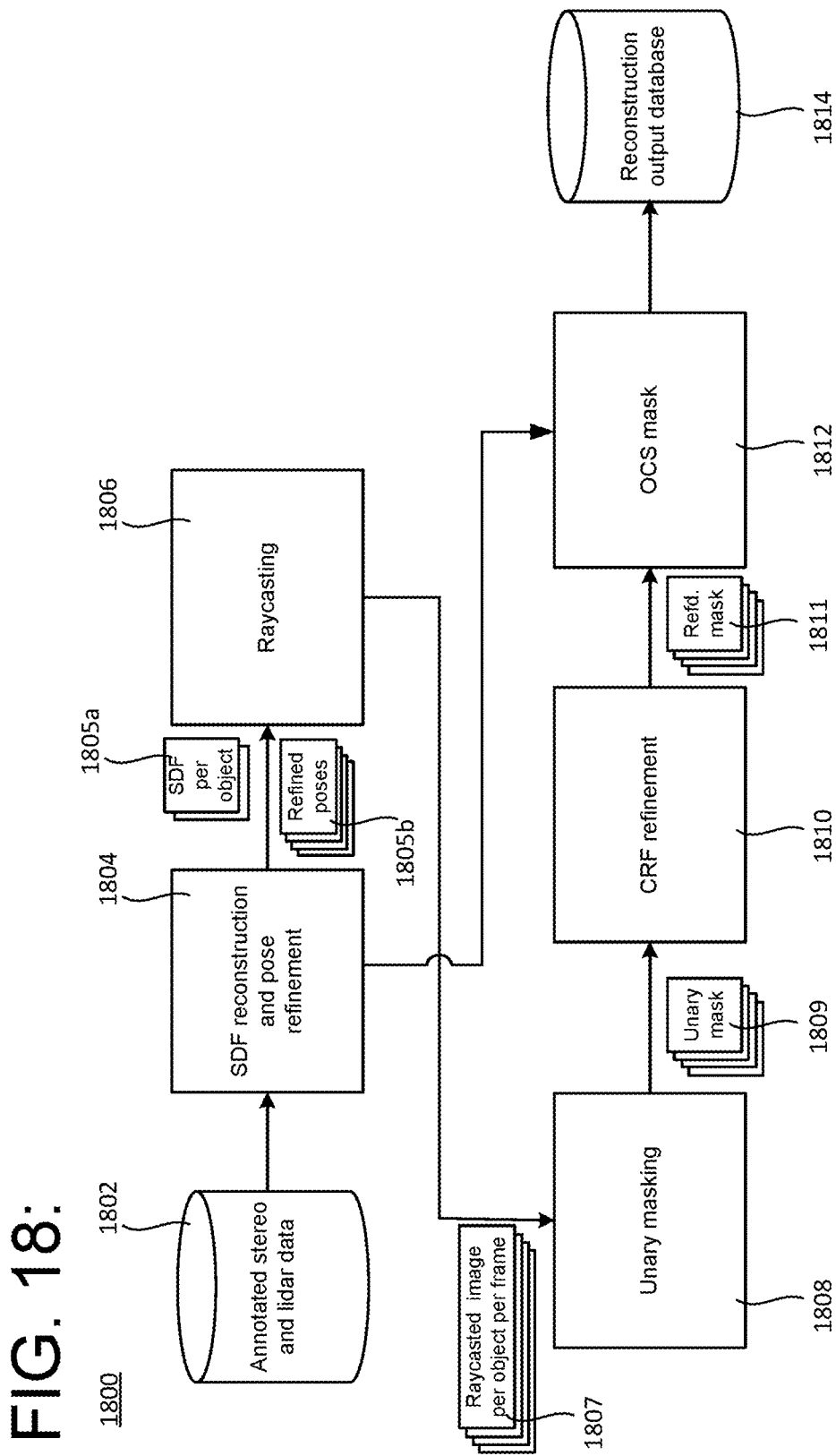
FIG. 18 shows an example of an annotation pipeline.

FIG. 18 shows an example of an annotation pipeline 1800 for moveable object reconstruction and instance segmentation, which incorporates a number of the techniques herein.

The annotation pipeline 1800 takes in annotated stereo data (which could be augmented with additional 3D structure data, such as LiDAR point cloud data) and outputs automatically generated instance segmentations and object coordinate maps. Instance segmentations are images where each pixel contains an index of any object visible at that pixel. Object coordinate maps are images where each pixel contains the 3D coordinates of the corresponding point on an object's surface, given in the reference frame of that object.

An input database 1802 is show, which holds each batch of frames to be passed through the pipeline 1800. Each batch of frames in the input database 1802 has been coarsely annotated (manually, automatically, or semi-automatically) with 3D bounding boxes, i.e. each frame is associated with a size and coarse 6D object pose for each annotated object in the frame.

An object reconstruction component 1804 receives a batch of frames from the input database 1802 and applies one of more of the object modelling techniques described above to generate a 3D model for each annotated object in the batch of frames (i.e. one model per object that is applied across all frames in the batch). In the present example, the object reconstruction component 1804 applies the techniques described in Section 4.2 above, to generate one SDF model for each object. As described in Section 4.2.5, this process also refines the relative pose between each object and the camera in each frame.

The object modelling and pose refinement may or may not be an iterative process. In the simplest non-iterative case, object models (e.g. SDFs) are generated, the poses are refined, and those are the final models and poses. In an iterative process, having computed the object models and the refined poses, the refined poses are used to update the object models, and (optionally) the updated object models are used to refine the poses again. This can continue for any number of iterations, e.g. some predetermined number of iterations or until some termination criteria (e.g. some convergence criteria for the poses and object models) is satisfied.

For a given batch of frames, the output of the object reconstruction component 180 is one object model (e.g. SDF) 1805a per object, together with a refined pose 1805b per object per frame (which, as noted, could be a camera pose in object space or an object pose in camera space, for example).

5.2.1 Raycasting

A recasting component 1806 computes a "raycasted image" for each object in each frame (i.e. one raycasted image per object per frame). The terms "ray tracing" and "raycasting" are used synonymously herein. The raycasted image is computed for a given object in a given frame using similar principles as described above with reference to FIG. 17. In FIG. 17, raycasting was used as part of the method of generating an SDF for an object.

In the present context, once the object reconstruction component 1804 has reconstructed the objects and refined the 3D bounding box poses, data is extracted from the SDF voxel grid into images via raycasting based on the refined poses. This means casting rays through each pixel and finding where the ray hits the object surface (implicitly) represented by the SDF.

Figure 19:
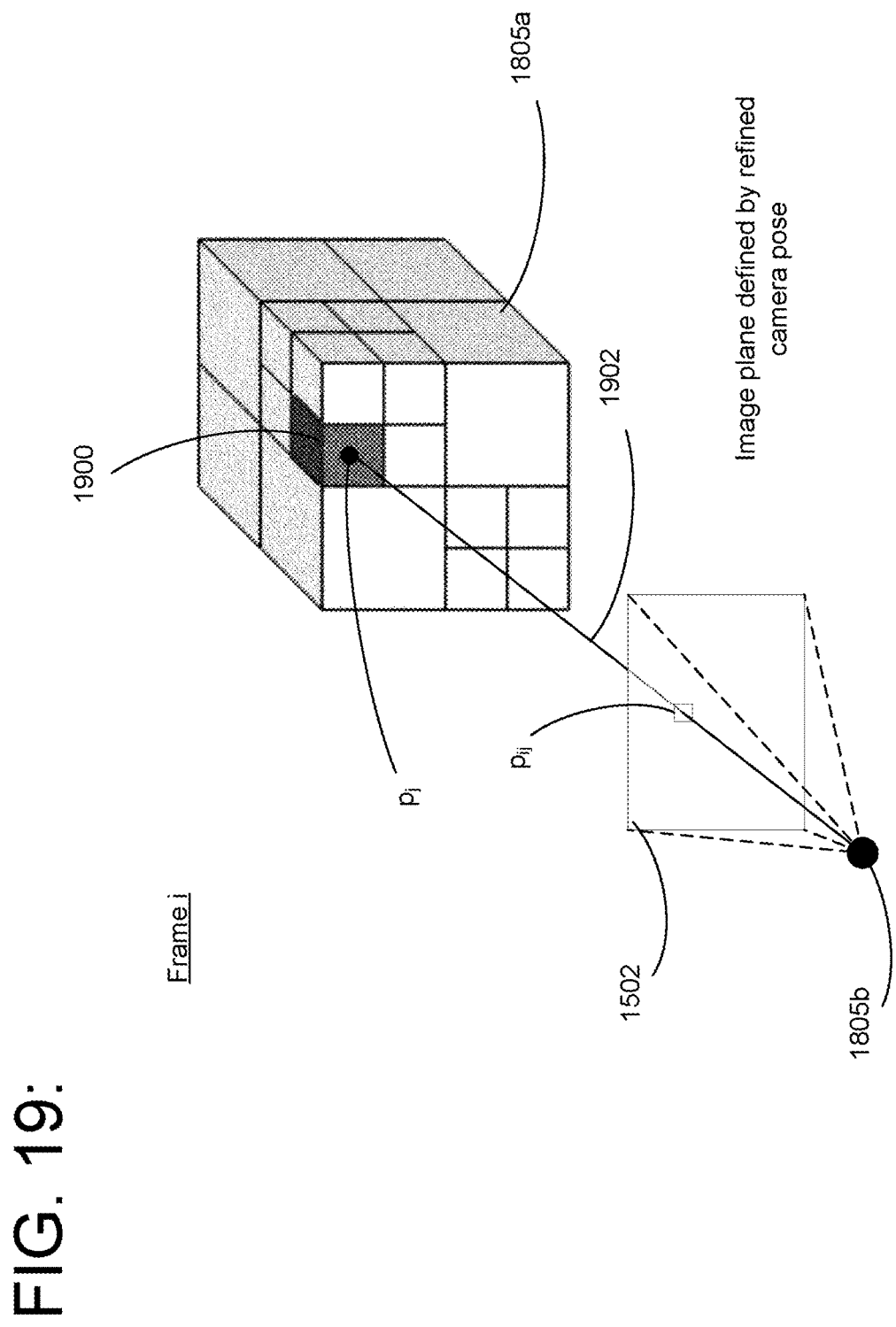
FIG. 19 illustrates certain principles of ray tracing.

FIG. 19 shows a perspective view of a frame (frame i), where raycasting is used to compute a raycasted image from an object SDF 1802. Although described in the context of SDFs, the principles can be applied to any form of object model, such as (aggregate) point clouds, mesh-based models etc. In the context of an SDF, the surface is defined by points at which the SDF is at least approximately zero-valued (the zero-set). However, the following description pertaining to an SDF zero-set applies equally to surface points of any other form of object model.

In keeping with FIGS. 15 and 19, FIG. 19 uses the reference numeral 1502 to denote an image plane for frame i. In this example, the image plane 1502 in FIG. 19 is defined by a refined camera pose 1805b provided by the object reconstruction component 1804, in the frame of reference of an object SDF 1805a.

A point $p_j$ in 3D space is shown, which is a point that substantially (exactly or approximately) lies on the object surface modelled by the SDF 1805a, i.e. it has a signed distance of substantially (exactly or approximately) zero. The point $p_j$ corresponds to an image pixel $p_{ij}$ via raycasting. In the present example, the point $p_{ij}$ is determined by tracing a ray through the camera and pixel $p_{ij}$ in the image plane 1502, and determining the point $p_{ij}$ where the traced ray 1902 intersects the object surface. The point $p_{ij}$ on the object surface could be approximated as a reference point (e.g. centre point) of the voxel 1900 intersected by the ray 1902 having the lowest signed distance, or it could be determined by interpolating between two or more neighbouring voxels near the implicitly represented object surface.

The pixel $p_{ij}$ corresponds to a pixel of the original RGBD image of frame i. Ray tracing is preferably performed to associate every pixel of the RGBD image (or at least a defined subset of the RGBD pixels) with a corresponding point on the surface represented by the object SDF 1805a (or the object model more generally). The purpose of ray tracing at this point in the pipeline is to associate each such pixel of the RGBD image with useful annotation data. This is 2D annotation data in the above sense (i.e. in the sense that it is defined in the image plane 1502 and associated with the underling image) that is generated from 3D annotation data (in this case, the refined pose 1805b, together with the object SDF 1805a).

From the voxel 1900 where the ray hits the surface, the mean and variance of the colour component of the voxel 1900 is extracted, along with the confidence weight and the 3D coordinate in object space (the object frame of reference) of the point $p_j$. Alternatively, this data could be similarly interpolated between neighbouring pixels. This data is recorded at the corresponding pixels in the raycast outputs. The depth of the point $p_i$ is also recorded (the z-coordinate in the camera frame of reference), and could be recorded in units of distance or as a disparity. Values associated with pixels in this manner via raycasting may be referred to as "raycasted values" and the following notation is used later in this section.

For conciseness, hereinafter, the notation omits the index used to denote a particular frame. Hence, in the following sections, unless otherwise indicated, the notation $p_j$ denotes pixel j in some given frame ($p_{ij}$ in FIG. 19), and $p$ denotes the corresponding point in 3D space ($p_j$ in FIG. 19).

$w_y(j)$—the raycasted confidence weight for pixel j and object y (a bar is added to denote a normalized weight—see below).

$d_y(j)$—the raycasted depth for pixel j and object y.

The raycasted depth $d_y(j)$ may not necessarily exactly match the measured disparity $d_j$ of the corresponding pixel $p_j$, not only because of disparity measurement error (as discussed in the context of the SDF update), but also because the object y might be occluded such that the measured disparity actually more closely corresponds to a different object that is (partially) occluding object y. Note that, with occluded objects, a pixel might be associated with multiple raycasted depths and weights for different (partially) occluding/occluded objects.

The refined camera-to-bounding box poses 1805b are used to perform the raycast for each instance for each frame of the batch.

All the raycasted object data from a single frame of the batch is combined with the original RGBD data to create a bootstrap estimation of the instance segmentation (the "unary mask").

Returning to FIG. 18, a unary masking component 1808 receives the raycasted images and uses the raycast image 1807 of each frame to compute unary mask 1811 for that frame. These are then refined, by a mask refinement component 1810, to create a refined mask 1811 for each frame. This two-stage masking process uses a CRF (conditional random field) model.

The CRF model is constructed broadly as set out in Krahenbuhl et. al "Efficient Inference in Fully Connected CRFs with Gaussian Edge Potentials (arXiv:1210.5644v1 [cs.CV] 20 Oct. 2012), incorporated herein by reference in its entirety, and referred to below as the DenseCRF paper. However, the CRF model herein differs in some respect to provide improved performance in the context of the present annotation tool.

Note, however, that the application of the model is quite different. Whereas the aim of the DenseCRF paper is to provide a CRF that can be trained to perform instance segmentation on unlabelled images, here the aim is to refine the results of the raycasting based on object models for the purpose of generating higher quality instance segmentation ground truth. The results of the raycasting are used as a prior (encoded in a unary term—see below), and this is quite different to the original application envisaged in the DenseCRF paper.

In the context of instance segmentation, a conditional random field over an image is a random distribution over all possible instances at each pixel, where the distribution is conditioned on the image. Given a cost function on this distribution, graph optimisation techniques are used to find an optimal posterior distribution. As described in more detail below, the dense CRF used herein has unary and pairwise potential terms:

$$E(x) = \sum_i \psi_u(x_i) + \sum_{i<j} \psi_p(x_i, x_j)$$

where the summation over the second term is over all pixels having a 1-dimensional pixel index i less than j. For this purpose, an image is treated as a 1-dimensional array—e.g. defined left-to-right, pixels within a given row could be assigned incrementally increasing pixel indexes; the index of the first pixel of the next row would be assigned by incrementing the index of the final pixel of the previous row.

MAP (maximum a posteriori) segmentation can be used to obtain an estimated instance segmentation, by choosing the most likely instance at each pixel, as described later.

5.2.2. Unary Mask

Following the notation of section 2 of the DenseCRF paper, the unary mask acts as a "prior" or "bootstrap" for instance segmentation, and it is the input to a CRF refinement process implemented by the mask refinement component 1810.

A novel form of prior is used in the present context, defined as:

$$\psi_u(x_i) := -\log\left(\frac{\hat{p}_\Pi(x_i)}{\sum_j \hat{p}_\Pi(x_j)}\right)$$

where the function $\psi_u$ may be referred to as the unary potential. For a given frame, this function is defined by the raycasted image 1807 computed for that frame. Here, $x_i$ denotes a particular instance classification (i.e. an instance that appears in the frame or the background) for pixel i (here, i is used in place of j to denote a particular pixel, rather than a particular frame); and $\hat{p}_n(x_i)$ is a "relative probability product". The sum is over all considered object instances and an additional background instance (for any pixel that does not belong to any of the considered object instances). The denominator can be seen to normalize the relative probability product across all object instances and background. The unary potential is thus defined as the negative logarithm of the normalized relative probability product.

Note that labels uniquely identify instances of one or more object classes in this context. Pixels i,j belonging to different instances (even if those are instances of the same object class) would have different instance classification labels $x_i \neq x_j$. The terms "object" and "instance" are synonymous in this context. There is a single background instance, to which all pixels which do not belong to any object instance belong.

For each frame of the batch, a unary mask is defined from the outputs of the raycasted image 1807 and the original RGBD sequence. The unary mask is an image where each pixel is a discrete distribution across all instances in the frame and the background, i.e. each pixel has n+1 channels where n is the number of instances in that frame, and each channel represents the probability of that pixel being the corresponding instance or the background.

The relative probability product is defined as $$\hat{p}_\Pi(x_i) = \begin{cases} 1 & \text{if } x_i \text{ is the background} \\ a\overline{w}(x_i)\hat{p}_{rgb}(x_i)\hat{p}_{occ}(x_i)\hat{p}_{bbox2d}(x_i)\hat{p}_{bbox3d}(x_i) & \text{otherwise} \end{cases}$$

where hats denote "relative" probabilities in comparison to the background, i.e. how much more likely a given pixel is to be a given instance than the background. Note that these relative probabilities are renormalized in defining the unary potential. When $x_i$ is non-background, the relative probability product is defined to be the product of six factors defined below. Each of these, excepi a (tuning parameter), is clipped at some small constant value E.

5.2.2.1 Tuning Parameter

The tuning parameter a is constant, its value is decided by a search over a ground truth dataset. High values bias towards moveable objects, low values bias towards background.

5.2.2.2 Normalized Raycasted Weight $\overline{w}(x_i)$ is the weight from the raycasted SDF of object at pixel i, normalised per object per frame so that the maximum weight on the raycasted image is 1, and subsequently clipped at a small minimum value E. Where the ray does not intersect the reconstructed object's surface, the weight is set to this minimum value. This is a proxy for confidence in the reconstruction.

5.2.2.3 Colour Deviation

A colour deviation factor $\hat{p}_{rgb}(x_i)$ downweights instances whose raycasted colour statistics from the reconstruction are a poor match for the instantaneous colour observation. This is effective for removing static-scene occlusions from the instance segmentation.

For each non-background instance $x_i$, an observed instantaneous colour at pixel i is modelled as a random variable with a Gaussian distribution on RGB colour space, using the raycasted mean and variance of the reconstructed colour. The colour deviation factor $\hat{p}_{rgb}(x_i)$ is the (epsilon-clipped) probability of finding a more extreme colour than observed:

$$\hat{p}_{rgb}(x_i) = \begin{cases} \max\left(\epsilon, \text{erfc}\left(\left(\sqrt{\frac{(R_z(i) - I_i)\sigma_z(i)^{-1}(R_z(i) - I_i)}{2}}\right)\right)\right) & \text{if ray at pixel } i \text{ intersects reconstruction of object } x_i \\ 1 & \text{otherwise} \end{cases}$$

where $R_x(i)$ is the raycasted mean RGB colour of instance $x_i$ at pixel i; $I_i$ is the observed RGB colour of pixel i (i.e. its RGB value in the original RGBD image); and $\sigma_x(i)$ is the raycasted covariance of the RGB colour of instance $x_i$ at pixel i. A small regularization value to the diagonal of $\sigma_x(i)$ to ensure non-singularity, and a diagonal covariance is assumed.

5.2.2.4 Colour Deviation

An inter-reconstruction occlusion factor $\hat{p}_{occ}(x_i)$ down-weights reconstructed instances with other reconstructions occluding on the same ray.

Given the raycasted depths $d_y(i)$ and normalised raycasted weights $\overline{w}_y(i)$ of the reconstructions of all objects y which appear at a pixel i, the inter-reconstruction occlusion factor for object $x_i$ is defined as $$\hat{p}_{rgb}(x_i) = \begin{cases} \max\left(\epsilon, \mathrm{erfc}\left(\sqrt{\frac{(R_z(i) - I_i)\sigma_z(i)^{-1}(R_z(i) - I_i)}{2}}\right)\right) & \text{if ray at pixel } i \text{ intersects reconstruction of object } x_i \\ 1 & \text{otherwise} \end{cases}$$

where $\mathbb{1}_X$ is the indicator function on condition X:

$$\mathbb{1}_X := \begin{cases} 1 & X \text{ is true} \\ 0 & X \text{ is false} \end{cases}.$$

Note that the term $$\frac{\sum_y \mathbb{1}_{d_y(i)<d_x(i)} \overline{w}_y(i)}{\sum_y \mathbb{1}_{d_y(i)<d_x(i)}}$$

is the mean normalised weight of occluding reconstructions.

Then the effect of inter-reconstruction occlusion factor is to downweight the unary mask of objects with occlusions by the mean normalised weight of occluding reconstructions.

5.2.2.5 2D Bounding Box

A 2D bounding box factor $\hat{p}_{bbox2d}(x_i)$ for object $x_i$ at pixel i is defined as $$\hat{p}_{bbox2d}(x_i) := \begin{cases} 1 & \text{if pixel } i \text{ is in the 2D bounding box of object } x_i \\ \epsilon & \text{otherwise} \end{cases}$$

This has the effect of clipping the unary mask to the 2D bounding box.

5.2.2.6 3D Bounding Box

A 3D bounding box factor $\hat{p}_{bbox3d}(x_i)$ up-weights depth points falling inside the 3D bounding box and down-weights depth points falling far outside the 3D bounding box. It is defined as $$\hat{p}_{bbox3d}(x_i) := \begin{cases} k & \text{if point } i \text{ of the instantaneous } \textit{pointcloud} \text{ is inside the 3D bounding box for object } x_i \\ 1 & \text{if point } i \text{ of the instantaneous } \textit{pointcloud} \text{ is in the disparity uncertainty margin for object } x_i \text{ or has invalid depth} \\ \epsilon & \text{otherwise} \end{cases}$$

where k is a constant greater than 1 and the "disparity uncertainty margin" for object $x_i$ is defined as the region of space inside the bounding box when dilated by a factor of $c(x_i)$ about its centre, but not inside the original bounding box, where $$c(x_i) := \frac{bf/s}{\max\left(0, \frac{bf}{s} - \delta\right)}$$

where b is the stereo baseline, $f$ is the camera focal length, s is a slant distance to the ground centre point of the bounding box and $\delta$ is a tuning parameter representing the uncertainty in disparity estimation. This represents scaling the bounding box by a factor equivalent to disparities, when transformed to "slant distance space". In the definition of the dilation factor the possible zero-division is allowed to give a positive infinite result, and this is interpreted as an infinite disparity uncertainty margin.

5.2.3 CRF Refinement

The mask refinement component 1810 takes the estimated "soft" segmentation that is the unary mask 1809 and performs an optimisation of a cost function defined over the fully connected graph of pixels. The cost function (Gibbs energy) is defined to smooth the input unary mask and snap instance boundaries to any depth and colour boundaries in the input RGBD data:

$$E(x) = \sum_i \psi_u(x_i) + \sum_{i<j} \psi_p(x_i, x_j)$$

where x is a possible segmentation mask (labeling each pixel as one of the object classes or as background). The aim is to find a maximum a posteriori (MAP) segmentation mask that minimizes the Gibbs energy:

$$x^* = \underset{x}{\mathrm{argmin}} E(x).$$

The term $\psi_u$ is the unary potential described above (that incorporates the prior information from the raycasted image 1807) and the second term is a pairwise potential, which improves the DenseCRF pairwise potential by adding a depth sensitive term and introducing instance-size-aware compatibility (see the DenseCRF paper for more details on notation):

$$\psi_p(x_i, x_j) := \underbrace{\mu(x_i, x_j, \theta_\alpha, \mu_{max\,\alpha})}_{\text{size-aware (our addition)}} \underbrace{\exp\left(-\frac{|p_i - p_j|^2}{2\theta_\alpha^2} - \frac{|I_i - I_j|^2}{2\theta_\beta^2}\right)}_{\text{appearance kernel}} +$$

$$\underbrace{\mu(x_i, x_j, \theta_\gamma, \mu_{max\,\gamma})\exp\left(-\frac{|p_i - p_j|^2}{2\theta_\gamma^2}\right)}_{\text{smoothness kernel}} +$$

$$\underbrace{\mu(x_i, x_j, \theta_\delta, \mu_{max\,\delta})\exp\left(-\frac{|p_i - p_j|^2}{2\theta_\delta^2} - \frac{|I_i - I_j|^2}{2\theta_\epsilon^2} - \frac{|(bf/z_i) - (bf/z_j)|^2}{2\theta_\zeta^2}\right)}_{\text{depth-sensitive kernel (our addition)}}$$

where $p_i$ denotes the position of pixel i, $z_i$ denotes the instantaneous depth of pixel i, $\theta_\alpha$, $\theta_\beta$, $\theta_\gamma$, $\theta_\delta$, $\theta_\epsilon$, $\theta_\zeta$ are feature scales, and $\mu_{max,\alpha}$, $\mu_{max,\gamma}$, $\mu_{max,\delta}$ are maximum compatibilities.

In the above, $z_i$ may be the measured depth associated with the pixel i in the RGBD depth map. Alternatively, it may the ray casted depth for the applicable object. The depth-sensitive kernel can be defined in terms of depth or disparity.

As can be seen, a size-aware coefficient is applied to each kernel with the applicable feature scale. The size-aware coefficient is defined as $$\mu(x_i, x_j, \theta, \mu_{max}) := \max_{k \in \{i,j\}}\left(\mu_{max}\exp\left(-\left(\frac{\theta}{\alpha\theta_{x_k}}\right)^2\right)\right), i < j$$

where $\alpha$ is a tuning parameter and $\theta_{x_k}$ is the standard deviation of pixel positions when uniformly distributed within a 2D bounding box of object $x_k$.

The above uses the 2D bounding box x from the input data set. Alternatively, the 2D bounding box could be defined by the segmentation mask x under consideration, for example by fitting a 2D rectangle to the subset set of pixels whose labels in x that belong to the same object $x_k$ (i.e. the same instance—recall that different instances have different labels in this context). In that case, $\theta_{x_k}$ depends on the segmentation mask x under consideration and, in particular, depends on the size of the 2D bounding box defined for each object instance (ignoring background—see below).

Given bounding box width w and height h, $$\theta_{x_k}^2 = \frac{1}{2}(w^2 + h^2)$$

Further details, and a derivation of the above, may be found in Annex C at the end of this description.

The bounding box of the background class is defined to be infinitesimally small, so that it does not contribute to the compatibility calculation. The instance-size-aware compatibility has the effect of reducing the smoothing effect for small classes proportionally to their 2D bounding box size, so they are not disproportionately over-smoothed into oblivion, which is a problem seen with the traditional constant compatibility.

When defining the depth kernel, care has to be taken with invalid depths $z_i \in \mathbb{R}$, for example, partially occluded regions, or regions where there is little texture. To ensure invalid regions get an approximately constant, small smoothing cost, invalid depths are replaced with randomly shuffled large values.

In the above formulation, pixel features take the form of the raw colour vectors $I_i$, $I_j$. However, the CRF is not limited in this respect. Annex C uses a more general formulation in terms of feature vectors $f_i$, $f_j$, which can take any form that facilitates a meaningful feature-based comparison between pixels.

5.2.4 OCS Masking

To reduce the size of the output database 1814, instead of outputting an object coordinate map per object per frame, an OCS masking component 1812 a single object coordinate map is outputted, where each pixel contains the object coordinates of the corresponding object given by the MAP segmentation. The MAP segmentation is determined as set out above, by taking the most probable instance class for each pixel from the refined CRF mask 1811.

5.2.5 Reference Frame Convention

The reference frame convention of the output object coordinate maps is adopted from uses x-forward, y-left, z-up axes and originates at the ground center point.

6. Interpolation Based on Vehicle Path

Reference is made to United Kingdom Patent Application No. 1815767.7, which is incorporated herein by reference in its entirety. This discloses a method by which a path of an external vehicle may be inferred in dependence on the reconstructed ego vehicle path.

In the present context, the reconstructed vehicle path may be used to determine the initial coarse-estimate of the pose 1121 of the bounding box 800 (FIG. 11B) automatically.

Figures 13A, 13B:
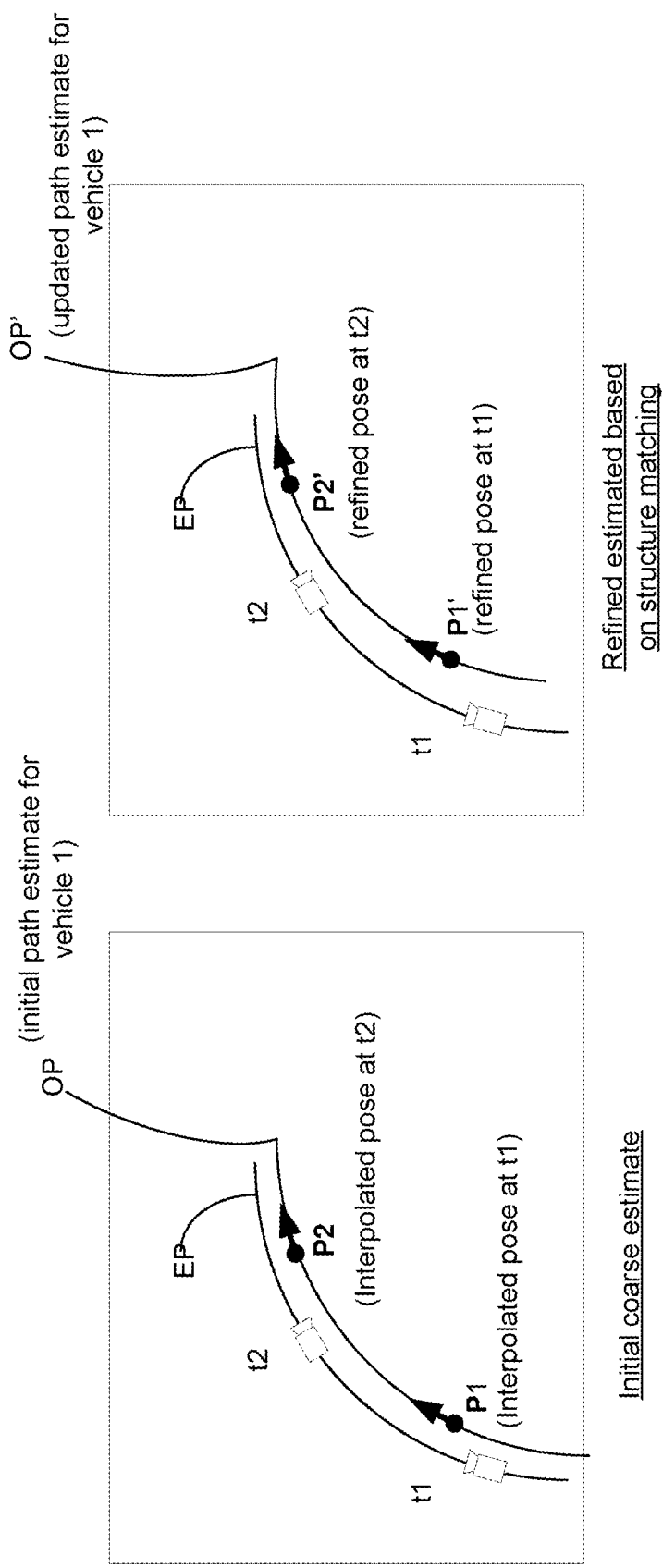
FIGS. 13A to 13C schematically illustrate how vehicle path information may be incorporated into an automatic or semi-automatic annotation process.

With reference to FIGS. 13A and 13B, an additional optional feature allows the accuracy of the vehicle path to, in turn, be increased as the position estimate is refined.

FIG. 13A shows the camera at known poses, at respective time instants t2, t2, along the reconstructed ego-vehicle path, denoted EP (ego path). An object path (OP) has been inferred for the object to be annotated (vehicle 1 in the above enables), based on the ego path EP. Based on the time instants t1 and t2, the respective poses of the object can be initially inferred by interpolation from the object path OP, as P1 and P2. This provides a starting point for the manual or automatic registration with the 3D model 1143 of vehicle 1 with the point clouds at time instants t1 and t2 respectively.

FIG. 13B shows that refined (more accurate) poses P1', P2' have been determined by aligning the 3D model 1143 with the point clouds at time instants t1 and t2 respectively, in the manner described above.

Additionally, now that those more accurate poses P1', P2' are know, an updated vehicle path OP' can be determined based thereon as indicated in FIG. 13B.

This can be used for various purposes—for example, to provide more accurate initial pose estimates in respect of other frames.

Information about the vehicle path can also be incorporated into the structure matching process, to penalize changes in the pose of the 3D bounding box 800/3D model 1143 which deviate from an expected vehicle behaviour model, i.e. which cause unexpected changes in the vehicle path.

Figure 13C:
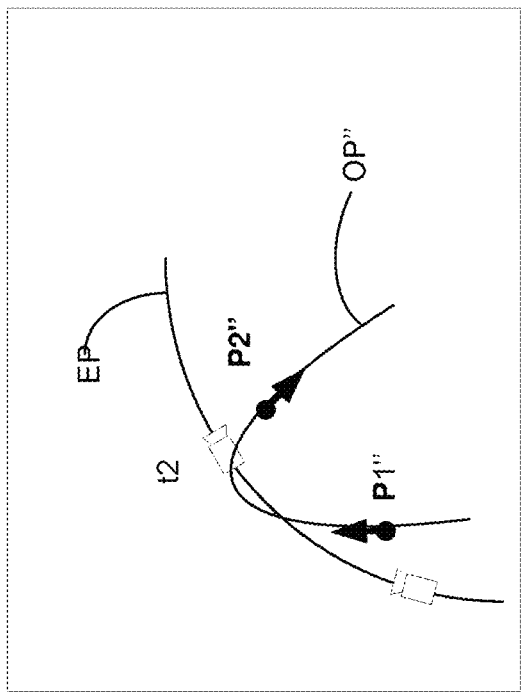

An example is illustrated in FIG. 13C—in this case poses P1" and P2" at t1 and t2 respectively may happen to provide good registration of the 3D model 1143 with the point could at t1 and t2 respectively. However, these poses P1" and P2" imply an unrealistic path for vehicle 1 denoted OP", which should be penalized according to the expected behaviour model.

This dependence on expected behaviour may be incorporated in a cost function, which rewards good registration but penalizes unexpected changes in the vehicle path. The automatic alignment process to register the model 1143 with the point cloud of the frame in question is applied so as to optimize the cost function. Hence, in the example of FIG.

13C, alternative poses may be instead be selected if the penalty assigned to path OP" by the cost function is too high.

6.1 Iterative Path Refinement

The principles set out above can be applied in an iterative fashion, by iteratively building out from an initial coarse annotation i.e. by creating initial annotation(s), aligning the poses(s), refining motion model, repeat with more poses based on the refined model motion and so on.

As indicated, the coarse annotation could be provided by:
1. model in the loop (e.g. a neural network or a moving object detector) in 2D or 3D;
2. coarse dynamics model of bounding box (e.g. constant velocity);
3. by providing a "one-click" on object function point or 2D "lasso" function around points;
d. minimising some cost function that takes into account 2D error, 3D error and likely behaviour.

With reference to FIG. 2, an instance of a perception component 102 refers to any tangible embodiment of the one or more underlying perception models of the perception component 102, which can be a software or hardware instance, or a combined software and hardware instance. Such an instance can be embodied using programmable hardware, such as a general-purpose processor (e.g. CPU, accelerator such as a GPU etc.) or a field programmable gate array (FPGA), or any other form of programmable computer or computers. A computer program for programming a computer can thus take the form of program instructions for execution on a general-purpose processor, circuit description code for programming an FPGA etc. An instance of a perception component can also be implemented using non-programmable hardware, such as an application specific integrated circuit (ASIC), and such hardware may be referred to herein as a non-programmable computer. In general, a perception component may be embodied in one or more computers which may or may not be programmable, and which are programmed or otherwise configured to execute the perception component 102.

With reference to FIG. 3, the components 302-314 of FIG. 3 are functional components of the annotation computer system 300 which may be implemented at the hardware level in various ways: although not shown in FIG. 3, the annotation computer system 300 comprises one or more processors (computers) which carry out the functionality of the aforementioned components. A processor can take the form of a general-purpose processor such as a CPU (Central Processing unit) or accelerator (e.g. GPU) etc. or more specialized form of hardware processor such as an FPGA (Filed Programmable Gate Array) or ASIC (Application-Specific Integrated Circuit). Although not shown separately, the UI 320 typically comprises at least one display and at least one user input device for receiving user inputs to allow the annotator to interface with the annotation system 300, such as a mouse/trackpad, touchscreen, keyboard etc. With reference to FIG. 5, the image rectifier 504, depth estimator 506 and depth transformation component 508 are functional components of the stereo image processing system 500 which can be implemented at the hardware level in different ways. For example, the functionality of the stereo image processing system 500 can be implemented in software, i.e. by computer code executed on a processor or processors such as a CPU, accelerator (e.g. GPU) etc., or in hardware (e.g. in an FPGA fabric and/or application specific integrated circuit (ASIC)), or using a combination of hardware and software. By way of example, United Kingdom Patent Application Nos. 1807392.4 and 1817390.6, each of which is incorporated herein by reference in its entirety, disclose examples of FPGA-based implementations of Semi Global Matching, which may be applied in the present context.

It will be appreciated that the above description has been provided by way of example only. Further aspects and embodiments of the present disclosure are set out below.

2D from 3D

A first aspect of the present disclosure (Aspect A) provides a computer-implemented method of creating 2D annotation data for annotating one or more perception inputs, the method comprising, in an annotation computer system: receiving at the annotation computer system at least one captured frame (first frame) comprising a set of 3D structure points, in which at least a portion of a structure component is captured; computing a reference position for the structure component within the frame; generating a 3D model for the structure component by selectively extracting 3D structure points of the frame based on the reference position; computing a projection of the 3D model into an image plane; and storing 2D annotation data of the computed projection in persistent computer storage for annotating the structure component within the image plane.

Embodiments of Aspect A may provide one or more of: manual annotation, automatic annotation and semi-automatic annotation.

In embodiments of Aspect A (Embodiments A1), the 2D annotation data may be stored in association with at least one perception input of said frame for annotating the structure component therein, and the projection may be computed based on the reference position computed within that frame. That is to say, the 2D annotation data may for the first frame which is also used to generate the 3D model, by applying the 3D model in that same frame.

Some such embodiments may further create 3D annotation data for the first frame, where the 3D annotation data comprises or is derived from the reference position. Preferably the 2D and 3D annotation data are created for the first frame using a common set of annotation operations.

In alternative embodiments of Aspect A (Embodiments A2), the 2D annotation data may be stored in association with at least one perception input of a second frame for annotating the structure component in the at least one perception input of the second frame, in which second frame at least a portion of a structure component is captured. That is to say, the 3D model may generated from a first frame (or a combination of the first and second frames in the case of an aggregate model), and applied in the second frame to create the 2D annotation data for the second frame. This is an example of "model propagation" as that term is used herein.

In the context of Embodiments A1, the structure component may be referred to as a common structure component (common to both frames). It is noted in this respect that, unless context demands otherwise, all description pertaining to a common structure component captured in multiple frames applies equally to the structure component of Embodiments A1 as captured in one or more frames.

In the general context of Aspect A, the first frame from which the 3D model is generated may be referred to as the "reference frame" and the term "target frame" may be used to refer to the frame for which the annotation data is created. Note that, in the context of Embodiments A1, the first frame is both the target frame and the reference frame. In the context of Embodiments A2, the second frame is the target frame.

In embodiments of Aspect A, the 3D model may also be used to create 3D annotation data for annotating the structure component in 3D space.

For example, 3D annotation data may be created for annotating the structure component in at least one perception input of a second frame, in which at least a portion of a structure component is captured. That is, the 3D model may be generated from the first frame and applied in the second frame in order to create 3D annotation data for the second frame.

The 2D or 3D annotation data may be created for annotating the at least one perception input of the second frame (the frame for which the 2D and/or 3D annotation data is generated) by computing an aligned model position for the 3D model within the second frame (see below). 2D annotation data may alternatively be created for the target frame by projecting the 3D model, as generated from the reference frame, into an image plane associated with the target frame, based on the aligned model position determined within the target frame. This means that a projection derived from the selectively-extracted points of the reference frame is used to create 2D annotation data for the target frame.

Alternatively, 2D annotation data may be created for the target frame by using the aligned model position (as determined using the 3D model generated from the reference frame) to generate a second 3D model, by selectively-extracting 3D structure points of the target frame based on the aligned model position, then projecting the second 3D model (as generated from the target frame) into the image plane associated with the target frame. In this case, the 2D annotation data comprises or is derived from a projection of the second 3D model generated from the target frame but positioned using the 3D model generated from the reference frame.

As another example, the second 3D model may be an aggregate 3D model generated by aggregating the selectively-extracted 3D structure points of the target and reference frames.

The selectively-extracted 3D structure points may be selectively extracted from the frame for generating the 3D model based on the reference position and one or more bounding object dimensions.

The one or more bounding object dimensions may be one of:
(i) manually-determined based on one or more sizing inputs received at a user interface,
(ii) automatically-determined by applying a perception component to the frame,
(iii) semi-automatically-determined by applying the perception component to the frame and further based on the one or more sizing inputs, and
(iv) assumed.

The selectively-extracted 3D structure points may be a subset of points within a 3D volume defined by the reference position and the one or more bounding object dimensions.

The 3D above annotation data may further comprise the one or more bounding object dimensions used to generate the 3D model, or a transformation thereof (thus defining a 3D bounding box for the applicable perception input).

The above second model may be generated from the target frame based on the aligned model position and the same one or more bounding object dimensions (for annotating a rigid common structure component) or a transformation thereof (for annotating a non-rigid common structure component).

Model Propagation

Second and third aspects of the present disclosure (Aspect B and Aspect C respectively) each provide computer-implemented method of creating one or more annotated perception inputs, the method comprising, in an annotation computer system: receiving a plurality of captured frames, each frame comprising a set of 3D structure points, in which at least a portion of a common structure component is captured; computing a reference position within a reference one of the frames; generating a 3D model for the common structure component by selectively extracting 3D structure points of the reference frame based on the reference position within that frame; determining an aligned model position for the 3D model within the target frame; and storing annotation data of the aligned model position in computer storage, in association with at least one perception input of the target frame for annotating the common structure component therein.

In accordance with Aspect B, the aligned model position is determined based on:
(i) one or more manual alignment inputs received in respect of the target frame at a user interface whilst rendering the 3D model for manually aligning the 3D model with the common structure component in the target frame.

In accordance with aspect C, the aligned model position is determined based on:
(ii) an automatic alignment of the 3D model with the common structure component in the target frame.

In embodiments, the automatic alignment may match features (2D or 3D) of the 3D model with features (2D or 3D) of the common structure component. However, the subject matter of aspect C is not limited in this respect and forms of automatic alignment are viable (see below for further examples).

Example Annotation Data

The term "annotation data of an aligned model position" means annotation data that comprises or is otherwise derived using the aligned model position.

For example, the annotation data of the aligned model position may comprise position data of the aligned model position for annotating a position of the common structure component in the at least one perception input of the target frame. Such position data is derived "directly" from the aligned model position (subject to any geometric transformation into a suitable frame of reference, as needed), i.e. once the 3D model has been used to determine the aligned model position, it plays no further role in the creation of such annotation data.

The position data may for example be 3D position data for annotating the position of the common structure component in 3D space (a form of 3D annotation data).

Alternatively or additionally, the annotation data of the aligned model position may comprise annotation data derived from the 3D model using the aligned model position (derived annotation data). That is to say, the 3D model may be both used to determine the aligned model position, and once that aligned model position has been determined, it may also be used to derive annotation data from the 3D model itself.

As another example, the 3D model generated from a reference frame (first 3D model) may be used to determine the aligned model position in a target frame. That aligned model position may then be used to generate a second 3D model from the target frame (see above). Hence, in that event, annotation data of the aligned model position may comprise annotation data derived from the second 3D model using the aligned model position.

An example of derived annotation data is 2D annotation data derived by projecting the applicable 3D model into an image plane based on the aligned model position. Such 2D annotation data may for example comprise a 2D bounding object fitted to a projection of the 3D model in the image plane, or a segmentation mask comprising or derived from the computed projection.

In embodiments of both Aspect B and Aspect C, the annotation data may be 2D annotation data, 3D annotation data, or a combination of 2D annotation data and 3D annotation data stored in association with one or more perception inputs of the target frame (i.e. each form of annotation data may be stored in association with the same perception input of different respective perception inputs of the target frame).

The annotation data may comprise refined annotation data computed by applying a predictive model in dependence on the subset of the 3D point cloud.

In the case of 3D annotation data, the predictive model may be applied to the 3D model itself.

In the case of 2D annotation data, the predictive model may be applied to the 3D model itself (before it is projected) or to the computed projection of the 3D model in the image plane.

Irrespective of whether the predictive model is applied to the 3D model or, in the case of 2D annotation data, the computed projection, the predictive model results in such refined annotation data.

The refined annotation data may for example have the effect of providing "filled-in" or "smoothed" annotation for the structure component.

The predictive model may be a conditional random field (CRF).

Model Alignment

Embodiments of Aspect B may provide one or both of manual annotation (i.e. (i) only) and semi-automatic annotation (i.e. based on the combination of (i) and (ii)) via propagation of the 3D model into the target frame.

Embodiments of Aspect C may provide one or both of automatic annotation (i.e. (ii) only) and semi-automatic annotation (i.e. based on the combination of (i) and (ii)) via propagation of the 3D model into the target frame.

That is, the aligned model position is determined by aligning the 3D model with the (portion of the) common structure component captured in the second frame, manually (based solely on the manual alignment inputs), automatically (based solely on the automatic alignment) or semi-automatically (based on both the manual alignment inputs and the automatic alignment), as applicable.

Embodiments A2 of Aspect A may be manual, automatic or semi-automatic, i.e. based on (i), (ii) or a combination of (i) and (ii).

In any of the preceding or following, the 3D model may be an aggregate 3D model as determined by aggregating selectively-extracted 3D structure points from two or more frames.

Aggregate Models

The 3D model may be an aggregate 3D model determined by aggregating the selectively extracted data points of the reference frame with data points extracted from the target reference frame, wherein the automatic alignment matches the aggregate 3D model with the common structure component in the target frame by matching the 3D structure points of the 3D model extracted from the reference frame with the common structure component in the target frame.

The method may comprise selectively extracting 3D structure points from the target frame based on the aligned model position and aggregating them with the selectively-extracted points of the first frame to generate an aggregate 3D model.

Alternatively or additionally, the 3D model may be an aggregate 3D model determined by aggregating the selectively extracted data points of the reference frame with data points extracted from at least a third of the frames other than the target and reference frames.

It will of course be appreciated that an aggregate model can be generated from more than two frames (and possibly many more frames, to build a dense aggregate 3D model).

The method may comprise the step of applying noise filtering to the aggregated 3D structure points, to filter-out noise points therefrom, for generating the aggregate 3D model.

Alternatively or additionally, the aggregate 3D model comprises a 3D surface model fitted to the aggregated 3D structure points (in the case that noise filtering is applied, this may be fitted to the filtered 3D structure points i.e. from which noise points have been filtered-out).

Alternatively or additionally, the method may comprise the step of applying a predictive model in dependence on the aggregated 3D surface points. For example, applying a predictive model to the aggregated 3D surface points in order to generate the 3D model, and/or applying a predictive model to a 2D projection of the aggregate 3D model in order to create a segmentation mask or other 2D annotation data.

Whilst noise filtering, predictive modelling and/or surface fitting may be applied for both single-frame and aggregate 3D models, there are particular benefits when one or more of these are applied with aggregate 3D models. For noise filtering, noise points within an aggregated set of structure points will be relatively sparser that points which actually belong to the common structure component, and thus can be filtered out more precisely. For predictive modelling, the aggregated points provide a stronger prior.

Further examples of aggregate model features are provided below.

Manual/Semi-Automatic Alignment An aggregate 3D model can be usefully rendered to assist in manual alignment of the aggregate 3D model with the common structure component in the target frame.

For example, in a manual or semi-automatic alignment context, the aggregate 3D model may be updated and re-rendered as the one or more manual alignment inputs are received at the user, such that the aligning of the second reference position with the common structure component in the second frame has the effect of correcting a visual artefact in the rendered aggregate 3D model caused by initial misalignment of the second reference position.

Such visual artefact are caused by misalignment of the model position within the target frame relative to the reference position in the reference frame. For example, an annotator may be able to see duplicate or misaligned structural elements, features etc. within the aggregate 3D model. By adjusting the model position until such time as those artefacts are no longer visible, the annotator can find the correct model position within the target frame.

In this context, it is sufficient to simply render the 3D aggregate model for manually aligning the aggregate 3D model with the common structure component in the target frame—it is not in fact necessary to actually render any part of the target frame itself with an aggregate 3D model. In practice, it may be convenient to render the aggregate 3D model within the target frame, so that the annotator has another means of seeing the effect of his adjustments. In some cases, an option may be provided to render an enlarged version of the aggregate 3D model, which the annotator may choose to use to make final adjustments.

The aligned model position may be determined based the one or more manual alignment inputs without using any automatic alignment.

Further disclosure pertaining to aggregate 3D models is provided below.

Automatic/Semi-Automatic Model Alignment

The automatic alignment may comprise Iterative Closest Point.

Further or alternatively, the automatic alignment may use at least one of: colour matching, 2D feature matching and 3D feature matching.

Further or alternatively, the automatic alignment may comprise computing a projection of the 3D model into a 2D image plane associated with the target frame, and adjusting the model position in 3D space so as to match the projection with 2D features of the common structure component within the 2D image plane.

The model position may, for example, be adjusted to minimise a re-projection error or other photometric cost function.

For example, the target frame may comprise data of a depth component of a 3D image, and the projection is matched to 2D features of the common structure component captured in a colour component of the 3D image.

The aligned model position may be determined automatically without any manual alignment inputs.

Some such embodiments, may still operate based on coarse estimation initially followed by fine adjustment.

That is, the aligned model position may be determined by initially estimating the model position within the target frame, and then applying the automatic alignment to adjust the estimated model position.

Whilst in a semi-automatic alignment, the model position may be initially estimated as a manually-defined position denoted by one or more manual position inputs received at a user interface, in a fully automatic alignment the model position is initially estimated automatically.

The model position may be initially estimated by applying a structure perception component to the target frame.

Automatic/Semi-Automatic Model Alignment Based on Structure Component Path

As another example, the frames may be time sequenced, and the model position may be initially estimated automatically based on a (common) structure component path within a time interval of the time-sequenced frames.

Moreover, the common structure component path may be updated based on the automatic alignment applied to the target frame.

The updated common structure component path may be used to compute a position of the common structure in one of the plurality of frames other than the target frame.

The method may comprise the step of storing 2D or 3D annotation data of the position computed for said one frame for annotating the common structure component in at least one perception input of that frame.

The automatic alignment may be performed so as to optimize a defined cost function which rewards matching of the 3D model with the common structure component whilst penalizing unexpected behaviour of the common structure component, as defined by an expected behaviour model for the common structure component.

For example, the defined cost function may penalize unexpected changes to the common structure component path, as defined by the expected behaviour model.

This advantageously incorporates knowledge of measured or assumed behaviour to provide more reliable alignment across frames.

The common structure component path may also be used to compute the reference position within the reference frame for generating the 3D model (before the path is updated).

Semi-Automatic Model Alignment

The aligned model position may be determined semi-automatically by initially estimating the model position automatically, and then aligning the estimated model position according to the one or more manual alignment inputs.

That is, it may be coarse-aligned automatically and then adjusted manually.

Alternatively or additionally, the aligned model position may be initially estimated by applying a structure perception component to the target frame.

Alternatively or additionally, in the case that the frames are time sequenced, the model position may initially be estimated based on a common structure component path within a time interval of the time-sequenced frames.

Alternatively or additionally, the model position may initially be estimated based on the automatic alignment of the 3D model with the common structure component in the target frame.

As another example, the aligned model position may be determined semi-automatically by initially estimating the model position according to the one or more manual alignment inputs, and then aligning the estimated model position according based on the automated alignment process.

That is, it may be coarse-aligned manually and then adjusted automatically.

Computing Reference Position

In embodiments of manual or automatic alignment, i.e. (i) or (i) and (ii), the reference position may be computed for the reference frame based on one or more positioning inputs received in respect of the reference frame at the user interface whilst rendering a visual indication of the reference position within the reference frame for manually adjusting the reference position within the reference frame.

The reference position may be computed for the reference frame automatically or semi-automatically.

The reference position may be computed based on one or more positioning inputs received at a user interface whilst rendering a visual indication of the reference position within the frame for manually adjusting the reference position within the frame.

The reference position may be computed for the reference frame automatically or semi-automatically.

The reference position may be computed automatically or semi-automatically based on a (common) structure component path within a time interval of the time-sequenced frames.

The reference position may be computed automatically or semi-automatically by applying a perception component to the reference frame.

Alternatively or additionally, the reference position may be computed automatically or semi-automatically based on a common structure component path within a time interval of the time-sequenced frames.

Iterative Generation and Propagation of Aggregate 3D Models

The reference position may be computed within the reference frame as an aligned model position of an existing 3D model of the structure component based on at least one of: (i) one or more manual alignment inputs received in respect of said frame at a user interface whilst rendering the existing 3D model for manually aligning the existing 3D model with the structure component in the reference frame, and (ii) an automatic alignment of the existing 3D model with the structure component in the reference frame.

The existing 3D model may have been generated from one or more other frames in which at least a portion of the structure component is captured.

The 3D model may be an aggregate 3D model determined by aggregating the selectively-extracted 3D structure points with 3D structure points of the existing 3D model.

The automatic alignment may comprise computing a projection of the existing 3D model into a 2D image plane associated with the reference frame, and adjusting the model position in 3D space so as to match the projection with 2D features of the common structure component within the 2D image plane.

Bounding Object Dimensions

One or more bounding object dimensions may be determined for the common structure component.

The one or more bounding object dimensions may one of:
(i) manually-determined based on one or more sizing inputs received at the user interface in respect of the reference frame,
(ii) automatically-determined by applying a perception component to the reference frame,
(iii) semi-automatically-determined by applying the perception component to the reference frame and further based on the one or more sizing inputs received in respect of the reference frame, and
(iv) assumed.

The selectively-extracted 3D structure points of the reference frame may be selectively extracted therefrom for generating the 3D model based on the reference position computed within the reference frame and the one or more bounding object dimensions.

The selectively-extracted 3D structure points may be a subset of points within a 3D volume defined by the reference position and the one or more bounding object dimensions.

The annotation data for the at least one perception input of the target frame may further comprise: the one or more bounding object dimensions for annotating a rigid common structure component, or a transformation of the one or more bounding object dimensions for annotating a non-rigid common structure component.

The one or more bounding objects dimensions may be determined manually or semi-automatically based on the one or more sizing inputs received in respect of the reference frame, wherein the visual indication of the reference position is in the form of a 3D bounding object rendered at the reference position within the reference frame and having said one or more bounding object dimensions for manually adjusting those one or more bounding object dimensions.

The one or more bounding object dimensions may be computed based additionally on one or more adjustment inputs received at the user interface in respect of the target frame whilst rendering the 3D bounding object at the aligned model position within the target frame. The 3D bounding object may be simultaneously or subsequently rendered at the reference position within the reference frame with the one or more bounding object dimensions adjusted according to the one or more adjustment inputs received in respect of the target frame (to allow an annotator to see the effect of any adjustments made in the target frame in the context of the reference frame).

2D/3D Annotation Data

Reference is made in the following to both 2D annotation data and 3D annotation data. Unless otherwise indicated, this refers to 2D or 3D annotation data created for annotating the structure component in at least one perception input of the target frame.

It is noted, however, that embodiments of any of the above aspects may additionally create and store further annotation data for annotating the common structure component in at least one perception input of the reference frame. Such embodiments may, advantageously, leverage a common set of annotation operations (manual, automatic, or semi-automatic) to create annotation data for both the target frame and the reference frame.

Moreover, in embodiments of any of the above, both 2D and 3D annotation data may be created. In some such embodiments, one such type of annotation data may be created for annotating one or more perception inputs of the target frame, and the other type of annotation data may be created for annotating one or more perception inputs of the target frame. This may similarly leverage a common set of annotation operations to create both types of annotation data.

By way of example, common annotation operations may be used to create:
2D annotation data for both the target and reference frames;
3D annotation data for both the target and reference frames;
2D annotation data for the reference frame, and 3D annotation data for the target frame;
2D annotation data and 3D annotation data for the target frame The above examples are provided for illustration purposes only, and are by no means exhaustive.

The annotation data may comprise both 2D annotation data of the aligned model position and 3D annotation data of the aligned model position stored in association with one or more perception inputs of the target frame, whereby the aligned model position is used for both 2D and 3D annotation of one or more perception inputs of the target frame.

Alternatively or additionally, further annotation data of the reference position may be stored for annotating the common structure component in at least one perception input of the reference frame, whereby the reference position computed within the reference frame is used for annotating perception inputs of both the target and reference frames.

The further annotation data may comprise the same one or more bounding object dimensions for annotating a rigid common structure component, or a transformation thereof for annotating a non-rigid structure component.

In embodiments, the 2D annotation data may comprise a 2D bounding object for the structure component, which is fitted, in the image plane, to the computed projection of the 3D model.

Alternatively or additionally, the 2D annotation data may comprise a segmentation mask for the structure component.

Aggregate 3D Models (Cont.)

A fourth aspect of the present disclosure (Aspect D) provides a computer-implemented method of modelling a common structure component, the method comprising, in a modelling computer system: receiving a plurality of captured frames, each frame comprising a set of 3D structure points, in which at least a portion of a common structure component is captured; computing a first reference position within a first of the frames; selectively extracting first 3D structure points of the first frame based on the first reference position computed for the first frame; computing a second reference position within a second of the frames; selectively extracting second 3D structure points of the second frame based on the second reference position computed for the second frame; and aggregating first 3D structure points and the second 3D structure points, thereby generating an aggregate 3D model of the common structure component based on the first and second reference positions.

In embodiments of Aspect D, the aggregate 3D model may be used to generate annotation data for annotating the common structure component in a training example of one of the plurality of frames, said one frame being the first frame, the second frame, or a third frame of the plurality of frames.

Note however that Aspect D is not limited in this respect, and the aggregate 3D model can alternatively (or additionally) be used for other purposes—see below.

In embodiments, the annotation data may be generated in accordance with any of Aspects A-C or any embodiment thereof.

The annotation data may comprise comprises at least one of: 2D annotation data derived by projecting the 3D model into an image plane, and 3D annotation data.

Said one frame may be the third frame, and the method may comprise the step of computing an aligned model position for the 3D model within the third frame, the annotation data being annotation data of that computed position, wherein the aligned model position is determined based on at least one of:
  (i) an automatic alignment of the 3D model with the common structure component in the third frame, and
  (ii) one or more manual alignment inputs received in respect of the third frame at a user interface whilst rendering the 3D model for manually aligning the 3D model with the common structure component in the third frame.

The second reference position within the second frame may be initially estimated for generating the aggregate 3D model, and the method comprises the steps of subsequently aligning the second reference position with the common structure component in the second frame based on at least one of:
  (i) an automatic alignment of the first 3D structure points extracted from the first frame with the common structure component in the second frame to automatically align the aggregate 3D model with the common structure component in the second frame, and
  (ii) one or more manual alignment inputs received in respect of the second frame at a user interface whilst rendering the aggregate 3D model for manually aligning the aggregate 3D model with the common structure component in the second frame;
wherein the aggregate 3D model may be updated based on the second frame and the aligned second reference position within the second frame.

A first 3D model may be generated by selectively extracting the first 3D structure points, wherein the second reference position is aligned with the common structure component in the second frame for generating the aggregate 3D model based on at least one of: (i) an automatic alignment of the first 3D model with the common structure component in the second frame, and (ii) one or more manual alignment inputs received in respect of the second frame at a user interface whilst rendering the first 3D model for manually aligning the first 3D model with the common structure component in the second frame.

At least a portion of the common structure component may be captured in a third of the frames, and the method may comprise: aligning a third reference position in the third frame based on at least one of: (i) an automatic alignment of the aggregate 3D model with the common structure component in the third frame, and (ii) one or more manual alignment inputs received at the user interface in respect of the third frame whilst rendering the aggregate 3D model for manually aligning the aggregate 3D model with the common structure component in the third frame; selectively extracting third 3D structure points of the third frame based on the third reference position; and aggregating the first, second and third 3D structure points, thereby generating a second aggregate 3D model of the common structure component based on the first, second and third reference positions.

The set of 3D structure points of the third frame may be transformed into a frame of reference of the third reference position to selectively extract the third 3D structure points.

The second reference position within the second frame may be initially estimated for generating the aggregate 3D model, and the aggregate 3D model may be updated based on the second frame and the aligned second reference position within the second frame.

The aggregate 3D model may be rendered via a user interface, and updated and re-rendered as one or more manual alignment inputs are received at the user interface in respect of the second frame for manually aligning the second reference position with the common structure component, such that the aligning of the second reference position with the common structure component in the second frame has the effect of correcting a visual artefact in the rendered aggregate 3D model caused by initial misalignment of the second reference position.

Note that, in this context the aligned second reference position is equivalent to the "aligned model position" referred to elsewhere in this disclosure, with second frame assuming the role of the target frame. All of the above description pertaining to the model position applies equally to the second reference position in this context (including, for example, the case in which the second reference position is initially estimated, and then adjusted, using any of the manual, automatic or semi-automatic processes above).

The aggregate 3D model may be updated and re-rendered as the one or more manual alignment inputs are received at the user, such that the aligning of the second reference position with the common structure component in the second frame has the effect of correcting a visual artefact in the rendered aggregate 3D model caused by initial misalignment of the second reference position.

As noted above, this provides the annotator with a means of manually aligning (or adjusting the alignment of) the second reference position, with the benefits set out above.

Said one frame may be the second frame, the annotation data being annotation data of the aligned second reference position.

The annotation data may comprise position data of the aligned second reference position for annotating a position of the common structure component in the at least one training example of the target frame, for example 3D position data for annotating the position of the common structure component in 3D space.

Further or alternatively, the annotation data may comprise data derived from the aggregate 3D model using the aligned second reference position, for example 2D annotation data derived by projecting the 3D model into an image plane based on the aligned second reference position, for example The first 3D structure points may be selectively extracted from the first frame for generating the 3D model based on the first reference position and one or more bounding object dimensions. The second 3D structure points may be selectively extracted from the second frame for generating the 3D model based on the second reference position and one of:

(a) the same one or more bounding object dimensions for modelling a rigid object, and
(b) a transformation of the one or more bounding object dimensions for modelling a non-rigid object.

The one or more bounding object dimensions may be one of:
(i) manually-determined based on one or more sizing inputs received in respect of the at least one of the first and second frames;
(ii) automatically-determined by applying a perception component to at least one of the first and second frames;
(iii) semi-automatically-determined by applying the perception component to the at least one frame and further based on the one or more sizing inputs received in respect of the at least one frame, and
(iv) assumed.

The first 3D structure may be a subset of points within a first 3D volume defined by the first reference position and the one or more bounding object dimensions. The second 3D structure points may be a subset of points within a second 3D volume defined by the second reference position and the same one or more bounding object dimensions or the transformation thereof.

The method may comprise the step of applying noise filtering to the aggregated 3D structure points, to filter-out noise points therefrom, for generating the aggregate 3D model.

The aggregate 3D model may comprise a 3D surface model fitted to the aggregated 3D structure points.

The method may comprise the step of applying a predictive model to the aggregated 3D surface points in order to generate the 3D model.

The method may comprise the step of using annotated perception input to train at least one perception component, wherein the annotation data for that perception input provides a ground truth for that perception input in the training process.

That is, in the notation of FIG. 1, the perception input is x and the annotation data provides the ground truth $y_x$.

Training Data Augmentation

As noted above, the use of aggregate 3D models is not restricted to the creation of annotated perception inputs. For example, an aggregate 3D model determined in accordance with Aspect D may alternatively or additionally be used for one or more of:
(a) training data augmentation, and
(b) simulation.

Training Data Augmentation

The aggregate 3D model may be used augment data of one of the plurality of frames with model data of the aggregate 3D model, and thereby create at least one augmented perception input comprising the data of said one frame and the model data of the 3D model, said one frame being the first frame, the second frame, or a third frame of the plurality of frames.

The model data may comprise at least one of: 2D augmentation data created by projecting the 3D model into an image plane, and 3D model data.

The method may comprise the step of using the augmented perception input to train at least one perception component, whereby the combination of the model data and the data of said one frame is provided as part of the same perception input to the perception component during training.

That is, in the notation of FIG. 1, the data of the frame and the model data each form part of the same perception input x.

The augmented perception input may be used in one of:
(a) an unsupervised training process without providing any ground truth for the augmented perception input (i.e. with no $y_x$ in the notation of FIG. 1), and
(b) a supervised training process in which the annotation data of claim 2 or any claim dependent thereon provides a ground truth for the augmented perception input.

Simulation

Further or attentively, the aggregate 3D model may be inputted to a simulator for rendering in a simulated environment, in which at least one autonomous agent is executed for navigating the simulated environment autonomously, and behaviour of the autonomous agent responsive to the simulated environment is recorded in an electronic behaviour log.

The autonomous agent may navigate the simulated environment using a simulated instance of a trained perception component applied to simulated perception inputs, wherein data of the electronic behaviour log may be used to retrain and/or redesign the perception component for applying to real-world perception inputs.

The method may comprise the step of embodying the retrained or redesigned perception component in a real-world autonomous robot control system for use in autonomous decision making based on real-world perception inputs.

Efficient Model Generation

In order to generate the 3D model efficiently (and, thus, quickly), the set of 3D structure points of the reference frame may be transformed into a frame of reference of the reference position, in order to selectively-extract the 3D structure points for the 3D model.

(Note the distinction here between the (3D) reference frame, and term "frame of reference" which is used in a geometric sense.)

For example, the 3D volume defined by the reference position and the one or more bounding object dimensions may be a cuboid aligned with coordinate axes of the frame of reference. This allows the subset of 3D structure points within that volume to be computed highly efficiently e.g. on a GPU.

For example, the 3D structure points may be selectively-extracted from the reference frame by scalar comparison performed in the above frame of reference.

For an aggregate 3D mode, the set of 3D structure points of the first frame may be transformed into a frame of reference of the first reference position to selectively extract the first 3D structure points; and the set of 3D structure points of the second frame may be transformed into a frame of reference of the second reference position to selectively extract the second 3D structure points.

The first 3D volume may be aligned with coordinate axes of the frame of reference of the first reference position, and the second 3D volume may be aligned with coordinate axes of the frame of reference of the second reference position.

Perception Inputs—Examples

The at least one perception input may comprise 2D image data of or associated with the target frame, the image plane being the image plane of the image data.

The target frame may comprise data of a depth component of a 3D image and the image data of the perception input may be image data of a colour component of the 3D image.

The method may comprise the step of applying noise filtering to at least one of the following, to filter-out noise points therefrom: the extracted 3D structure points for generating the 3D model wherein the 3D model comprises or is derived from the filtered 3D structure points in that event, and the computed projection (in the case of 2D annotation data) wherein the 2D annotation data is 2D annotation data of the filtered projection in that event.

The noise filtering may be applied according to filtering criteria which are manually adjustable via a user interface of the annotation computer system.

The or each frame may be one of a plurality of time-sequenced frames.

Annotated Perception Inputs—Use Cases

Any above-mentioned perception component that is used to facilitate automatic or semi-automatic annotation may be a trained (machine learning) perception component. In that event, the trained perception component, may be re-trained using any of the above-mentioned annotated training inputs. The use of trained perception in this context may be referred to as "model in the loop".

More generally, the method may comprise the step of using the or each perception input in a training process to train at least one perception component, wherein the annotation data for that perception input provides a ground truth for that perception input in the training process.

For example, the perception component may be one of: a 2D bounding box detector, a 3D bounding box detector, an instance segmentation component, a location estimation component, an orientation estimation component and a distance estimation component.

For example, the 3D annotation data may be used to train a 3D perception component and the 2D annotation data is used to train a 2D perception component.

Example 3D Frames

The set of 3D structure points of the or each frame may be in the form of a point cloud.

The set of 3D structure points may have been captured using one or more sensors having one or more sensor modalities.

Each frame may correspond to a different single time instant.

At least one of the frames may comprise 3D structure points captured at multiple time instances, those points having been transformed so as to correspond to the single time instant to which that frame corresponds.

Each frame may be one of a plurality of time-sequenced frame. For example, the target and reference frames may be frames of a time sequence of frames corresponding to different respective time instants in the sequence.

The set of 3D structure points of the frame may be a merged set generated by merging at least two component sets of 3D structure points captured by different sensors.

Example 3D Models

Any of the above 3D models may comprise a 3D surface model fitted to the selectively-extracted 3D structure points. This could be a single-frame model fitted to 3D structure points selectively extracted from a single fame, or an aggregate 3D model fitted to points selectively extracted from multiple frames and aggregated.

This may be used for example to create 3D annotation data, comprising or based on a projection of the 3D surface model.

Another aspect of the present subject matter provides a computer-implemented method of creating one or more annotated perception inputs, the method comprising, in an annotation computer system: receiving at least one captured frame comprising a set of 3D structure points, in which at least a portion of a structure component is captured; receiving a 3D model for the structure component; determining an aligned model position for the 3D model within the frame based on an automatic alignment of the 3D model with the structure component in the frame; and storing annotation data of the aligned model position in computer storage, in association with at least one perception input of the frame for annotating the structure component therein.

In embodiments, the 3D model may be generated by selectively extracting 3D structure points of at least one reference frame based on a reference position computed within the reference frame.

However, the 3D model may also be a CAD (computer-aided design) model or other externally-generated model of the structure component.

That is to say, the automatic or semi-automatic model alignment features set out above may also be applied with externally-generated models. It will thus be appreciated that all description above pertaining to a 3D model generated from at least one reference frame applies equally to an externally-generated 3D model in this context.

FURTHER EXAMPLES

To further illustrate how the various annotation features disclosed herein may be used individually or in combination, some further example use-cases and workflows supported by those features are set out below. As will be appreciated in view of the teaching presented herein, these are by no means exhaustive.
1. 3D to 2D annotation: Given a full or partial 3D model:
   a. generate a tight 2D bounding box;
   b. generate an instance segmentation mask (or a prior for a CRF/annotator/other method to refine the segmentation mask);
   c. use projected points from a different frame to assist annotation (using the above x-ray vision feature) thus improving consistency and accuracy of annotation.
2. 3D model extracted from a single frame: Can be generated efficiently by transforming all the points of the frame to align with an axis of the 3D bounding box, meaning that a simple scalar comparison can be used to determine if any given point is enclosed.
3. 3D model extracted across multiple frames (aggregate 3D model): Using bounding boxes from multiple frames to extract and aggregate all the enclosed point cloud points (to generate an aggregated point cloud). The extraction can be performed efficiently for each frame by applying the above transformation in to each frame for the 3D bounding box as positioned in that frame.
   a. Noise may then be filtered out of the aggregated point cloud.
   b. The to generate an aggregated point cloud may be smoothed with a surface e.g. using SDF.
   c. Benefits of accumulating points include:
      i. Improved priors for instance segmentation, where a predictive model (e.g. CRF) is applied; or the aggregated point cloud may even be good enough for instance segmentation on its own (i.e. without applying a predictive model or fitting a surface model etc.);
      ii. Improved noise filtering/surface as there will be more points than a single frame;

iii. An aggregate model is much more useful for augmenting training data than a single frame model as it will be of higher quality and have a greater range of viewpoints available;
iv. A 2D bounding box can be drawn including the occluded portions of a partially occluded object.
4. Automatic 3D annotation: By means of one or more of the following:
  a. generating a 3D model from one frame, matching it with the point cloud in another frame (e.g. by Iterative Closest Point), and then combining into a single model and repeating with the next frame (using the combined model as the reference to match with);
  b. projecting the 3D model into the image and minimising the photometric error (i.e. automating the annotator 'by eye' alignment of the x-ray vision);
  c. feature matching in 2D and/or 3D and minimising the reprojection error of the matched features;
  d. iteratively building out from an initial coarse annotation i.e. determine initial annotation(s), align the poses(s), refine motion model, and repeat with more poses. A coarse annotation could be provided by:
    i. a model in the loop (e.g. a neural network or a moving object detector) in 2D or 3D;
    ii. an initial dynamics model (expected behaviour model) of bounding boxes across frames (e.g. on the assumption the object was travelling at a constant velocity);
    iii. A "One-click" on an object point (i.e. by selecting a single object point) or "2D lasso" around object points (i.e. by selecting a set of object point within a 2D plane, such as the image plane or a top-down view).
  e. a minimization of an alignment cost function that takes into account e.g. 2D error, 3D error and likely (expected) behaviour.

Whilst specific embodiments of the invention have been described above for the sake of illustration, it will be appreciated that these are not necessarily exhaustive. The scope of the invention is not defined by the described embodiments, but only by the accompanying claims.

ANNEX A

With reference to FIG. 17, this Annex shows how the function $f_i$ of section of Section 4.2.7 is derived based on the geometry of the system.

Define $\beta_i = p_i \cdot \hat{n}_i = |p_i| \cos \theta$.

Assuming a locally flat object surface 1506, the shortest distance t that surface from point p is $\alpha = x \cos \theta$, hence $$x = |p_i| \frac{\alpha}{\beta_i}$$

The disparity $k_i$ of point p is proportional to $$\frac{1}{|p_i|}$$

and the disparity $f_i(\alpha)$ of point q proportional to $$\frac{1}{|p_i| + x} = \frac{1}{|p_i|(1 + \alpha/\beta_i)},$$

hence:

$$f_i(\alpha) = k_i \frac{\beta_i}{\alpha + \beta_i}.$$

Annex B

This Annex shows how the MLE of Section 4.2.7 is derived.

Consider a single point at a single frame i. Denote by $p_i$ the point's coordinates in the camera's frame of reference. After projecting $p_i$ back onto the image plane, we can associate it with an image pixel. This pixel has a corresponding disparity value $d_i$ and surface normal $\hat{n}_i$. We make the assumption that the measured disparity value is normally distributed $\sigma$, with a mean $\mu_i$ corresponding to the true value and a constant standard deviation $\sigma$. Thus, each frame, we have a sample $d_i$ from a normally distributed random variable $D_i$ with a mean $\mu_i$ which is a known function $f_i$ of an unknown parameter $\alpha$, the distance from the point to the surface. Our task is to estimate the parameter $\alpha$.

$$D_i \sim N(f_i(\alpha), \sigma)$$

If we assume that each of these random variables is independent, we may perform a maximum likelihood estimation.

$$\max_\alpha \prod_i \frac{1}{\sqrt{2\pi\sigma}} \exp\left(-\frac{1}{2}\left(\frac{d_i - f_i(\alpha)}{\sigma}\right)^2\right).$$

Taking the negative logarithm of each side, and discarding the constant terms, yields the following:

$$\min_\alpha \sum_i (d_i - f_i(\alpha))^2.$$

Differentiating this expression with respect to a and equating the result to 0 yields the following equation.

$$\sum_i f_i'(\alpha)(d_i - f_i(\alpha)) = 0$$

If we assume that the surface is planar, some simple geometry gives the following formulae for $f_i$, $f_i^{-1}$, $f_i'$. Here, $k_i$ denotes the disparity of the point $p_i$, and $\beta_i$ denotes the value $p_i \cdot \hat{n}_i$.

$$f_i(\alpha) = k_i \frac{\alpha}{\alpha + \beta_i}$$

$$f_i^{-1}(d) = \left(\frac{k_i}{d} - 1\right)\beta_i$$

$$f_i'(\alpha) = -\frac{f_i(\alpha)}{\alpha + \beta_i} = -k_i \frac{\beta_i}{(\alpha + \beta_i)^2}$$

At this point, we could simply substitute this explicit formula for $f_i$ into our maximum likelihood estimation and solve the resulting equation. However, this turns out to be intractable. Instead, we will approximate $f_i$ by its first-order Taylor series at some value $\overline{\alpha}_i$.

$$f_i(\alpha) \approx f_i(\overline{\alpha}_i) + f_i'(\overline{\alpha}_i)(\alpha - \overline{\alpha}_i)$$

$$f_i^{-1}(d) \approx \overline{\alpha}_i + \frac{d - f_i(\overline{\alpha}_i)}{f_i'(\overline{\alpha}_i)}$$

Substituting this approximation into our maximum likelihood estimation yields the following equation $$\sum_i f_i'(\overline{\alpha}_i)^2 \left(f_i^{-1}(d_i) - \alpha\right) = 0$$

Due to its simplified form, this equation can be solved explicitly, yielding the following formula for $\alpha$.

$$\alpha = \frac{\Sigma_i f_i'(\overline{\alpha}_i)^2 f_i^{-1}(d_i)}{\Sigma_i f_i'(\overline{\alpha}_i)^2}$$

All that remains is to choose the values of the $\overline{\alpha}_i$s. The linear approximation will be better the closer $\overline{\alpha}_i$ is to the true value $\alpha$. We will examine two possible choices.

For the first choice, we may choose $\overline{\alpha}_i$ such that the following relation holds.

$$f_i(\overline{\alpha}_i) = d_i$$

This corresponds to assuming that the measured disparity $d_i$ is close to the true disparity $\mu_i$. This should give good results when the disparity is accurate, but may not respond well to noise. The value of $\overline{\alpha}_i$ which achieves this is the following $$\overline{\alpha}_i = f_i^{-1}(d_i) = \left(\frac{k_i}{d_i} - 1\right)\beta_i$$

Then, our formula for $\alpha$ reduces to the following weighted average $$\alpha = \frac{\Sigma_i w_i^2 \left(\frac{k_i}{d_i} - 1\right)\beta_i}{\Sigma_i w_i^2} = \frac{\Sigma_i w_i^2 \overline{\alpha}_i}{\Sigma_i w_i^2}$$

$$w_i = f_i'(\overline{\alpha}_i) = -\frac{d_i^2}{k_i}\beta_i^{-1}$$

For the second choice, we may choose $\overline{\alpha}_i$ such that the following relation holds.

$$f_i(\overline{\alpha}_i) = k_i$$

This corresponds with assuming that the point $p_i$ is close to the surface. This should give good results near the surface, making minimal assumptions about the accuracy of the disparity. The value of $\overline{\alpha}_i$ which achieves this is the following $$\overline{\alpha}_i = f_i^{-1}(k_i) = 0$$

Then, our formula for $\alpha$ reduces to the following weighted average $$\alpha = \frac{\Sigma_i w_i^2 \left(1 - \frac{d_i}{k_i}\right)\beta_i}{\Sigma_i w_i^2} = \frac{\Sigma_i w_i(d_i - k_i)}{\Sigma_i w_i^2}$$

$$w_i = f_i'(\overline{\alpha}_i) = -k_i \beta_i^{-1}$$

Alternatively, we may generalise both of the previous solutions by interpolating between them. Choose a value $\lambda \in [0,1]$; we will recover the previous solutions when $\lambda=1$ or $\lambda=0$. We may choose $\overline{\alpha}_i$ such that the following relation holds.

$$f_i(\overline{\alpha}_i) = k_i \left(\frac{d_i}{k_i}\right)^\lambda.$$

The value of $\overline{\alpha}_i$ which achieves this is the following.

$$\overline{\alpha}_i = f_i^{-1}\left(k_i\left(\frac{d_i}{k_i}\right)^\lambda\right) = \left(\left(\frac{k_i}{d_i}\right)^\lambda - 1\right)\beta_i$$

Then, our formula for $\alpha$ reduces to the following weighted average.

$$\alpha = \frac{\sum_i w_i^2\left(-\left(\frac{k_i}{d_i}\right)^{2\lambda-1} + 2\left(\frac{k_i}{d_i}\right)^\lambda - 1\right)\beta_i}{\sum_i w_i^2}$$

$$w_i = f_i'(\overline{\alpha}_i) = -k_i\left(\frac{d_i}{k_i}\right)^{2\lambda}\beta_i^{-1}$$

For example, taking $\lambda=\frac{1}{2}$ as a compromise between the two extreme solutions, we may choose $\overline{\alpha}_i$ such that the following relation holds.

$$f_i(\overline{\alpha}_i) = \sqrt{k_i d_i}$$

The value of $\overline{\alpha}_i$ which achieves this is the following.

$$\overline{\alpha}_i = f_i^{-1}\left(\sqrt{k_i d_i}\right) = \left(\sqrt{\frac{k_i}{d_i}} - 1\right)\beta_i$$

Then, our formula for $\alpha$ reduces to the following weighted average.

$$\alpha = 2\frac{\Sigma_i w_i^2\left(\sqrt{\frac{k_i}{d_i}} - 1\right)\beta_i}{\Sigma_i w_i^2} = 2\frac{\Sigma_i w_i^2 \overline{\alpha}_i}{\Sigma_i w_i^2}$$

$$w_i = f_i'(\overline{\alpha}_i) = -d_i \beta_i^{-1}$$

Annex C

CRF Label Compatibility Derivation.

This section sets out the derivation of the Dense CRF of sections 5.2.2 and 5.2.3 above.

This tries to minimise the following Gibbs energy over the pixelwise fully connected graph:

$$E(x) = \sum_i \psi_n(x_i) + \sum_{i<j} \psi_p(x_i, x_j).$$

where x is the set of labels, i and j are 1-dimensional pixel indices, $\psi_n$ is the unary potential (which in our case comes from the aggregated data from input and reconstruction), and $\psi_p$ is the pairwise potential.

The pairwise potential has the form of a weighted sum of K Gaussian kernels in terms of feature vectors $f_i$ and $f_j$ and positions $p_i$ and $p_j$ of pixels i and j:

$$\psi_{p(x_i,x_j)} = \sum_{m=1}^{K} \mu^{(m)}(x_i, x_j)\exp\left(-\frac{|p_i - p_j|}{2s_{xy}^2} - \frac{1}{2}(f_i - f_j)^T \Lambda^{(m)}(f_i - f_j)\right), i < j.$$

where each kernel m is characterised by a symmetric positive-definite precision matrix $\Lambda^{(m)}$ and weighted by the symmetric label compatibility function $\mu^{(m)}(x_i, x_j)$.

The Problem

Our labels x represent an instance segmentation over the image. The pairwise potential works to smooth the input unary potential by snapping the boundaries to edges in the feature vector field. However, this smoothing has a single parameter $s_{xy}$, which represents the standard deviation of the Gaussian potential. Ideally we would like this to correspond somehow with the standard deviation of pixels within our instance mask, so that the smoothness is scaled appropriately. If we don't scale the smoothness appropriately, we see that the smaller instances such as distant or occluded objects vanish because it is less costly to remove the entire instance than just smooth its boundary. However, $s_{xy}$ is a global parameter that we don't have access to on a per-instance basis.

The Solution

We can however choose the compatibility appropriately so that it reduces the smoothing effect for small instances. We would like to do this in a way that we multiply the $$-\frac{|p_i - p_j|}{2s_{xy}^2}$$

term in the exponential by $$\frac{s_{xy}^2}{s_{x_i}^2}$$

so that the denominator is with respect to the standard deviation of pixels within out instance $s_{x_i}$. This is not [possible since we are multiplying the exponential by the per instance compatibility, so the best we can do is effectively add a term into the exponential by setting the compatibility to be an exponential. We do this n such a way that the distance metric between pixels is effectively increased by adding a constant term which is inversely proportional to the variance of points in the instance mask. This will ensure that as the size of the instance mask decreases, the effective distance between points increases, so the smoothing effect will reduce. Putting this all together, we choose $$\mu^{(m)}(x_i, x_j) := \min_{k \in \{i,j\}}\left(\mu_{max}\exp\left(-\left(\frac{s_{xy}}{\alpha s_{xy}}\right)^2\right)\right), i < j, \forall m$$

where the $$\min_{k \in \{i,j\}}$$

ensures that the compatibility between two instances is entirely determined by the smallest of the two instances, and we have introduced two tuning parameters: $\mu_{max}$, the maximum compatibility, and $\alpha$, the scale of the smoothing as a proportion of the standard deviation. For example, setting $\alpha = \frac{1}{2}$ intuitively corresponds to limiting the smoothing radius to half the standard deviation of pixel positions in the instance mask.

Plugging this into the definition of $\psi_p(x_i, x_j)$ gives $$\psi_p(x_i, x_j) = \sum_{m=1}^{K} \mu_{max}\exp\left(-\frac{|p_i - p_j|}{2s_{xy}^2} - \frac{s_{xy}^2}{(\alpha s_{x_k})^2} - \frac{1}{2}(f_i - f_j)^T \Lambda^{(m)}(f_i - f_j)\right),$$

$i < j$ where k is the smaller of the two instance masks i,j.

We use the 2D bounding box as a proxy for the instance mask, since the ground truth mask is inaccessible. For a bounding box with width w and height h, this leads us to define the corresponding variance $s_{x_k}^2$ as the variance of the rectangular uniform distribution defined on the 2D bounding box. Note this is equal to the expected distance between two points independently chosen in the bounding box with i>j which also makes sense in the context of normalising the pairwise kernel. We calculate $$s_{x_k}^2 = \mathbb{E}\left[\|p_i - p_j\|^2 \mid i > j\right] =$$

$$\frac{1}{2}\mathbb{E}\left[\|p_i - p_j\|^2\right] = \frac{1}{2}\mathbb{E}\left[(x_i - x_j)^2 + (y_i - y_j)^2\right] = \frac{1}{2}\mathbb{E}\left[(x_i - x_j)^2\right] +$$

$$\frac{1}{2}\mathbb{E}\left[(y_i - y_j)^2\right]\frac{1}{2}\int_0^w\int_0^w \frac{1}{w^2}(x_i - x_j)^2 dx_i dx_j + \frac{1}{2}\int_0^h\int_0^h \frac{1}{h^2}(y_i - y_j)^2 dy_i dy_j =$$

$$\frac{1}{2}\int_0^w\int_0^w \frac{1}{w^2}(x_i^2 - 2x_i x_j + x_j^2) dx_i dx_j + \frac{1}{2}\int_0^h\int_0^h \frac{1}{h^2}(y_i^2 - 2y_i y_j + y_j^2) dy_i dy_j =$$

$$\frac{1}{2}\int_0^w \frac{1}{w^3}\left(\frac{1}{3}w^3 - w^2 x_j + w x_j^2\right) dx_j + \frac{1}{2}\int_0^h \frac{1}{h^2}\left(\frac{1}{3}h^3 - h^2 y_j + h y_j^2\right) dy_j$$

$$\frac{1}{2}\frac{1}{w^2}\left(\frac{1}{3}w^4 - \frac{1}{2}w^4 + \frac{1}{3}w^4\right) + \frac{1}{2}\frac{1}{h^2}\left(\frac{1}{3}h^4 - \frac{1}{2}h^4 + \frac{1}{3}h^4\right)\frac{1}{12}(w^2 + h^2)$$

The invention claimed is:

1. A computer-implemented method of creating 2D annotation data for annotating a 2D image, the method comprising:
receiving at an annotation computer system at least one captured frame comprising a set of 3D structure points associated with the 2D image, in which at least a portion of an object is captured;
computing a reference position for the object within the at least one captured frame;
positioning a 3D bounding object in the at least one captured frame to bound the object, wherein the reference position is the position of the 3D bounding object within the at least one captured frame;
generating a 3D model for the object by selectively extracting 3D structure points of the at least one captured frame based on the reference position, wherein the selectively extracted 3D structure points of the at least one captured frame are a subset of the 3D structure points extracted from within a volume of the 3D bounding object;
computing a projection of the 3D model into an image plane of the 2D image;
storing 2D annotation data of the computed projection in persistent computer storage in association with the 2D image; and
using the 2D image and the 2D annotation data to train, test, or validate a 2D structure detector.

2. The method of claim 1, wherein the 2D annotation data comprises a 2D bounding object for the object, which is fitted, in the image plane, to the computed projection of the 3D model.

3. The method of claim 1, wherein the 2D annotation data comprises a segmentation mask for the object.

4. The method of claim 1, wherein the 2D annotation data is stored:
in association with at least one first perception input comprising, being derived from, or otherwise corresponding to said at least one captured frame for annotating the object therein, wherein the projection is computed based on the reference position computed within at least one captured frame; or
in association with at least one second perception input comprising, being derived from, or otherwise corresponding to a second frame for annotating the object in the at least one second perception input of the second frame, in which the second frame at least a portion of the object is captured.

5. The method of claim 1, wherein the 3D model is also used to create 3D annotation data for annotating the object in 3D space.

6. The method of claim 4, wherein the 2D annotation is stored in association with the at least one second perception input of the second frame, and wherein the 2D annotation data is created for annotating the at least one second perception input of the second frame by computing an aligned model position for the 3D model within the second frame, wherein the aligned model position is determined based on at least one of:
(i) one or more manual alignment inputs received in respect of the second frame at a user interface whilst rendering the 3D model for manually aligning the 3D model with the object in the second frame, and
(ii) an automatic alignment of the 3D model with the object in the second frame.

7. The method of claim 1, wherein the annotation data comprises refined annotation data computed by applying a conditional random field (CRF) in dependence on the selectively-extracted 3D structure points.

8. The method of claim 4, wherein the 2D annotation is stored in association with the at least one first perception input of said at least one captured frame, and wherein the at least one perception input comprises 2D image data of or associated with said at least one captured frame, the image plane being the image plane of the image data.

9. The method of claim 1, comprising the step of applying noise filtering to at least one of the following, to filter-out noise points therefrom:
the extracted 3D structure points for generating the 3D model, wherein the 3D model comprises or is derived from the filtered 3D structure points in that event, or
the computed projection, the 2D annotation data being 2D annotation data of the filtered projection in that event.

10. The method of claim 1, wherein the reference position is computed based on one or more positioning inputs received at a user interface whilst rendering a visual indication of the reference position within the frame for manually adjusting the reference position within the at least one captured frame.

11. The method of claim 1, wherein the selectively-extracted 3D structure points are selectively extracted from the at least one captured frame for generating the 3D model based on the reference position and one or more bounding object dimensions, wherein the one or more bounding object dimensions are one of:
(i) manually-determined based on one or more sizing inputs received at a user interface,
(ii) automatically-determined by applying a structure detector to the at least one captured frame,
(iii) semi-automatically-determined by applying the structure detector to the at least one captured frame and further based on the one or more sizing inputs, or
(iv) assumed.

12. The method of claim 1, wherein the 2D image has been captured with a camera.

13. The method of claim 1, wherein the 3D model comprises a 3D surface model fitted to the selectively-extracted 3D structure points, and the projection comprises a projection of the 3D surface model into the image plane.

14. The method of claim 1, wherein the set of 3D structure points is transformed into a frame of reference of the reference position, in order to selectively extract the 3D structure points for the 3D model.

15. The method of claim 1, wherein the reference position is computed within said at least one captured frame as an aligned model position of an existing 3D model of the object based on at least one of:
(i) one or more manual alignment inputs received in respect of said at least one captured frame at a user interface whilst rendering the existing 3D model for manually aligning the existing 3D model with the object in said at least one captured frame, or
(ii) an automatic alignment of the existing 3D model with the object in said at least one captured frame.

16. The method of claim 6, wherein the automatic alignment comprises computing a projection of an existing 3D model or the 3D model into a 2D image plane associated with the second frame, and adjusting the model position in 3D space so as to match the projection with 2D features of the object within the 2D image plane.

17. The method of claim 1, wherein the 2D annotation data comprises an instance segmentation mask determined to substantially optimize an energy function, wherein the instance segmentation mask assigns, to each pixel of a set of pixels in the image plane, an instance classification label, and wherein the energy function has:
- a unary term, which aggregates a unary function over the instance segmentation mask, the unary function applied to the instance classification label of each pixel individually, wherein the unary function is defined by one or more raycasted values, as determined in projecting by raycasting through that pixel and determining if and where a ray intersects a surface of the 3D model, and
- a non-unary term, which aggregates a non-unary function over the instance segmentation mask, the non-unary function applied to the instance classification labels of at least two of the pixels.

18. The method of claim 17, wherein the non-unary function has one or more terms, each a product of a label compatibility function and a kernel, wherein the kernel measures a difference between at least one of: locations of the pixels, values of the pixels, or features of the pixels, such that an effect of the label compatibility function is reduced as that or those differences increase.

19. A computer system comprising one or more computers programmed or otherwise configured to:
- receive a 2D image to be annotated;
- determine a relative pose between the 2D image and a 3D object model;
- raycast through each pixel of a plane of the 2D image and determining if and where a ray intersects a surface of the 3D model, thereby determining one or more raycasted values for the pixels; and
- determine an instance segmentation mask as substantially optimizing an energy function, wherein the instance segmentation mask assigns, to each pixel of a set of pixels in the image plane of the 2D image, an instance classification label, and wherein the energy function has:
  - a unary term, which aggregates a unary function over the instance segmentation mask, the unary function applied to the instance classification label of each pixel individually, wherein the unary function is defined by one or more raycasted values, as determined in projecting by raycasting through that pixel and determining if and where the ray intersects a surface of the 3D model, and
  - a non-unary term, which aggregates a non-unary function over the instance segmentation mask, the non-unary function applied to the instance classification labels of at least two of the pixels.

20. Non-transitory computer-readable media for having encoded thereon executable instructions that, when executed by a computer system, cause the computer system to carry out steps of:
- receiving at an annotation computer system at least one captured frame comprising a set of 3D structure points associated with a 2D image, in which at least a portion of an object is captured;
- computing a reference position for the object within the at least one captured frame;
- positioning a 3D bounding object in the at least one captured frame to bound the object, wherein the reference position is the position of the 3D bounding object within the at least one captured frame;
- generating a 3D model for the object by selectively extracting 3D structure points of the at least one captured frame based on the reference position, wherein the selectively extracted 3D structure points of the at least one captured frame are a subset of the 3D structure points extracted from within a volume of the 3D bounding object;
- computing a projection of the 3D model into an image plane of the 2D image;
- storing 2D annotation data of the computed projection in persistent computer storage in association with the 2D image; and
- using the 2D image and the 2D annotation data to train, test or validate a 2D structure detector.

* * * * *